(12) United States Patent
Pedersen

(10) Patent No.: US 12,112,272 B2
(45) Date of Patent: *Oct. 8, 2024

(54) INTERNET OF THINGS (IOT) BIG DATA ARTIFICIAL INTELLIGENCE EXPERT SYSTEM INFORMATION MANAGEMENT AND CONTROL SYSTEMS AND METHODS

(71) Applicant: Robert D. Pedersen, Dallas, TX (US)

(72) Inventor: Robert D. Pedersen, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,510

(22) Filed: Jun. 30, 2023

(65) Prior Publication Data

US 2024/0256905 A1 Aug. 1, 2024

Related U.S. Application Data

(63) Continuation of application No. 17/555,038, filed on Dec. 17, 2021, now Pat. No. 11,734,578, which is a
(Continued)

(51) Int. Cl.
*G06N 5/02* (2023.01)
*G06N 3/02* (2006.01)

(52) U.S. Cl.
CPC ............... *G06N 5/02* (2013.01); *G06N 3/02* (2013.01)

(58) Field of Classification Search
CPC ...................................................... G06N 3/02
See application file for complete search history.

(56) References Cited

U.S. PATENT DOCUMENTS

| 6,759,961 B2 | 7/2004 | Fitzgerald et al. |
| 7,049,968 B2 | 5/2006 | Fitzgerald et al. |

(Continued)

OTHER PUBLICATIONS

On Multistage Fuzzy Neural Network Modeling Chung et al. (Year: 2000).*

(Continued)

*Primary Examiner* — Kakali Chaki
*Assistant Examiner* — Ababacar Seck
(74) *Attorney, Agent, or Firm* — Steven R. Pedersen

(57) ABSTRACT

IOT Big Data information management and control systems and methods for distributed performance monitoring and critical network fault detection comprising a combination of capabilities including: IOT data collection sensor stations receiving sensor input signals and also connected to monitor units providing communication with other monitor units and/or cloud computing resources via IOT telecommunication links, and wherein a first data collection sensor station has expert predesignated other network elements comprising other data collection sensor stations, monitor units, and/or telecommunications equipment for performance and/or fault monitoring based on criticality to said first data collection sensor station operations, thereby extending monitoring and control operations to include distributed interdependent or critical operations being monitored and analyzed throughout the IOT network, and wherein performance and/or fault monitoring signals received by said first data collection sensor station are analyzed with artificial intelligence, hierarchical expert system algorithms for generation of warning and control signals.

20 Claims, 25 Drawing Sheets

Related U.S. Application Data continuation of application No. 17/183,635, filed on Feb. 24, 2021, now Pat. No. 11,244,230, which is a continuation-in-part of application No. 16/412,383, filed on May 14, 2019, now abandoned.

(56) References Cited

U.S. PATENT DOCUMENTS

| | | | |
|---|---|---|---|
| 7,339,608 | B2 | 3/2008 | Ryley et al. |
| 7,420,472 | B2 | 9/2008 | Tran |
| 7,502,498 | B2 | 3/2009 | Tran |
| 7,705,725 | B2 | 4/2010 | Matsen et al. |
| 7,733,224 | B2 | 6/2010 | Tran |
| 8,275,824 | B2 | 9/2012 | Jung et al. |
| 8,743,200 | B2 | 6/2014 | Anderson |
| 9,101,334 | B2 | 8/2015 | Rath et al. |
| 9,215,181 | B2 | 12/2015 | Toy |
| 9,315,192 | B1 | 4/2016 | Zhu et al. |
| 9,336,436 | B1 | 5/2016 | Dowdall |
| 9,805,601 | B1* | 10/2017 | Fields ............... G08G 1/0129 |
| 9,807,640 | B2 | 10/2017 | Chou et al. |
| 2008/0317241 | A1 | 12/2008 | Wang |
| 2009/0002141 | A1* | 1/2009 | Rinaldi ............... G08G 1/161 340/425.5 |
| 2009/0126736 | A1 | 5/2009 | Taylor |
| 2014/0126356 | A1 | 5/2014 | Lee et al. |
| 2015/0294422 | A1* | 10/2015 | Carver ............... G06Q 40/08 705/4 |
| 2016/0135077 | A1 | 3/2016 | Streijl |
| 2017/0092126 | A1* | 3/2017 | Oshida ............... G08G 1/005 |
| 2019/0339688 | A1* | 11/2019 | Cella ............... H04L 1/18 |

OTHER PUBLICATIONS

Artificial intelligence in Internet of things Ghosh et al. (Year: 2018).*
Benesty, et. al., "Microphone Array Signal Processing," Springer, 2008.
M. Brandsttein and D. West, "Microphone Arrays," Springer, 2001.
Ali O. Abid Noor, "Adaptive Noise Cancellation—Innovative Approaches," Lambert Academic Publishing, 2012.
J. C. Giarratano, et. al., "Expert Systems," Thomson Course Technology, Boston, Massachusetts, 2005.
Chen, C. H., "Fuzzy Logic and Neural Network Handbook," McGraw-Hill, New York, 1996.
Cox, C., "The Fuzzy Systems Handbook," Academic Press Inc., 1994.
Earl Cox, "Fuzzy Fundamentals," IEEE Spectrum, Oct. 1992, pp. 58-61.
G. V. S. Raju, et. al., "Hierarchical Fuzzy Control," Int J. Control, 1991, V. 54, No. 5, pp. 1201-1216.
G. V. S. Raju, "Adaptive Hierarchical Fuzzy Controller," IEEE Transactions on Systems, Man and Cybernetics, V. 23, No. 4, pp. 973-980, Jul./Aug. 1993.
Li-Xin Wang, "Analysis and Design of Hierarchical Fuzzy Systems," IEEE Transactions on Fuzzy Systems, V. 7, No. 5, Oct. 1999, pp. 617-624.
Di Wang, Xiao-Jun Zeng and John A. Keane, "A Survey of Hierarchical Fuzzy Systems (Invited Paper)," International Journal of Computational Cognition, V. 4, No. 1, 2006, pp. 18-29.
S. Bolognani and M. ZiglIoTto, "Hardware and Software Effective Configurations for Multi-Input Fuzzy Logic Controllers," IEEE Transactions on Fuzzy Systems, V. 6, No. 1, Feb. 1998, pp. 173-179.
F. Cheong and R. Lai, "Designing a Hierarchical Fuzzy Controller Using Differential Evolution," IEEE International Fuzzy Systems Conference Proceedings, Seoul Korea, Aug. 22-25, 1999, pp. 1-277 to 1-282.
Elike Hodo, et. al., "Threat analysis of IoT networks using artificial neural network intrusion detection system," International Symposium on Networks, Computers and Communications (ISNCC), May 2016.
Xiaoyu Sun, et. al., "Low-VDD Operation of SRAM Synaptic Array for Implementing Ternary Neural Network," IEEE Transactions on very Large Scale Integration (VLSI) systems, V. 25, No. 10, OCT. 2017, pp. 262-265.
E. De Coninck, et. al., "Distributed Neural Networks for Internet of Things: The Big-Little Approach," from book Internet of Things—IoT Infrastructures: Second International Summit, IoT 360°, Rome, Italy, Oct. 27-29, 2015, pp. 484-492.
F. Chung and J. Duan, "On Multistage Fuzzy Neural Network Modeling," IEEE Transactions on Fuzzy Systems, vol. 8, No. 2, Apr. 2000, pp. 125-142.
M. Chi, et.al., "Big Data for Remote Sensing: Challenges and Opportunities," IEEE Proceedings, VI. 104, No. 11, Nov. 2016, pp. 2207-2219.
M. Frustaci et. al., "Evaluating Critical Security Issues of the IoT World: Present and future challenges," IEEE Internet of Things Journal, Aug. 2018, pp. 2483-2495.
Kuo et al; Active Noice Control: A Tutorial Review; Proceedings of the IEEE, vol. 87, No. 6; 31 pages; Jun. 1999; IEEE; US.
Banerjee et al. ("Clinical Evaluation of Generative Model Based Monitoring and Comparison with Compressive Sensing"), Proceedings of the Conference on Wireless Health, Oct. 2015, No. 1, pp. 1-8) (Year: 2015).
Mardini et al. ("Messenger Bot for IoT devices", ICIME 2017, Oct. 9-11, 2017, pp. 182-186) (Year: 2017).
Ullah et al. (5G Communication: An Overview of Vehicle-to-Everything, Drones, and Healthcare Use-Cases, IEEE Access, vol. 7, 2019, Apr. 3, 2019, pp. 37251-37268) (Year: 2019).
Jennifer Hughes ("Therapeutic Listening Communication in Children with Autism and Hyperacusis", San Jose State University, SJSU ScholarWorks, May 2016, pp. 1-72) (Year: 2016).
Haber et al. ("Application of Knowledge Based Systems for Supervision and Control of Machining Processes", Handbook of Software Engineering and Knowledge Engineering: vol. II: Emerging Technologies, 2002, pp. 1-43) (Year: 2002).
Pintu Chandra Shill ("Fuzzy Logic Controllers: Optimization Issues on Design and Rule Base Reduction Algorithms", Dissertaion University of Fukui, 2013, pp. 1-95) (Year: 2013).
Gopal Singh Jamnal ("A Cognitive IoE (Internet of Everything Approach to Ambient-Intelligent Smart Space", Dissertation, Edinburgh Napier University, School of Computing, Jan. 2019, pp. 1-170) (Year: 2019).

* cited by examiner

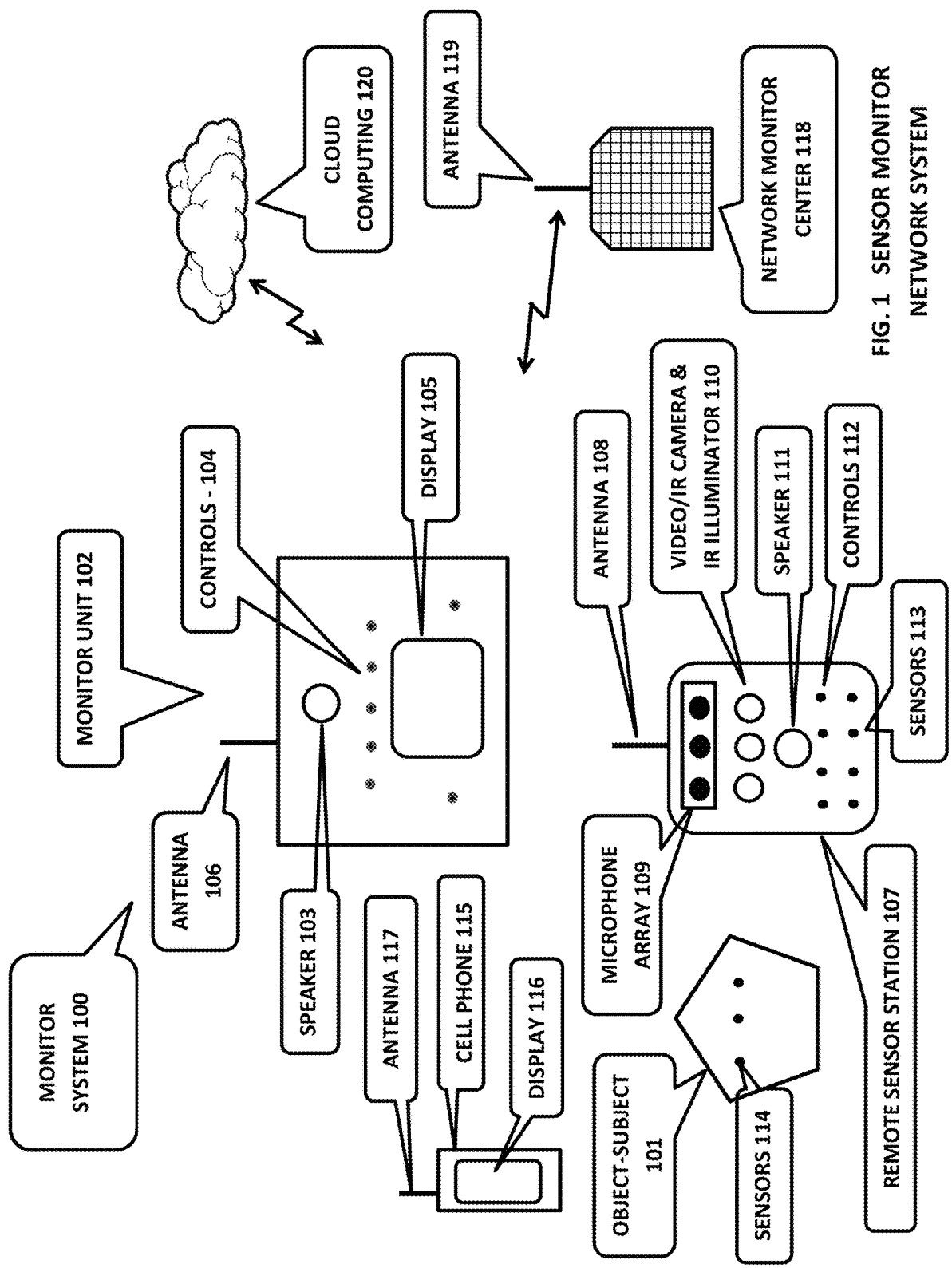
FIG. 1 SENSOR MONITOR NETWORK SYSTEM

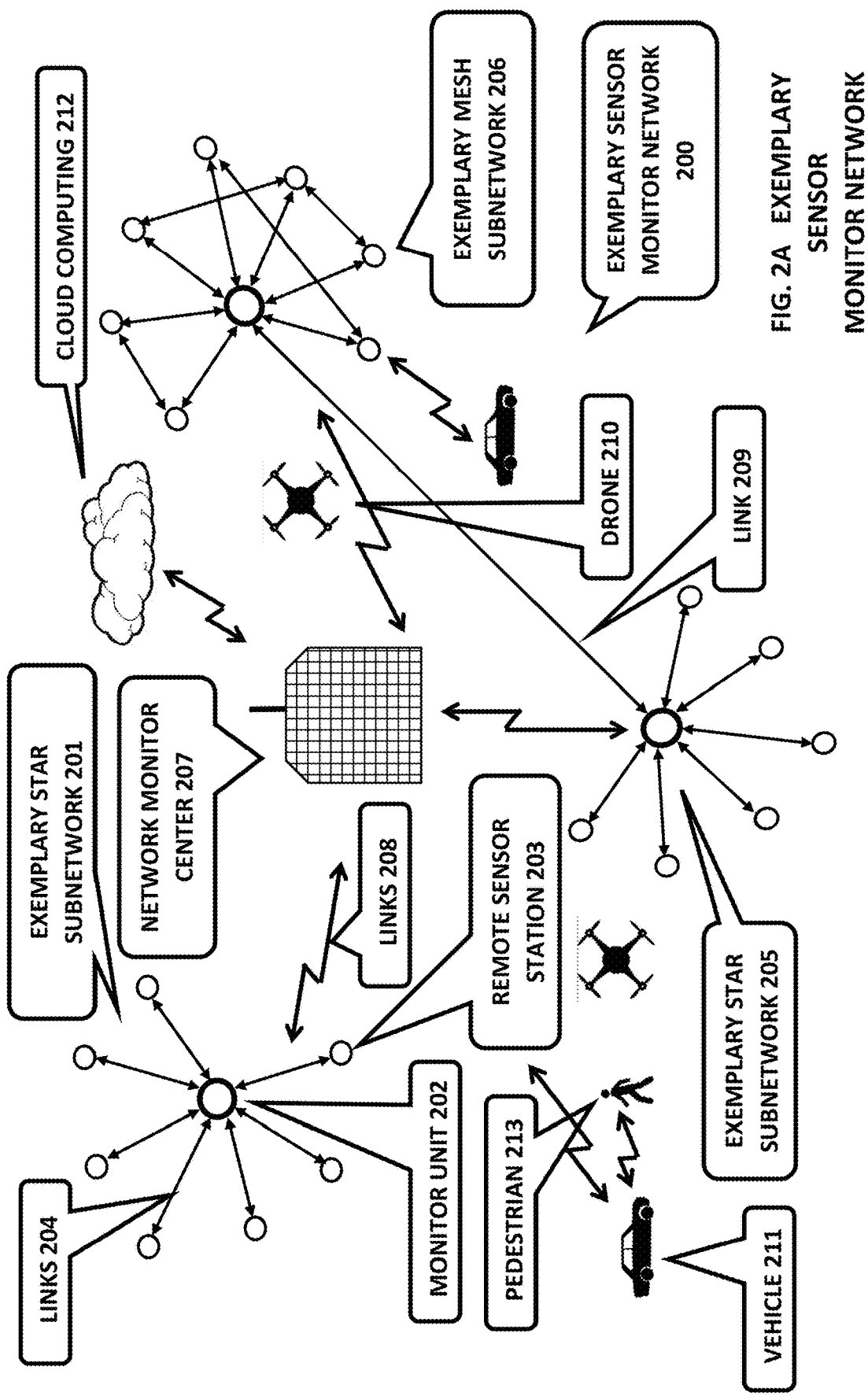
FIG. 2A EXEMPLARY SENSOR MONITOR NETWORK

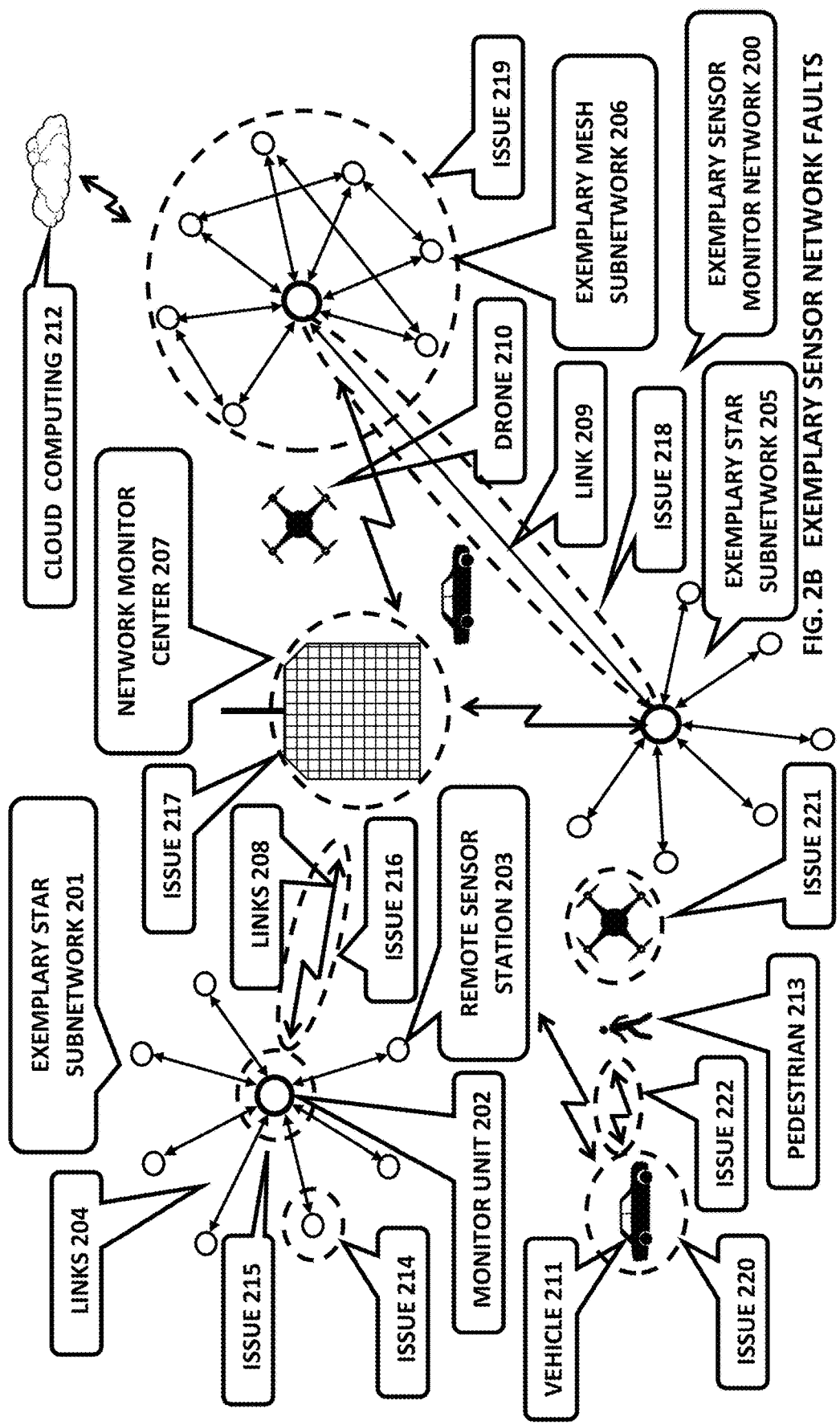
FIG. 2B EXEMPLARY SENSOR NETWORK FAULTS

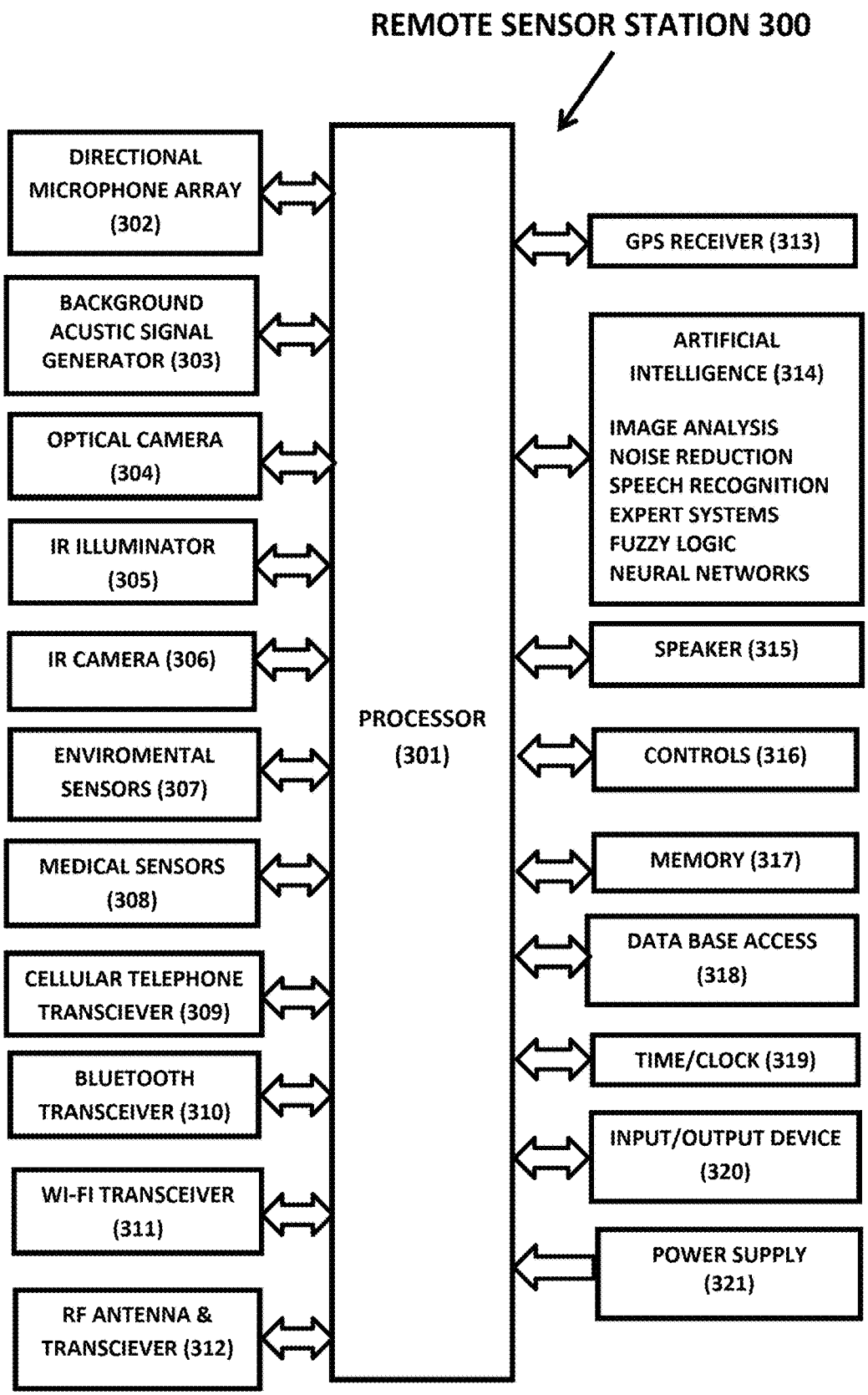
FIG. 3 REMOTE SENSOR STATION

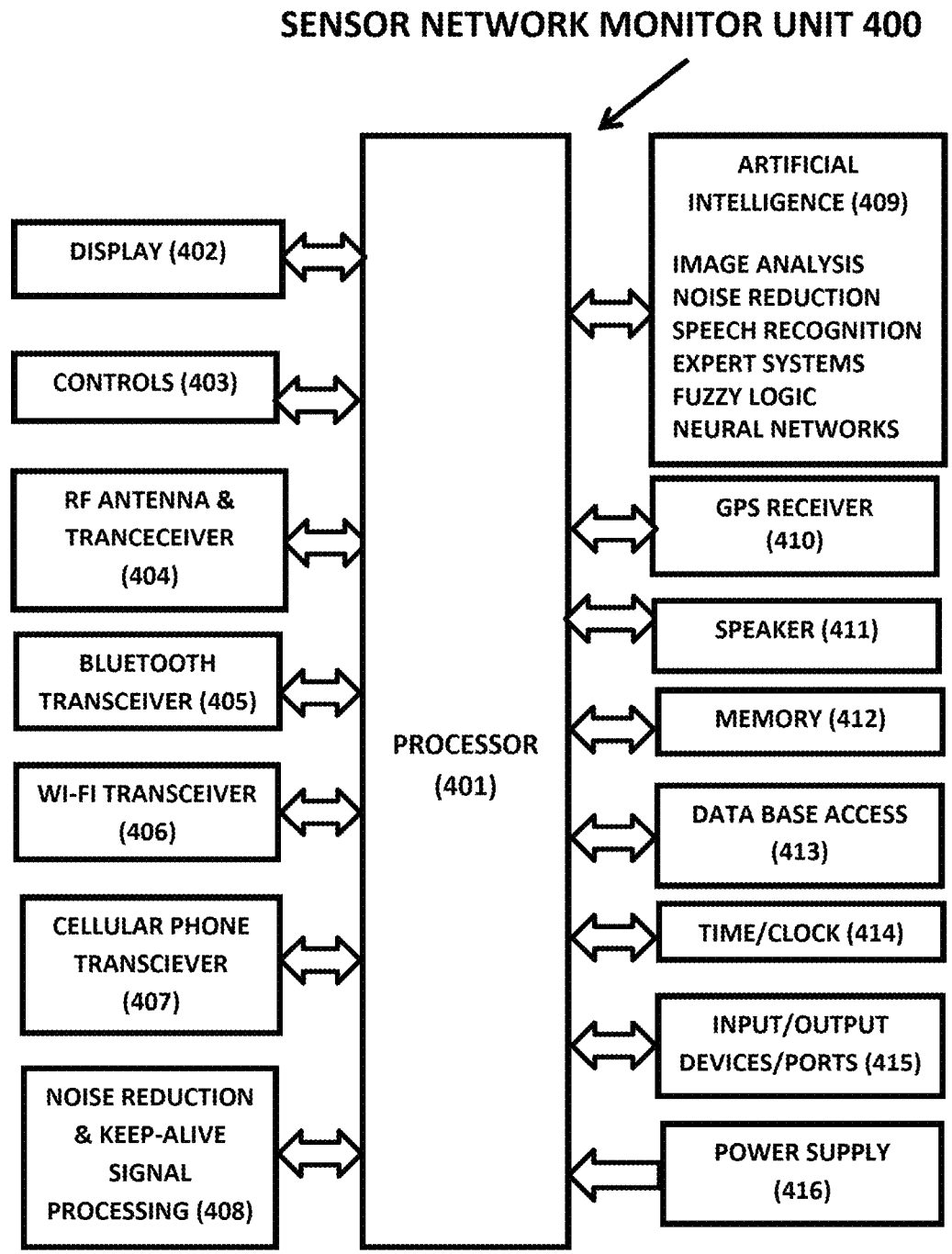
FIG. 4 SENSOR NETWORK MONITOR UNIT

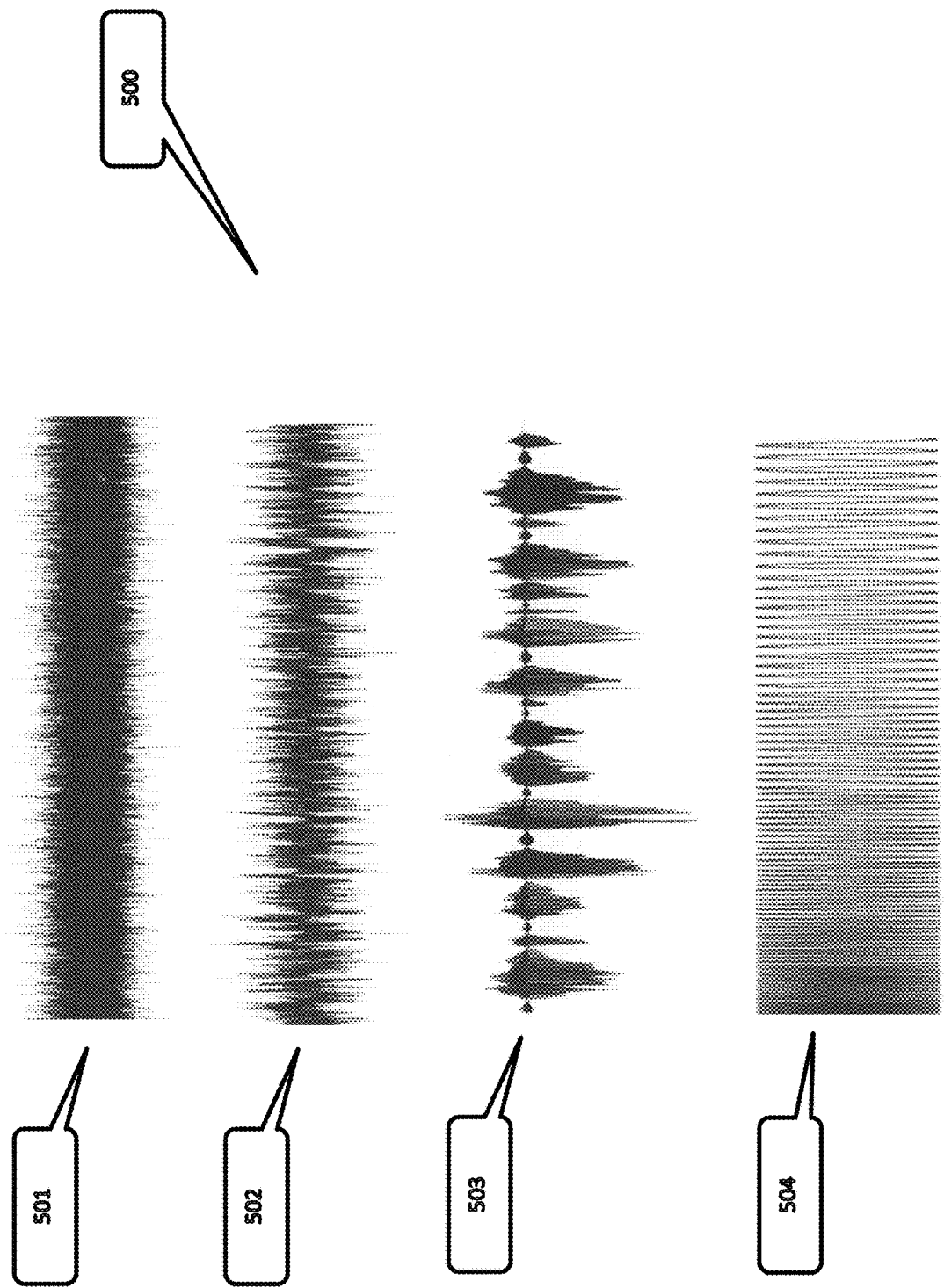
FIG. 5 EXEMPLARY AUDIO SIGNALS

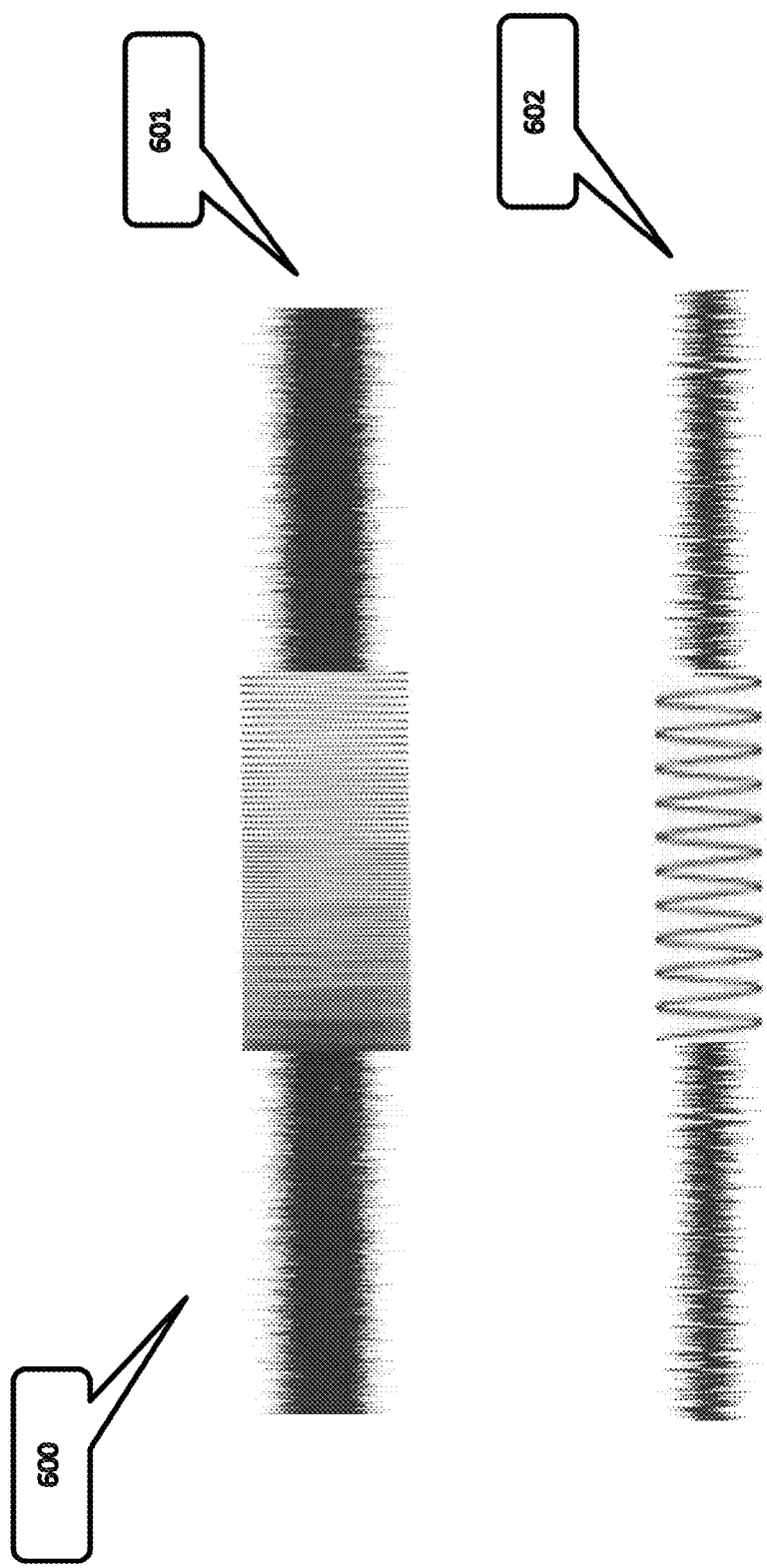
FIG. 6 EXEMPLARY COMPOSITE SIGNALS

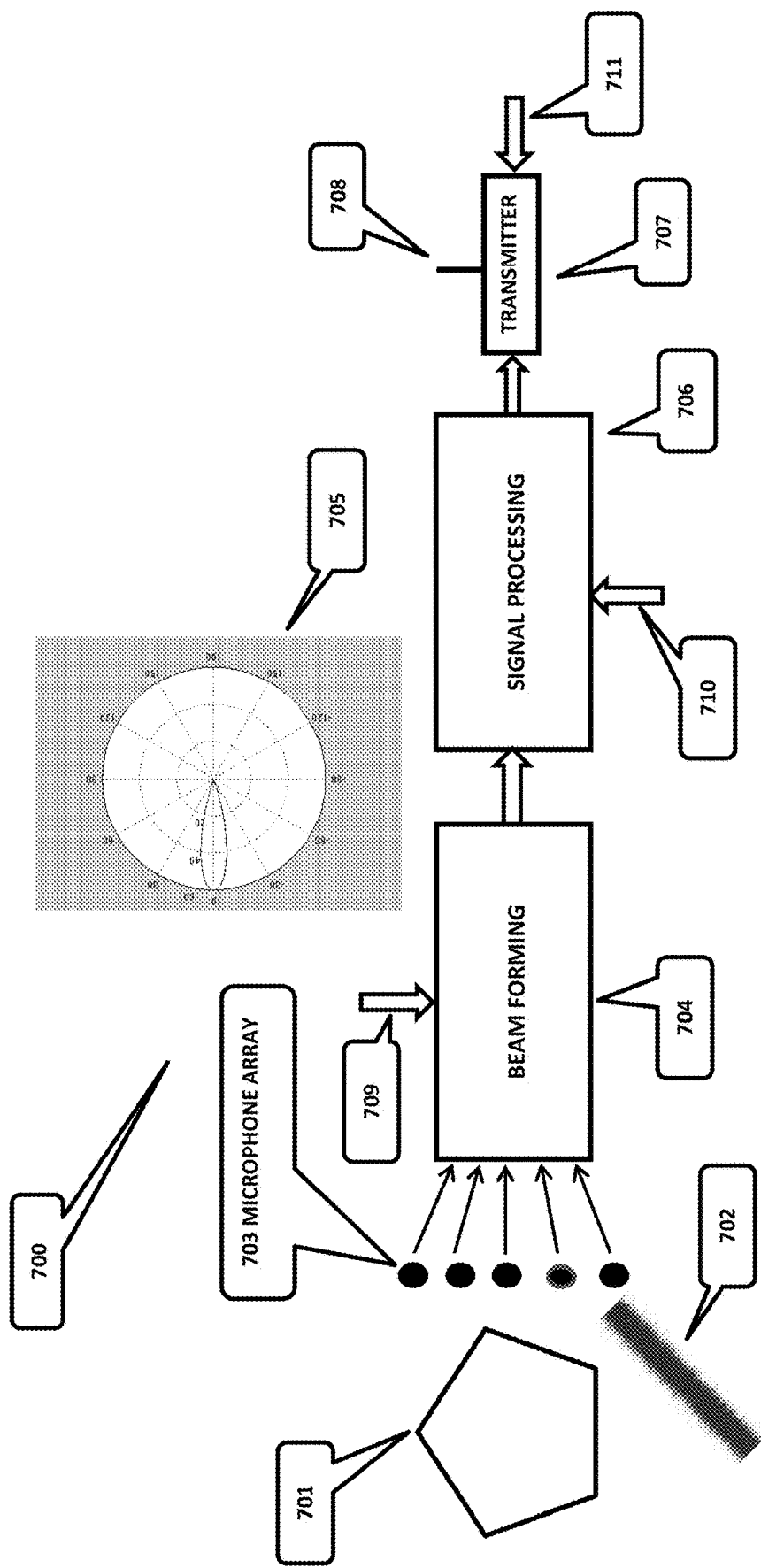
FIG. 7 ACUSTIC SPATIAL BEAMFORMING - NOISE CANCELLATION

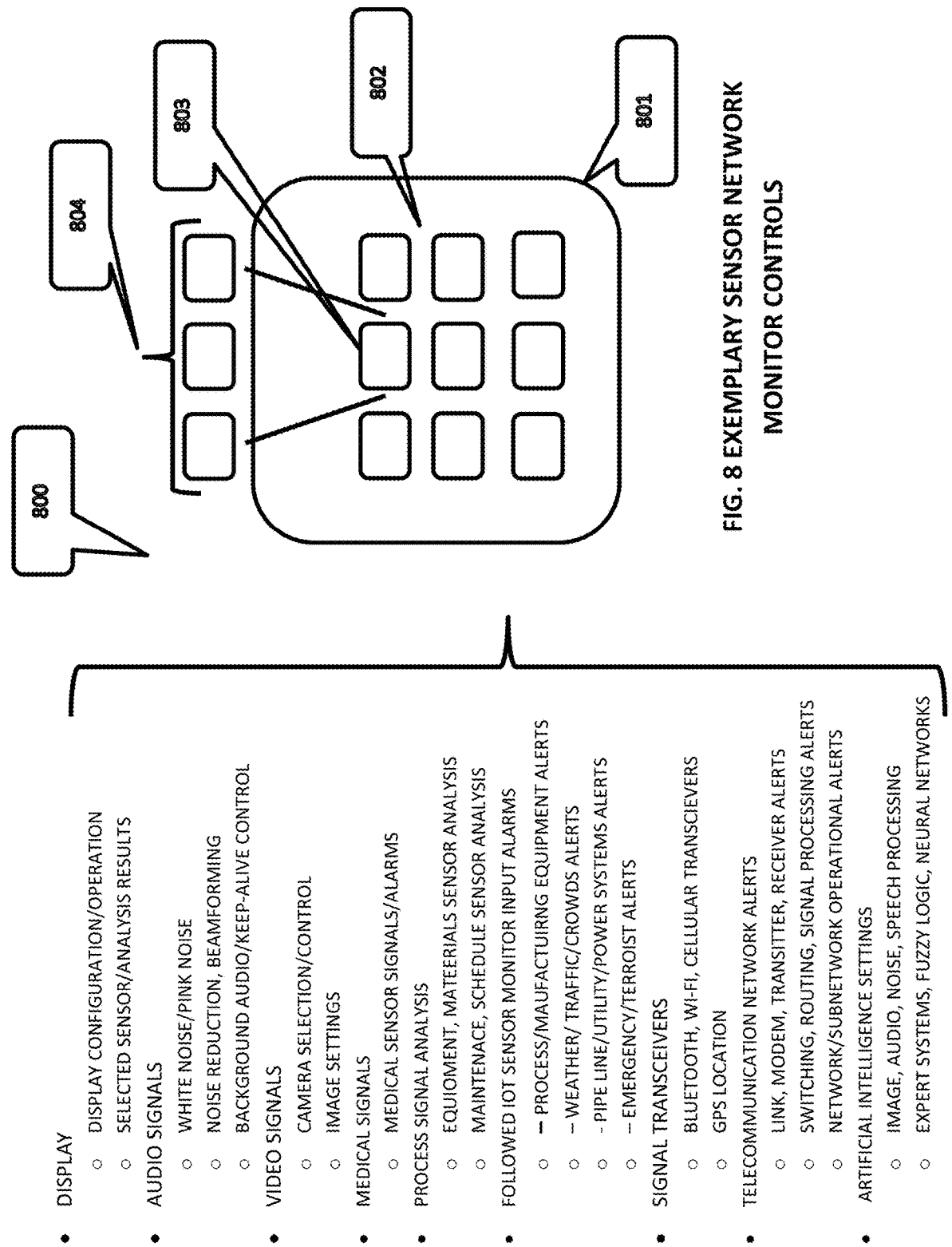
FIG. 8 EXEMPLARY SENSOR NETWORK MONITOR CONTROLS

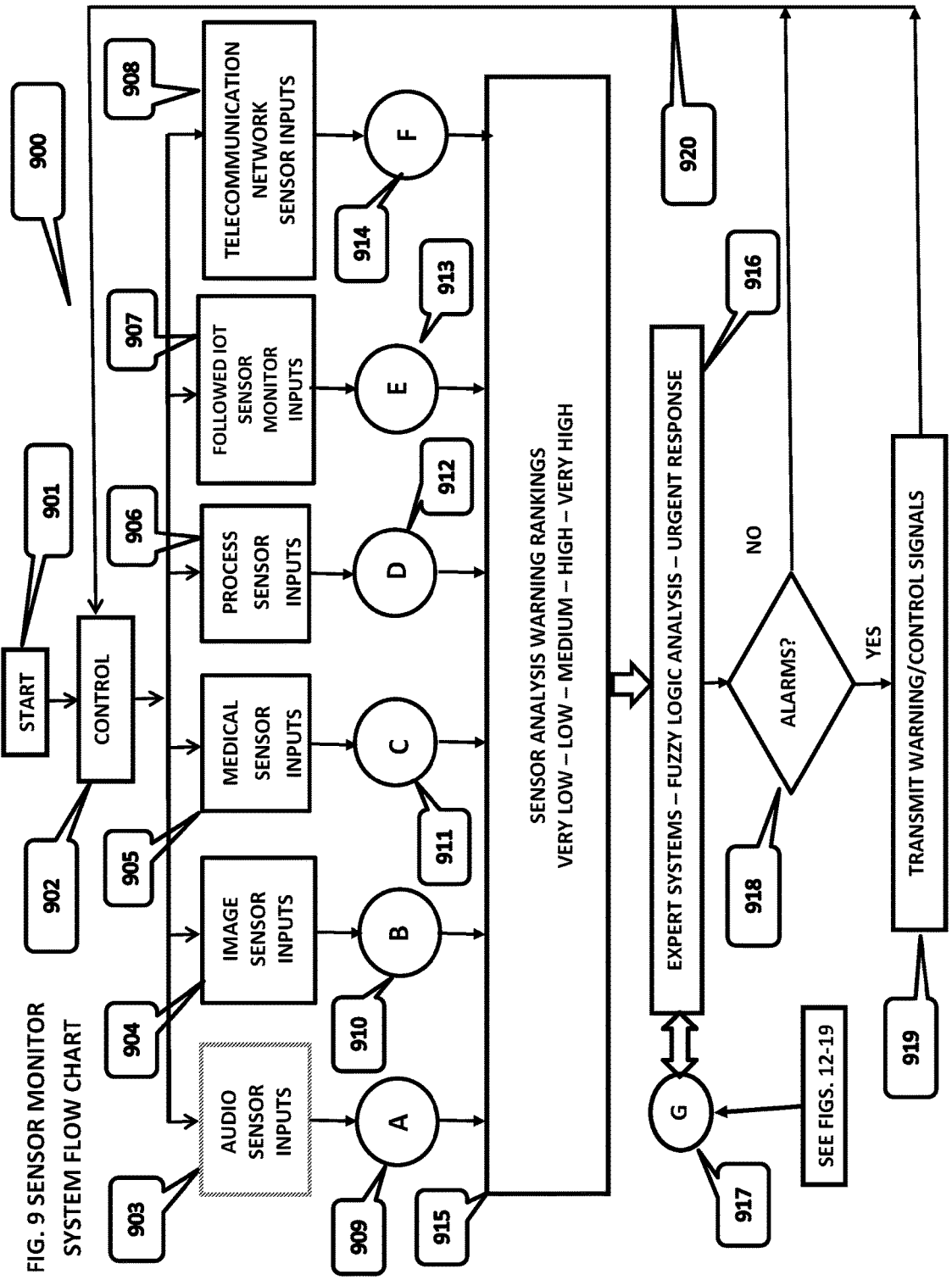

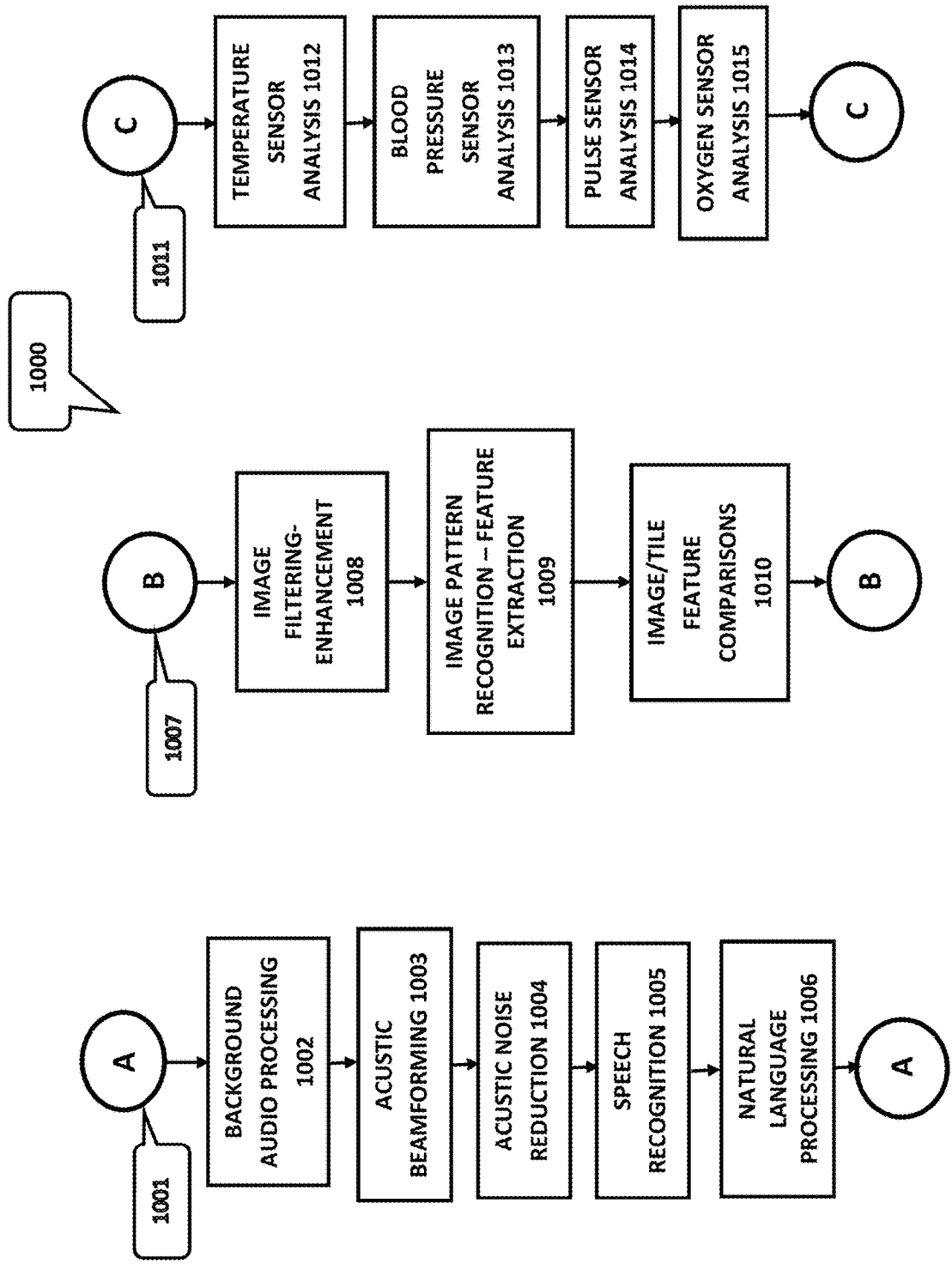
FIG. 10A SENSOR SIGNAL ANALYSIS

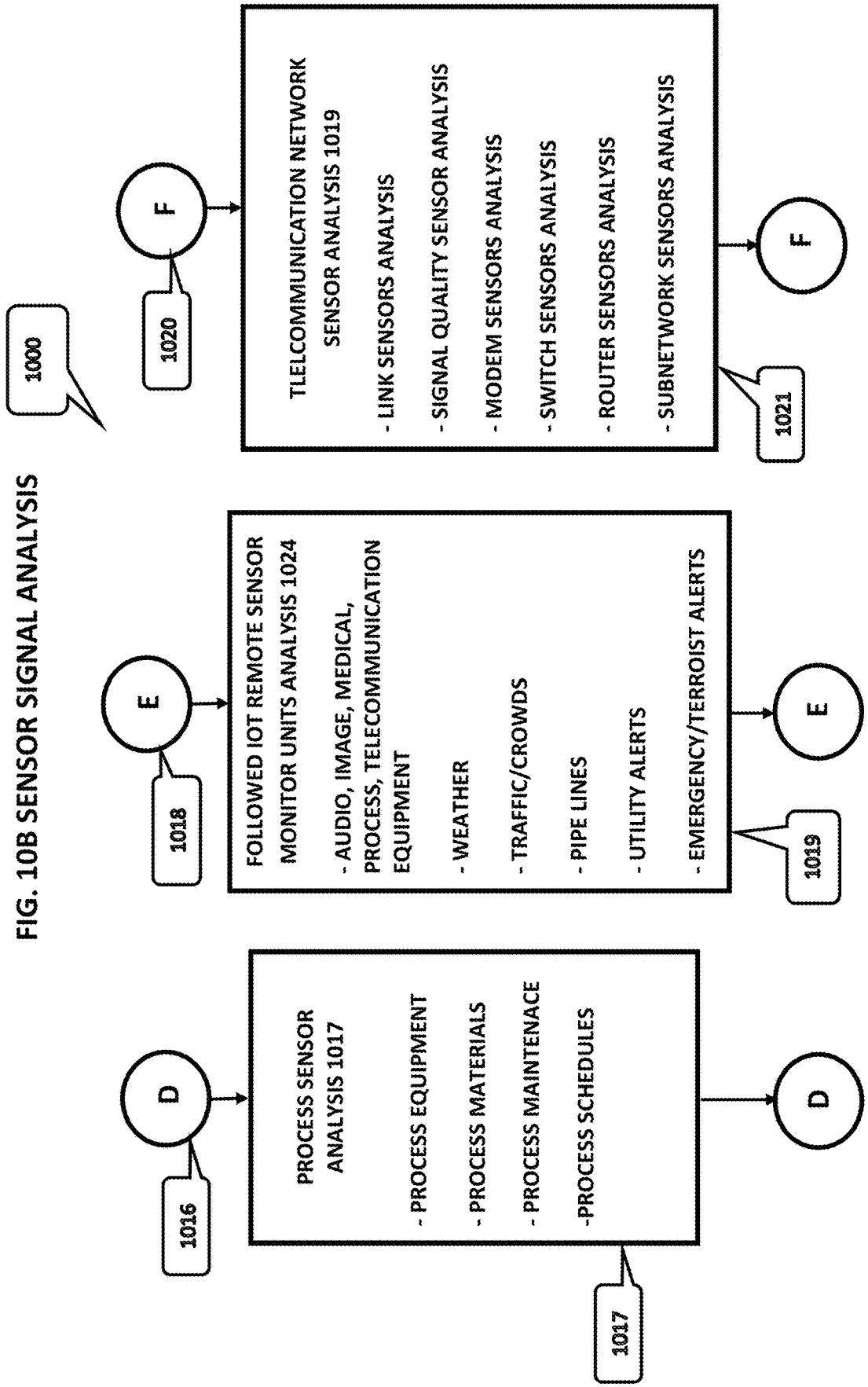
FIG. 10B SENSOR SIGNAL ANALYSIS

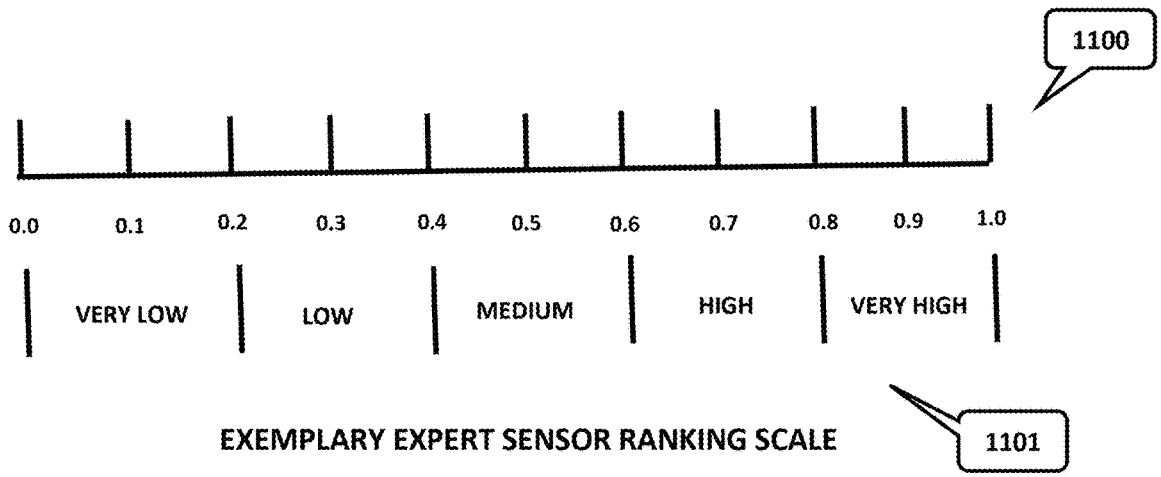

EXEMPLARY EXPERT SENSOR RANKING SCALE

AUDIO SENSOR ANALYSIS:
- KEY WORDS/PHRASES RANK FOR IMPORTANCE FROM 0.0 TO 1
- AI WORD RECOGNITION AND PHRASE RECOGNITION – NATURAL LANGUAGE PROCESSING RANK FOR IMPORTANCE FROM 0.0 TO 1

IMAGE SENSOR ANALYSIS:
- VIDEO/IMAGE COMPARISONS COMARED TO EXPECTED STANDARD RANKED FROM 0.0 TO 1.0
- IMAGE PROCESSING RANKED FROM 0.0 TO 1.0

MEDICAL SENSOR ANALYSIS:
- TEMPERATURE SENSOR RANKING FROM 0.0 TO 1
- BLOOD PRESSURE SENSOR RANKING FROM 0.0 TO 1
- PULSE RATE SENSOR RANKING FROM 0.0 TO 1
- OXYGEN SENSOR RANKING FROM 0.0 TO 1

PROCESS EQUIPMENT SENSOR INPUTS
- PROCESS EQUIPMENT SENSOR RANKING FROM 0.0 TO 1
- PROCESS MATERIAL SENSOR RANKING FROM 0.0 TO 1
- PROCESS MAINTENANCE SENSOR RANKING FROM 0.0 TO 1
- PROCESS SCHEDULES RANKING FROM 0.0 TO 1

FOLLOWED IOT SENSOR REMOTE SENSOR INPUTS
- FOLLOWED IOT STATION AND MONITOR RANKINGS FROM 0.0 TO 1
- WEATHER RANKING FROM 0.0 TO 1
- TRAFFIC/CROWDS RANKING FROM 0.0 TO 1
- PIPE LINES/UTILITIES RANKING FROM 0.0 TO 1
- EMERGENCY/TERROIST ALERTS RANKING FROM 0.0 TO 1

TELECOMMUNICATION SENSOR ANALYSIS:
- COMMUNICATION ERROR RATE – SIGNAL TO NOISE RATIO RANKING FROM 0.0 TO 1
- TRAFFIC CONGESTION DELAYS RANKING FROM 0.0 TO 1
- LACK OF RESPONSE RANKING FROM 0.0 TO 1
- REPORTED LINK OUTAGES RANKING FROM 0.0 TO 1
- REPORTED PROCESSING NODE OUTAGES RANKING FROM 0.0 TO 1
- REPORTED STORAGE NODE OUTAGES RANKING FROM 0.0 TO 1
- REPORTED SUBNETWORK OUTAGE RANKING FROM 0.0 TO 1

FIG. 11 EXPERT SYSTEM SENSOR SIGNAL ANALYSIS AND RANKING

FIG. 12A SENSOR NETWORK AUDIO/VIDEO (AV) SIGNAL ANALYSIS – SYMETRIC CONDITIONAL LOGIC

| VIDEO \ AUDIO | VERY LOW DANGER | LOW DANGER | MEDIUM DANGER | HIGH DANGER | VERY HIGH DANGER |
|---|---|---|---|---|---|
| VERY LOW DANGER | VERY LOW | LOW | MEDIUM | HIGH | VERY HIGH |
| LOW DANGER | LOW | LOW | MEDIUM | HIGH | VERY HIGH |
| MEDIUM DANGER | MEDIUM | MEDIUM | MEDIUM | HIGH | VERY HIGH |
| HIGH DANGER | HIGH | HIGH | HIGH | HIGH | VERY HIGH |
| VERY HIGH DANGER | VERY HIGH | VERY HIGH | VERY HIGH | VERY HIGH | VERY HIGH |

1200

| IMAGE \ AUDIO | VERY LOW DANGER | LOW DANGER | MEDIUM DANGER | HIGH DANGER | VERY HIGH DANGER |
|---|---|---|---|---|---|
| VERY LOW DANGER | VERY LOW | LOW | MEDIUM | HIGH | VERY HIGH |
| LOW DANGER | LOW | LOW | MEDIUM | HIGH | VERY HIGH |
| MEDIUM DANGER | LOW | MEDIUM | HIGH | HIGH | VERY HIGH |
| HIGH DANGER | MEDIUM | MEDIUM | HIGH | VERY HIGH | VERY HIGH |
| VERY HIGH DANGER | HIGH | HIGH | VERY HIGH | VERY HIGH | VERY HIGH |

1201

FIG. 12B SENSOR NETWORK AUDIO/VIDEO (AV) SIGNAL ANALYSIS – ASSYMETRICAL EXPERT RULES

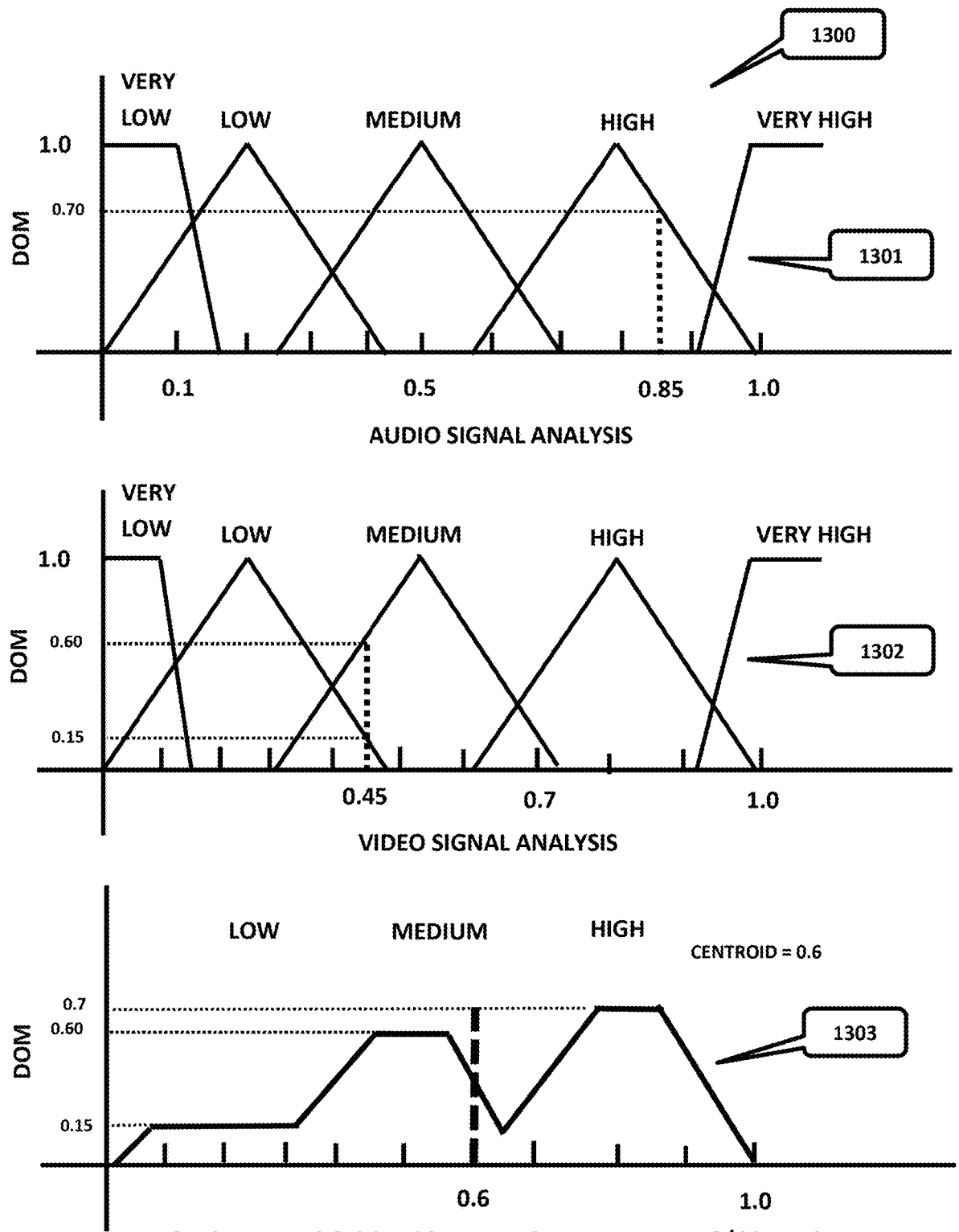
FIG. 13 FUZZY LOGIC SENSOR NETWORK AV WARNING/CONTROL INDEX ANALYSIS

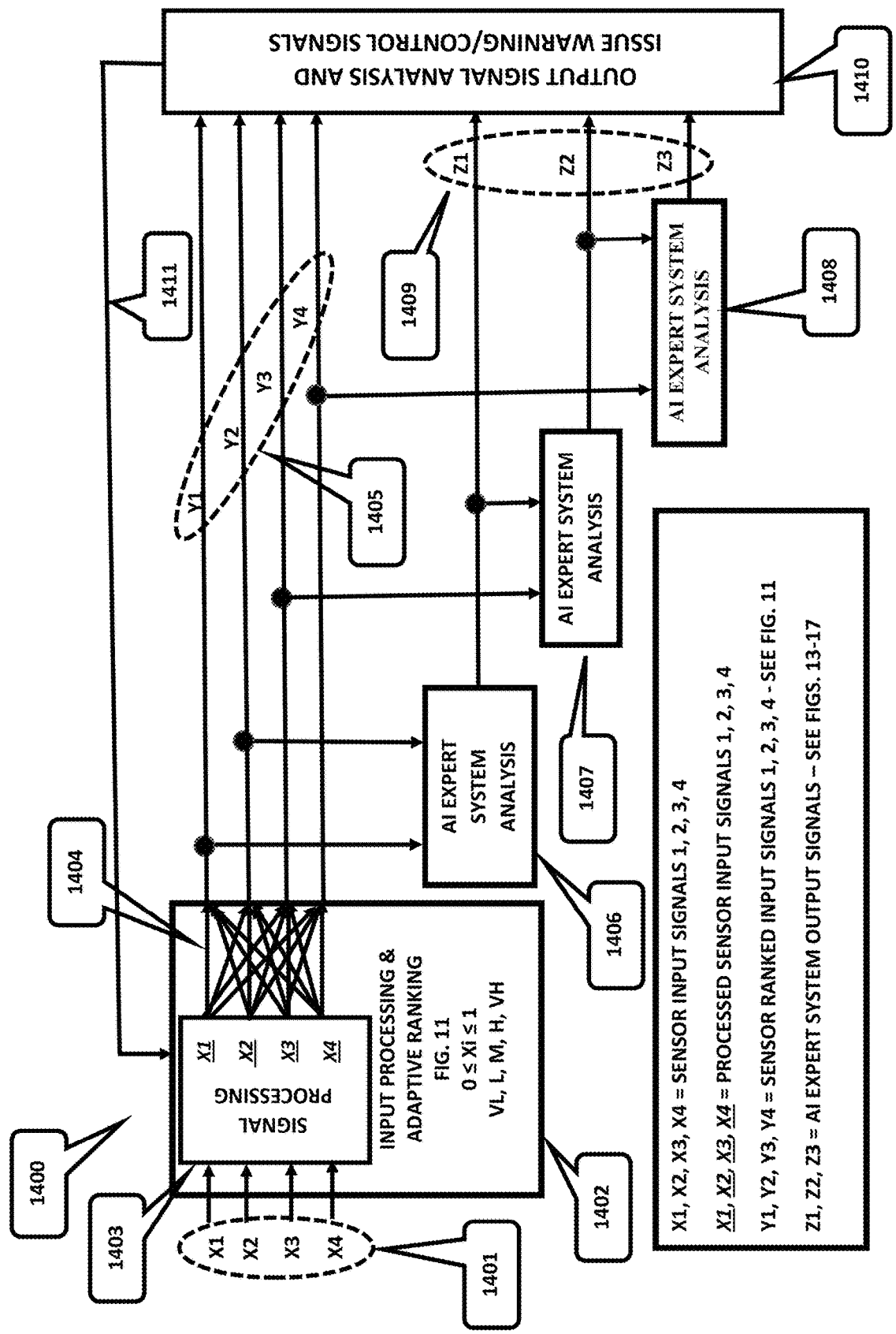
FIG. 14 MIMO ADAPTIVE HIERARCHICAL AI EXPERT SYSTEM OPERATIONS

| AUDIO-VIDEO / MEDICAL | VERY LOW DANGER | LOW DANGER | MEDIUM DANGER | HIGH DANGER | VERY HIGH DANGER |
|---|---|---|---|---|---|
| VERY LOW DANGER | VERY LOW | LOW | MEDIUM | HIGH | VERY HIGH |
| LOW DANGER | LOW | LOW | MEDIUM | HIGH | VERY HIGH |
| MEDIUM DANGER | MEDIUM | MEDIUM | HIGH | VERY HIGH | VERY HIGH |
| HIGH DANGER | HIGH | HIGH | VERY HIGH | VERY HIGH | VERY HIGH |
| VERY HIGH DANGER | VERY HIGH | VERY HIGH | VERY HIGH | VERY HIGH | VERY HIGH |

FIG. 15 SENSOR NETWORK AUDIO-VIDEO MEDICAL (AVM) HIERARCHICAL SIGNAL ANALYSIS

FIG. 16 SENSOR NETWORK AUDIO-VIDEO- MEDICAL PROCESS (AVMP) HIERARCHICAL SIGNAL ANALYSIS

1600

| PROCESS \ AVM | VERY LOW DANGER | LOW DANGER | MEDIUM DANGER | HIGH DANGER | VERY HIGH DANGER |
|---|---|---|---|---|---|
| VERY LOW DANGER | VERY LOW | LOW | MEDIUM | HIGH | VERY HIGH |
| LOW DANGER | LOW | LOW | MEDIUM | HIGH | VERY HIGH |
| MEDIUM DANGER | MEDIUM | MEDIUM | HIGH | HIGH | VERY HIGH |
| HIGH DANGER | HIGH | HIGH | VERY HIGH | VERY HIGH | VERY HIGH |
| VERY HIGH DANGER | VERY HIGH | VERY HIGH | VERY HIGH | VERY HIGH | VERY HIGH |

FIG. 17 SENSOR NETWORK AUDIO-VIDEO- MEDICAL-PROCESS-FOLLOWED HIERARCHICAL (AVMPF) IOT SENSOR SIGNAL ANALYSIS

1700

| AVMP / FOLLOWED | VERY LOW DANGER | LOW DANGER | MEDIUM DANGER | HIGH DANGER | VERY HIGH DANGER |
|---|---|---|---|---|---|
| VERY LOW DANGER | VERY LOW | LOW | MEDIUM | HIGH | VERY HIGH |
| LOW DANGER | LOW | LOW | MEDIUM | HIGH | VERY HIGH |
| MEDIUM DANGER | MEDIUM | MEDIUM | HIGH | VERY HIGH | VERY HIGH |
| HIGH DANGER | HIGH | HIGH | VERY HIGH | VERY HIGH | VERY HIGH |
| VERY HIGH DANGER | VERY HIGH | VERY HIGH | VERY HIGH | VERY HIGH | VERY HIGH |

FIG. 18 SENSOR NETWORK AUDIO-VIDEO- MEDICAL-PROCESS-FOLLOWED TELECOMUNICATION (AVMPFT) IOT SENSOR – SIGNAL ANALYSIS

1800

| TELECOM \ AVMPF | VERY LOW DANGER | LOW DANGER | MEDIUM DANGER | HIGH DANGER | VERY HIGH DANGER |
|---|---|---|---|---|---|
| VERY LOW DANGER | VERY LOW | LOW | MEDIUM | HIGH | VERY HIGH |
| LOW DANGER | LOW | LOW | MEDIUM | HIGH | VERY HIGH |
| MEDIUM DANGER | MEDIUM | MEDIUM | HIGH | VERY HIGH | VERY HIGH |
| HIGH DANGER | HIGH | HIGH | VERY HIGH | VERY HIGH | VERY HIGH |
| VERY HIGH DANGER | VERY HIGH | VERY HIGH | VERY HIGH | VERY HIGH | VERY HIGH |

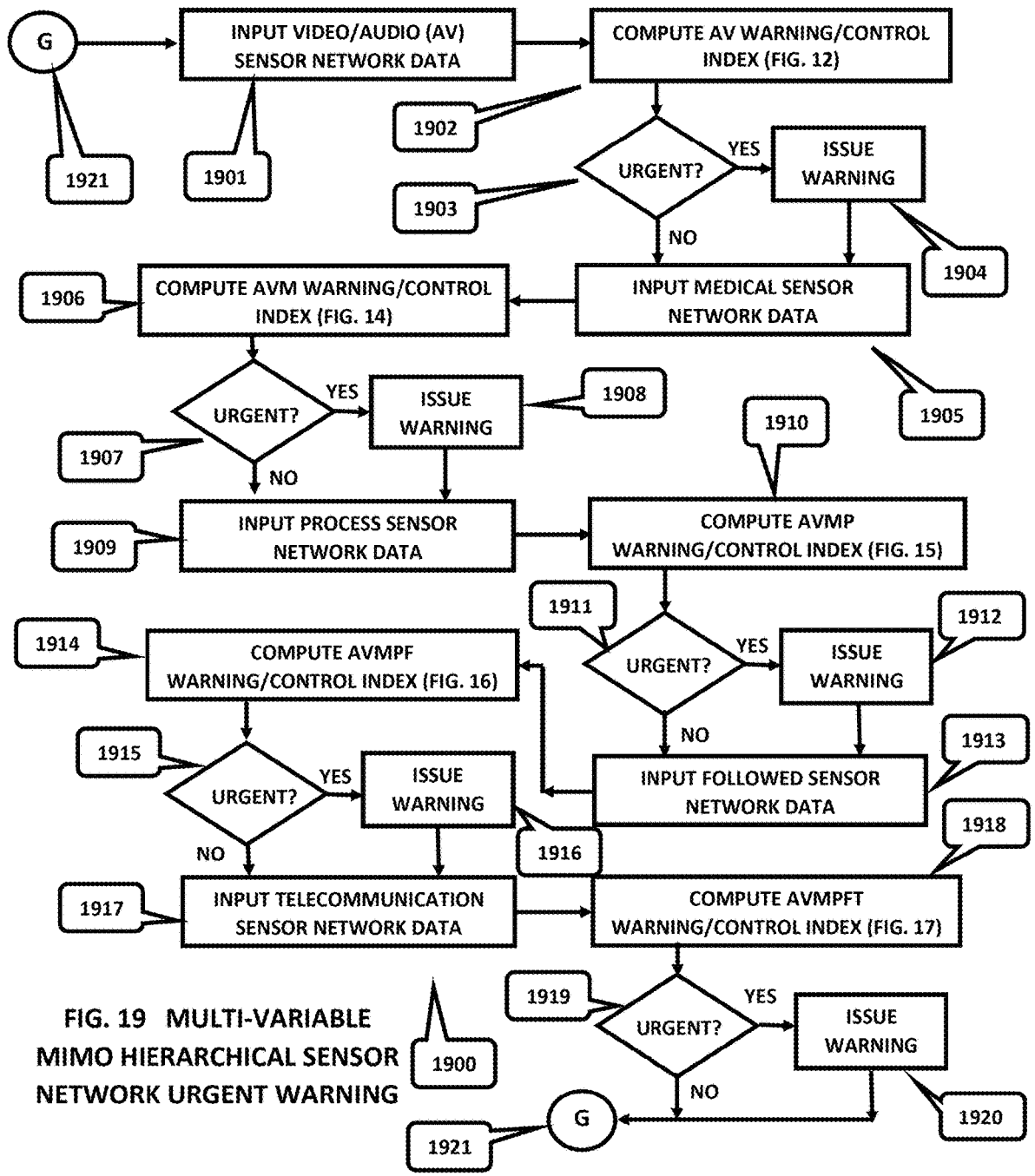
FIG. 19 MULTI-VARIABLE MIMO HIERARCHICAL SENSOR NETWORK URGENT WARNING

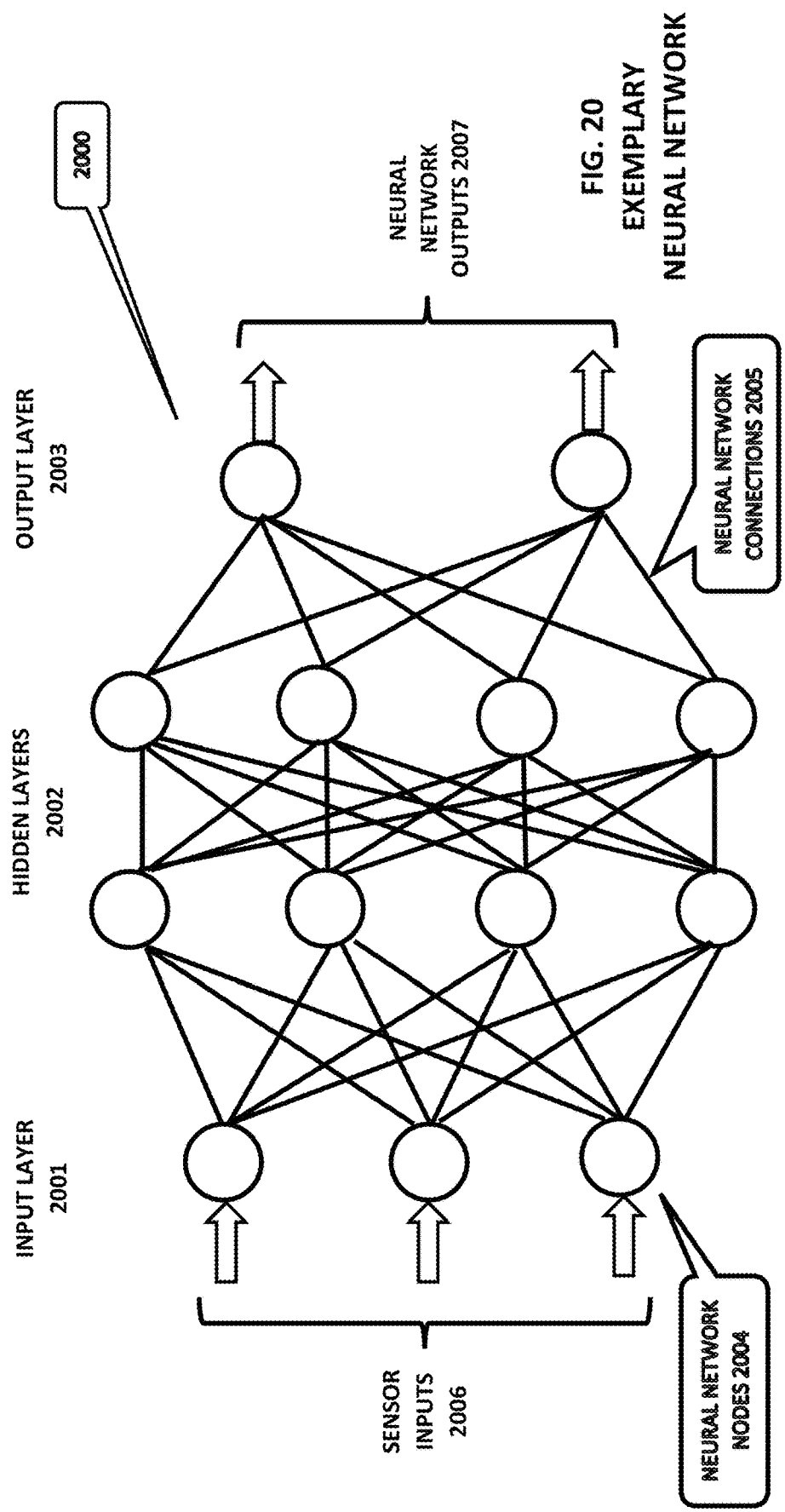

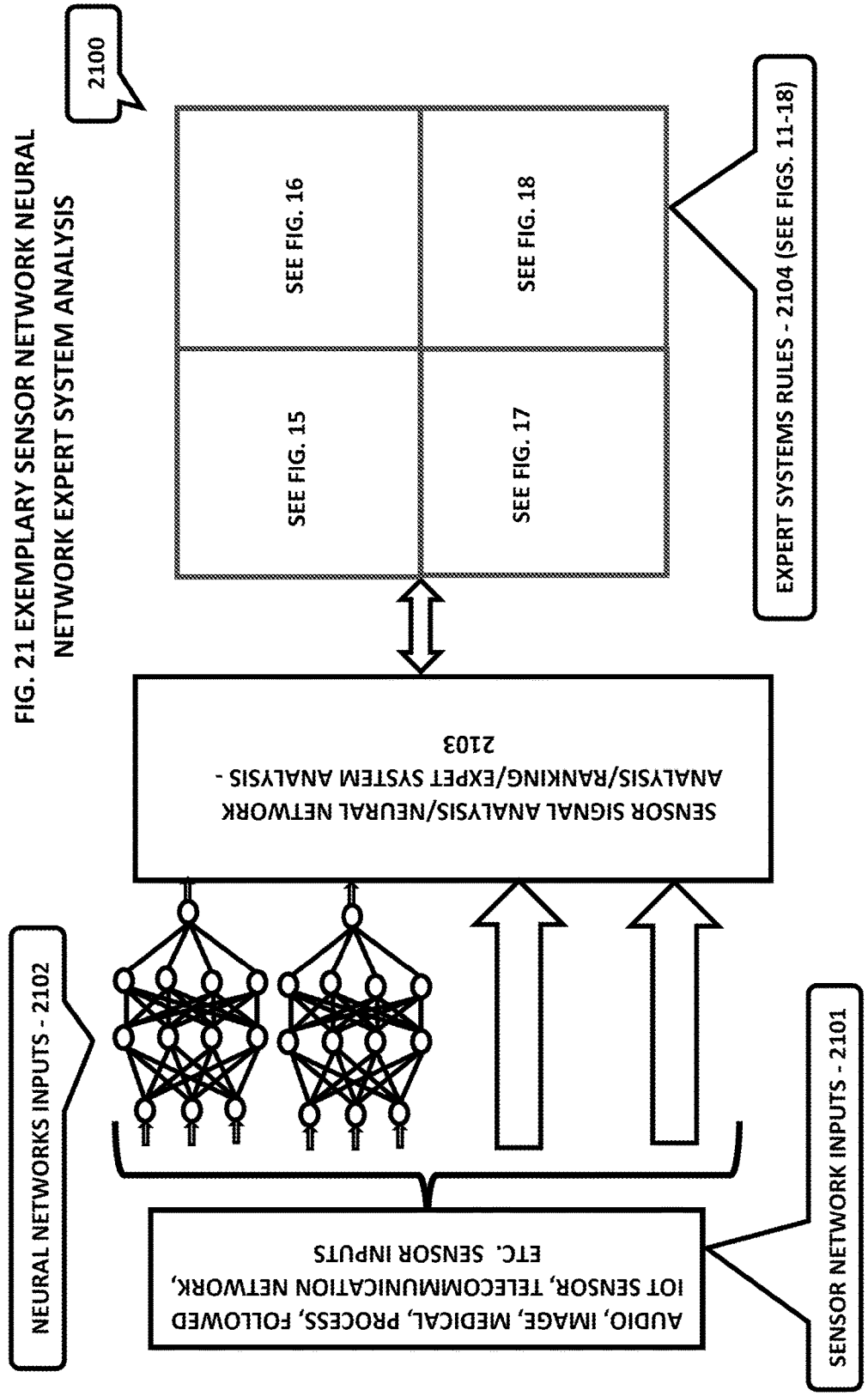

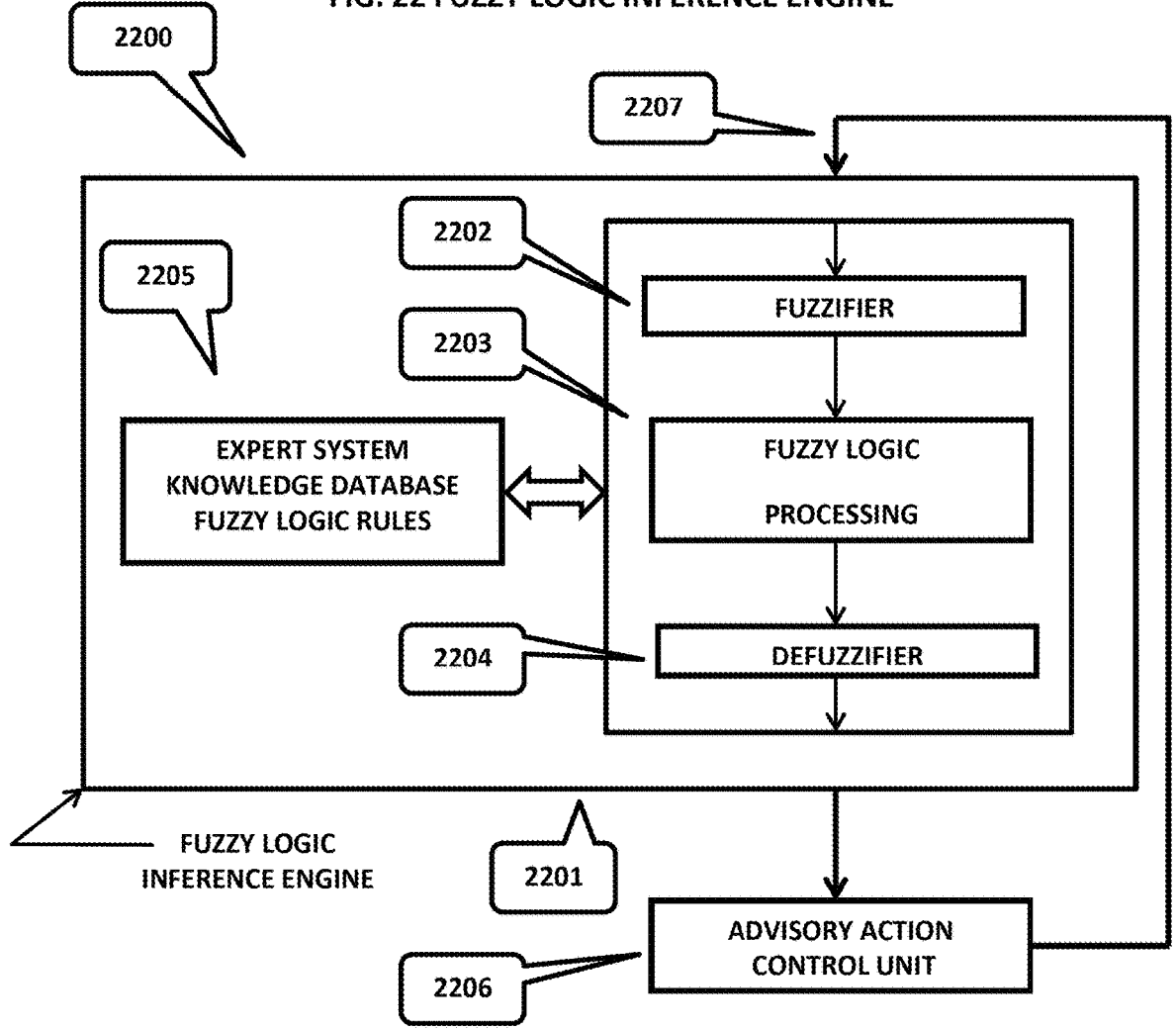

INTERNET OF THINGS (IOT) BIG DATA ARTIFICIAL INTELLIGENCE EXPERT SYSTEM INFORMATION MANAGEMENT AND CONTROL SYSTEMS AND METHODS

CROSS-REFERENCE TO RELATED APPLICATIONS

This application is a continuation of U.S. Ser. No. 17/555,038 filed Dec. 17, 2021, which is a continuation of Ser. No. 17/183,653 filed on Feb. 24, 2021, which is a continuation of Ser. No. 16/412,383 filed on May 14, 2019 entitled IOT Sensor Network Artificial Intelligence Warning, Control and Monitoring Systems And Methods, all of which are incorporated herein by reference.

BACKGROUND OF THE INVENTION

The Internet of Things (IOT) is a network of physical devices or objects ("things") monitored and/or controlled by distributed sensors, controllers, processors and storage devices interconnected by the Internet. The physical devices or objects may include, for example: materials, objects, persons, areas, terrestrial or air-borne vehicles, appliances, manufacturing or process tools, environments, pipe lines, power generation and/or delivery systems, telecommunications equipment, processors and/or storage devices, or other devices or objects for which collected information and/or automated control is important for considerations such as safety, personal health or well-being, security, operational efficiency, information exchange, data processing and data storage.

The importance and magnitude of the IOT cannot be overstated. It has been estimated that the number of devices connected to the IOT may exceed 20 Billion or more by 2020. The total annual revenues for vendors of hardware, software and IOT solutions has been estimated to exceed $470B by 2020 (See, for example, Louis Columbus, "Roundup of Internet of Things Forecasts and Market Estimates," Forbes, Nov. 27, 2016.) Efficient management and control of such massive networks is of critical importance. This invention addresses improved performance and operation of such IOT systems and methods providing Artificial Intelligence (AI) integrated and comprehensive overall network operational monitoring systems and methods. Network sensors, controllers, telecommunication network resources and processing and data storage resources are included in the systems and methods of this invention.

A critical concern is management of the massive amounts of data collected from billions of sensors implemented throughout the IOT. Modem technology is being employed to amass this data in distributed computer and data storage systems including "cloud" based systems. The massive data bases being assembled are often referred to "Big Data."

Big data has been defined as voluminous and complex data sets. Often traditional data-processing application software are inadequate to deal with Big Data. Challenges include capturing data, data storage, data analysis, search, sharing, transfer, visualization, querying, updating, information privacy and data source access. Managing and making efficient use of such Big Data is a challenge to system designers.

One aspect of the present invention is to provide such Big Data efficient data management and use systems and methods based on artificial intelligence, expert systems, fuzzy logic and hierarchical and adaptive expert and fuzzy system implementations. More particularly, the systems and methods disclosed herein provide efficient and powerful derivation of IOT warning and control signals directed to managing IOT network faults and potentially dangerous situations. It is also important that information provided be readily understandable and presented in a non-confusing format. In many cases, such readily understandable presentation may be critical to control and appropriate response to IOT situations being monitored.

While managing Big Data collected on centralized servers is important, the rapid advance in distributed processing can also alleviate centralized processing requirements. The present invention discloses artificial intelligence systems and methods implemented on a distributed network basis for performing local processing operations while also providing access to Big Data and cloud-based processing and data storage.

Sensors available to monitor operations in IOT networks include, for example, audio sensors, image sensors, medical sensors, location sensors, process control sensors and equipment sensors, magnetic sensors, micro-switches, proximity sensors, RFID (Radio Frequency Identification Devices) touch sensitive devices, force sensors such as strain gauges, optical sensors, infrared sensors, ultraviolet sensors, taste sensors, and environmental sensors including, for example, temperature sensors, humidity sensors, wind sensors and gas sensors.

An additional important consideration for proper operation of the IOT is the reliability of the backbone telecommunications network and remote data processing and storage facilities. Failure or congestion from over loading of these resources may negatively impact proper operation of the IOT resulting in, for example, loss of important information or lack of proper response to critical situations.

In addition to the above described sensor technology, important advances in various other technologies are available today to implement more powerful systems and methods for monitoring and/or control of IOT physical devices, situations and telecommunication network performance, Such technologies include, for example: advanced microprocessor; digital control; display technology; cloud computing and storage; computer technology; data storage software and programming languages; advanced radio signal transmission and reception including Wi-Fi, Bluetooth; near field communication (NFC); satellite communications; advanced telecommunications network technology including fiber optic transmission, switching and routing control systems and specialized antenna systems; drones; robotics and BOTs; audio signal processing and acoustical beam-forming; image signal generation and transmission; image signal analysis; speech recognition; speech-to-text conversion; text-to-speech conversion; natural language processing; electronic location determination; artificial intelligence; expert systems, fuzzy logic; neural networks; statistical signal analysis; network graph theory and modern control systems and theory. It is important that such monitoring systems and methods be accurate and simple to control and operate.

Monitoring systems and methods are used today to observe activities at remote locations. Such prior art monitoring systems and methods make use of remote monitoring units or sensors strategically placed in the area to be monitored. Remote sensors may include microphones, motion sensors, image sensors, location sensors, environmental sensors, medical sensors, equipment operational sensors, and the like. The signals from those sensors are transmitted to network monitoring stations.

Exemplary prior art activity monitoring systems and methods and selected technologies include the following:

C. W. Anderson, "Activity monitor," U.S. Pat. No. 8,743, 200, HiPass Design, Jun. 3, 2014, describing, inter alia, a system for monitoring a location using a sensor system and detecting and responding to "interesting events." The system may detect events based on video processing of a substantially live sequence of images from a video camera or using other sensors. Embodiments with smart phones and wireless networks are described.

Wen and Tran, "Patient Monitoring Apparatus," U.S. Pat. Nos. 7,420,472 and 7,502,498, Oct. 16, 2005 and Mar. 10, 2009, describing, inter alia, a system using one or more cameras to generate a 3D model of a person and to generate alarms based on dangerous situations determined from that model. Fuzzy Logic is mentioned. "Once trained, the data received by the server 20 can be appropriately scaled and processed by the statistical analyzer. In addition to statistical analyzers, the server 20 can process vital signs using rule-based inference engines, fuzzy logic, as well as conventional if-then logic. Additionally, the server can process vital signs using Hidden Markov Models (HMMs), dynamic time warping, or template matching, among others."

Ryley, et. al., "Wireless motion sensor using infrared illuminator and camera integrated with wireless telephone," U.S. Pat. No. 7,339,608, VTech Telecommunications, Mar. 4, 2008, describing, inter alia, a monitor system with a camera using visible or infrared radiation and a cordless radio transceiver for transmission of video and image signals and alerts.

Karen Fitzgerald, et. al., "Two-Way Communication Baby Monitor with Smoothing Unit," U.S. Pat. No. 6,759,961, Mattel, Jul. 6, 2004, describing, inter alia, a system with baby monitoring and parent units for communicating audible sounds between the baby and parent units and having audible sounds for soothing of the baby.

Karen Fitzgerald, et. al., "Baby monitor with a soothing unit," U.S. Pat. No. 7,049,968, Mattel, May 23, 2006, describing, inter alia, a system with baby monitoring and parent units for communicating audible sounds between the baby and parent units and having audible sounds for soothing of the baby.

Marc R. Matsen, et. al., "Methods and systems for monitoring structures and systems," U.S. Pat. No. 7,705,725, Boeing, Apr. 27, 2010, describing, inter alia, methods and systems for structural and component health monitoring of an object such as a physical aircraft with a plurality of sensor systems positioned about an object to be monitored and a processing system communicatively coupled to at least one of said plurality of sensor systems with processing system including expert systems, neural networks, and artificial intelligence technologies.

Bao Tran, "Mesh network personal emergency response appliance," U.S. Pat. No. 7,733,224, Jun. 8, 2010, describing, inter alia, a monitoring system including one or more wireless nodes forming a wireless mesh network; a user activity sensor including a wireless mesh transceiver adapted to communicate with the one or more wireless nodes using the wireless mesh network; and a digital monitoring agent coupled to the wireless transceiver through the wireless mesh network to request assistance from a third party based on the user activity sensor. The digital monitoring agent comprises one of: a Hidden Markov Model (HMM) recognizer, a dynamic time warp (DTW) recognizer, a neural network, a fuzzy logic engine, a Bayesian network, an expert system or a rule-driven system.

Edward K. Y. Jung, et. al., "Occurrence data detection and storage for mote networks," U.S. Pat. No. 8,275,824, The Invention Science Fund, Sep. 25, 2012, describing, inter alia, systems and processes for detecting and storing occurrence data using mote networks. Artificial intelligence with pattern recognition may include data or image processing and vision using fuzzy logic, artificial neural networks, genetic algorithms, rough sets, and wavelets.

Matthias W. Rath, et. al., "Method and system for real time visualization of individual health condition on a mobile device," U.S. Pat. No. 9,101,334, Aug. 11, 2015, describing, inter alia, a method and technology to display 3D graphical output for a user using body sensor data, personal medical data in real time with expert Q&As, "What if" scenarios and future emulation all in one artificial intelligence expert system.

M. Toy, "Systems and methods for managing a network," U.S. Pat. No. 9,215,181, Comcast Cable, Dec. 15, 2015 describing, inter alia, systems and methods for managing congestion in a network. The use of expert systems, fuzzy logic and neural networks are mentioned. "The methods and systems can employ Artificial Intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning)."

C. M. Chou, et. al., "Network operating system resource coordination," U.S. Pat. No. 9,807,640, Taiwan semiconductor, Oct. 31, 2017 describing, inter alia, network device coordination schemes to allocate resources, configure transmission policies, and assign users to utilize resources. "Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. The use of expert systems, fuzzy logic and neural networks are mentioned. "Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter."

Yiu L Lee, U.S. Publication No. 2014-0126356, patent application Ser. No. 13/669,039, Nov. 6, 2012, Comcast Cable, "Intelligent Network," describing, inter alia, determining a plurality of services to be provided over a first communication path to a destination, determining a select service of the plurality of services to be provided over a failover path to the destination, detecting a failure of the first communication path, and routing the select service over the failover path in response to the failure of the first communication path. The use of expert systems, fuzzy logic and neural networks are mentioned. "The methods and systems can employ Artificial Intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning)."

Robert C. Streijl, "Enhanced network congestion application programming interface," AT&T Intellectual Property, U.S. Publication No. 2016-0135077, patent application Ser. No. 14/534,499, Nov. 6, 2014, describing, inter alia, systems and methods that receive network load data that provides indication of a utilization level extant in a wireless cellular network. The use of expert systems, fuzzy logic and neural networks are mentioned. "Any suitable scheme (e.g., neural networks, expert systems, Bayesian belief networks, support vector machines (SVMs), Hidden Markov Models (HMMs), fuzzy logic, data fusion, etc.) can be used by detection engine 102 to provide an appropriate prediction to associate with the stability factor."

J. B. Dowdall, "Methods and systems for pedestrian avoidance, U.S. Pat. No. 9,336,436, May 10, 2016, describing, inter alia, an autonomous vehicle configured to avoid pedestrians using hierarchical cylindrical features.

J. Zu and P. Morton, "Methods and systems for Pedestrian avoidance using Lidar," U.S. Pat. No. 9,315,192, Apr. 19, 2016, describing an autonomous vehicle configured to avoid pedestrians using hierarchical cylindrical features and Lidar or other sensors.

J. Benesty, et. al., "Microphone Array Signal Processing," Springer, 2008 is a text treating fundamentals of microphone arrays and beamforming technologies.

M. Brandsttein and D. West, "Microphone Arrays," Springer, 2001, is a text dealing with a microphone array signal processing techniques and applications.

Ali O. Abid Noor, "Adaptive Noise Cancellation—Innovative Approaches," Lambert Academic Publishing, 2012 is a text describing noise cancellation systems based on optimized subband adaptive filtering.

J. C. Giarratano, et. al., "Expert Systems," Thomson Course Technology, Boston, Massachusetts, 2005 is a text dealing with knowledge representation, reasoning modeling and expert system design.

Chen, C. H., "Fuzzy Logic and Neural Network Handbook," McGraw-Hill, New York, 1996.

Cox, C., "The Fuzzy Systems Handbook," Academic Press Inc., 1994.

Earl Cox, "Fuzzy Fundamentals," IEEE Spectrum, October 1992, pages 58-61. A technical paper describing, inter alia, basic concepts of fuzzy logic and its applications.

G. V. S. Raju, et. al., "Hierarchical Fuzzy Control," Int J. Control, 1991, V. 54, No. 5, pages 1201-1216. A technical paper describing, inter alia, use of Hierarchical Fuzzy Logic with rules structured in a hierarchical way to reduce the number or required rules from an exponential function of the system variables to a linear function of those variables.

G. V. S. Raju, "Adaptive Hierarchical Fuzzy Controller," IEEE Transactions on Systems, Man and Cybernetics, V. 23, No. 4, pages 973-980, July/August 1993. A technical paper describing, inter alia, use of a supervisory rule set to adjust the parameters of a hierarchical rule-based fuzzy controller to improve performance.

Li-Xin Wang, "Analysis and Design of Hierarchical Fuzzy Systems," IEEE Transactions on Fuzzy Systems, V. 7, No. 5, October 1999, pages 617-624. A technical paper describing, inter alia, derivation of a gradient decent algorithm for tuning parameters of hierarchical fuzzy system to match input-output pairs.

Di Wang, Xiao-Jun Zeng and John A. Keane, "A Survey of Hierarchical Fuzzy Systems (Invited Paper)," International Journal of Computational Cognition, V. 4, No. 1, 2006, pages 18-29. A technical paper providing a survey of fuzzy hierarchical systems.

S. Bolognani and M. ZiglIOTto, "Hardware and Software Effective Configurations for Multi-Input Fuzzy Logic Controllers," IEEE Transactions on Fuzzy Systems, V. 6, No. 1, February 1998, pages 173-179. A technical paper describing, inter alia, approaches to simplification of multiple input fuzzy logic controllers with either a hierarchical or parallel structure.

F. Cheong and R. Lai, "Designing a Hierarchical Fuzzy Controller Using Differential Evolution," IEEE International Fuzzy Systems Conference Proceedings, Seoul Korea, August 22-25, 1999, pages 1-277 to 1-282. A technical paper describing, inter alia, a method for automatic design of a hierarchical fuzzy logic controllers.

Elike Hodo, et, al., "Threat analysis of IOT networks using artificial neural network intrusion detection system," International Symposium on Networks, Computers and Communications (ISNCC), May 2016. A technical paper describing, inter alia, a threat analysis of the IOT and uses an Artificial Neural Network (ANN) to combat these threats.

Xiaoyu Sun, et. al., "Low-VDD Operation of SRAM Synaptic Array for Implementing Ternary Neural Network," IEEE Transactions on very Large Scale Integration (VLSI) systems, V. 25, No. 10, October, 2017, pages 262-265. A technical paper describing, inter alia, a low-power design of a static random access memory (SRAM) synaptic array for implementing a low-precision ternary neural network.

E. De Coninck, et. al., "Distributed Neural Networks for Internet of Things: The Big-Little Approach," from book Internet of Things—IOT Infrastructures: Second International Summit, IOT 360°, Rome, Italy, Oct. 27-29, 2015, pp. 484-492. A technical paper describing, inter alia, an application area in the Internet of Things (IOT) where a massive amount of sensor data has to be classified and the need to overcome variable latency issues imposes a major drawback for neural networks. The paper describes a proposed Big-Little architecture with deep neural networks used in the IOT.

F. Chung and J. Duan, "On Multistage Fuzzy Neural Network Modeling," IEEE Transactions on Fuzzy Systems, Vol. 8, No. 2, April 2000, pages 125-142. A technical paper addressing, inter alia, input selection for multistage hierarchical AI network models and proposed efficient methods of selection.

M. Chi, et. al., "Big Data for Remote Sensing: Challenges and Opportunities," IEEE Proceedings, V1. 104, No. 11, November 2016, pages 2207-2219.

M. Frustaci et. al., "Evaluating Critical Security Issues of the IOT World: Present and future challenges," IEEE Internet of Things Journal, August, 2018, pages 2483-2495

However, such prior systems and methods fail to take full advantage of modern AI expert system, fuzzy logic, neural network and hierarchical system information processing technology to provide a comprehensive assessment of sensor data, telecommunication network status, and/or potentially dangerous or unacceptable situations or conditions. What is needed are newly improved monitoring systems and methods that analyze and integrate information from multiple network sensors including physical device sensors, situation sensors, distributed sensors in remote locations and telecommunication network problem sensors to generate integrated, understandable and non-confusing assessments for presentation to monitoring personnel and/or control systems.

SUMMARY OF INVENTION

Various embodiments for improved monitoring systems and methods are disclosed in the present invention. In one aspect of this invention, a first Internet of Things (IOT) sensor network remote sensor station comprises, without limitation, a sensor network parameter processing, warning and control system with at least one electronic, specifically programmed, specialized sensor network communication computer machine including electronic artificial intelligence expert system processing and further comprising a non-transient memory having at least one portion for storing data and at least one portion for storing particular computer executable program code; at least one processor for executing the particular program code stored in the memory; and one or more transceivers and/or electrical or optical connections for communicating with IOT (Internet of Things) sensors that generate electrical or optical parameter signals derived from sensor inputs from objects or situations being monitored.

Some embodiments further comprise one or more other different followed or following Internet of Things (IOT) sensor network remote sensor stations sharing common interests with said first IOT sensor network remote sensor station comprising one or more other electronic, specifically programmed, specialized sensor network communication computer machines for monitoring other such electrical or optical sensor parameter signals derived from different sensor inputs from IOT objects or situations being monitored.

Some embodiments further comprise one or more monitor units connected to, collecting information from and communicating with said first remote sensor station and further analyzing such collected information from remote sensor stations.

Furthermore, in some embodiments, the particular program code mat be configured to perform artificial intelligence expert system operations upon execution including artificial intelligence expert system processing based on expert input defining multiple expert system logic propositional instructions and multiple ranges of sensor variables with artificial intelligence expert system processing analysis of multiple sensor signal inputs and generation of multiple control outputs with urgent and/or integrated composite degree of concerns based on said expert system propositional instruction evaluation of multiple input sensor parameters.

In some embodiments, the artificial intelligence expert system processing further comprises hierarchical Multiple-Input/Multiple-Output (MIMO) operation wherein the number of said expert system logic propositional instructions is a linear function of the number of variables and wherein said hierarchical MIMO operations provide inputs to successive hierarchical control levels based at least in part on importance of said inputs and feedback indicative of output signal sensitivity to said inputs with artificial intelligence expert system control of dispatch of electronic or optical communication warnings and/or corrective action to address MIMO urgent concerns and/or composite degrees of concern of said sensor network objects or situations based on urgent concerns and rankings of said expert system composite degrees of concern.

In some embodiments, the artificial intelligence expert system processing comprises, without limitation, one or more of expert system processing and analysis of said first remote sensor station sensor input signals, acoustic signal processing, speech recognition, natural language processing, image processing, fuzzy logic, statistical analysis, mathematical analysis and/or neural network analysis.

In some embodiments, the first sensor network remote sensor station sensor signals include, without limitation, a combination of one or more of audio, image, medical, process, material, manufacturing equipment, environmental, transportation, location, pipeline, power system, radiation, vehicle, computer, processor, data storage, cloud processing, cloud data storage, vehicle, drone, threat, mote, BOT, robot, telecommunication network, cyberattack, malicious hacking or other followed remote sensor station monitoring signals.

In some embodiments, the artificial intelligence expert system first sensor network remote sensor station of said MIMO artificial intelligence expert system controller is a fuzzy logic controller.

In some embodiments, the artificial intelligence expert system remote sensor station of said hierarchical MIMO artificial intelligence expert system controller is a fuzzy logic controller.

In some embodiments, the artificial intelligence expert system propositional expert system instructions are based on priorities or importance of selected object or situation expert defined monitored parameters.

In some embodiments, the artificial intelligence expert system includes at least one of said expert systems propositional expert system instructions priorities is based on selected combinations of object or situation parameters.

In some embodiments, the artificial intelligence expert system processing of said first sensor network remote sensor station further comprises neural network processing with backward chaining from computed results to improve future computational results. See, e.g., FIG. 20.

In some embodiments, the artificial intelligence expert system of the first sensor network remote sensor station further comprises access of said remote sensor station to internet cloud storage and processing units.

In some embodiments, the artificial intelligence expert system first sensor network remote sensor station sensor inputs may vary with time.

In some embodiments, the artificial intelligence expert system first sensor network remote sensor station parameter analysis further comprises time series analysis of time variable sensor input data.

In some embodiments, the artificial intelligence expert system, the first sensor network remote sensor station time series analysis includes regression analysis of time varying sensor signal parameter values.

In some embodiments, the artificial intelligence expert system first sensor network remote sensor station electronic, specifically programmed, specialized sensor network communication computer machine communicates with other network nodes to monitor connected telecommunication network elements, subnetworks or networks for failures or performance issues impacting said first remote sensor station.

In some embodiments, the artificial intelligence expert system first sensor network remote sensor station one or more of said transceivers may communicate with a terrestrial or air-born vehicle. See, e.g., FIGS. 2A and 2B.

In some embodiments, the artificial intelligence expert system first sensor network remote sensor station is implemented in a terrestrial or air-born vehicle. See, e.g., FIGS. 2A and 2B.

In some embodiments, the artificial intelligence expert system first sensor network remote sensor station one or more of said transceivers may communicate with a drone. See, e.g., FIGS. 2A and 2B.

In some embodiments, the artificial intelligence expert system first sensor network remote sensor station is implemented in a drone. See, e.g., FIGS. 2A and 2B.

The first sensor network remote sensor station of claim 1 wherein the one or more of said transceivers may communicate with a robot. See, e.g., FIG. 1.

In some embodiments, the artificial intelligence expert system first sensor network remote sensor station is implemented in a robot. See, e.g., FIG. 1.

In some embodiments, the artificial intelligence expert system first sensor network remote sensor station one or more transceivers may communicate with a BOT. See, e.g., FIG. 1.

In some embodiments, the artificial intelligence expert system first sensor network remote sensor station is implemented in a BOT. See, e.g., FIG. 1.

In some embodiments, the artificial intelligence expert system first sensor network remote sensor station transceivers may communicate with a mote. See, e.g., FIG. 1.

In some embodiments, the artificial intelligence expert system first sensor network remote sensor station is implemented in a mote. See, e.g., FIG. 1.

In some embodiments, the artificial intelligence expert system first sensor network remote sensor station monitored objects or situations comprise one or more persons. See, e.g., FIGS. 1, 2A and 2B.

In some embodiments, the artificial intelligence expert system first sensor network remote sensor station a monitored person is an infant, child, invalid, medical patient, elderly or special needs person. See, e.g., FIGS. 1, 2A and 2B.

In some embodiments, the artificial intelligence expert system first sensor network remote sensor station transmits background audio signals to be broadcast in the area of said person. See, e.g., FIGS. 3, 5, 6, 8, 9 and 10A.

In some embodiments, the artificial intelligence expert system first sensor network remote sensor station transmitted background audio signals are removed from or attenuated in signals transmitted to connected monitor units to minimize annoying or unnecessary signals received and/or heard at said monitoring unit while still transmitting audio signals from the monitored object or person. See, e.g., FIGS. 4-6.

In some embodiments, the artificial intelligence expert system first sensor network remote sensor station transmits periodic keep-alive signals to a connected monitor unit to assure users that the remote sensor station is operating correctly. See, e.g., FIGS. 3-6, 8 and.

In some embodiments, the artificial intelligence expert system the first sensor network remote sensor station sensor signals include a combination of at least one telecommunication network sensor input combined with other sensor signal inputs. See, e.g., FIG. 2B.

In some embodiments, the artificial intelligence expert system first sensor network remote sensor station at least one telecommunication network sensor input is a telecommunication link sensor. See, e.g., FIGS. 2B, 9, 10B, 11, 18 and 21.

In some embodiments, the artificial intelligence expert system first sensor network remote sensor station comprises at least one telecommunication network router sensor. See, e.g., FIG. 2B.

In some embodiments, the artificial intelligence expert system first sensor network remote sensor station comprises at least one telecommunication switching system sensor. See, e.g., FIG. 10B.

In some embodiments, the artificial intelligence expert system first sensor network remote sensor station comprises at least one telecommunication modem sensor. See, e.g., FIG. 10B.

BRIEF DESCRIPTION OF THE DRAWINGS

While the invention is amenable to various modifications and alternative forms, specific embodiments thereof are shown by way of example in the drawings and will herein be described in detail. The inventions of this disclosure are better understood in conjunction with these drawings and detailed description of the preferred embodiments. The various hardware and software elements used to carry out the inventions are illustrated in these drawings in the form of diagrams, flowcharts and descriptive tables setting forth aspects of the operations of the invention.

FIG. 1 illustrates, without limitation, an exemplary sensor monitor network system comprising a one or more remote sensor stations, one or more monitoring units and one or more network monitoring centers of this invention.

FIG. 2A illustrates, without limitation, an exemplary sensor monitor network of this invention.

FIG. 2B illustrates, without limitation, exemplary sensor monitor network faults or concerns monitored in this invention.

FIG. 3 illustrates, without limitation, an exemplary remote sensor station of this invention.

FIG. 4 illustrates, without limitation, an exemplary sensor network monitoring unit of this invention.

FIG. 5 illustrates, without limitation, exemplary background audio and keep alive audio signals of the type used in this invention.

FIG. 6 illustrates, without limitation, exemplary composite audio signals of the type used in this invention.

FIG. 7 illustrates, without limitation, exemplary acoustic spatial beamforming for noise cancellation of the type used in this invention.

FIG. 8 illustrates, without limitation, exemplary sensor network monitor controls of the type used in this invention.

FIG. 9 illustrates, without limitation, an exemplary sensor monitor system flowchart.

FIG. 10A illustrates, without limitation, additional exemplary sensor signal analysis of FIG. 9.

FIG. 10B illustrates, without limitation, still further additional exemplary sensor signal analysis of FIG. 9.

FIG. 11 illustrates, without limitation, an exemplary expert system sensor signal analysis and ranking of this invention.

FIG. 12A illustrates, without limitation, exemplary symmetric audio-video (AV) expert system rules of this invention.

FIG. 12B illustrates, without limitation, exemplary asymmetric audio-video (AV) expert system rules of this invention.

FIG. 13 illustrates, without limitation, exemplary fuzzy logic relationships of this invention.

FIG. 14 illustrates, without limitation, exemplary MIMO hierarchical expert system operation.

FIG. 15 illustrates, without limitation, exemplary hierarchical AV-Medical (AVM) sensor expert system rules with medical IOT sensor signal analysis of this invention.

FIG. 16 illustrates, without limitation, exemplary hierarchical AVM-Process (AVMP) sensor expert rules with process IOT sensor signal analysis of this invention.

FIG. 17 illustrates, without limitation, exemplary hierarchical AVMP-Following (AVMPF) sensor expert rules with followed IOT remote sensor station signal sensor analysis of this invention.

FIG. 18 illustrates, without limitation, an exemplary hierarchical AVMPF-Telecommunications (AVMPFT) sensor expert rules with IOT telecommunication signal sensor analysis of this invention.

FIG. 19 illustrates, without limitation, an exemplary MIMO hierarchical composite warning and control index calculation of this invention.

FIG. 20 illustrates, without limitation, an exemplary neural network of this invention.

FIG. 21 illustrates, without limitation, an exemplary sensor network analysis diagram.

FIG. 22 illustrates, without limitation, an exemplary sensor network fuzzy logic inference engine of this invention.

DETAILED DESCRIPTION

The above figures are better understood in connection with the following detailed description of the preferred embodiments. Although the embodiments are described in considerable detail below, numerous variations and modifications will become apparent to those skilled in the art once the above disclosure is fully appreciated. It is intended that the following be interpreted to embrace all such variations and modifications.

FIG. 1 depicts the IOT monitor system 100 of this invention. The IOT monitor system 100 comprises the remote sensor station 107 used to monitor the subject or object 101 and/or its surroundings or defined areas, the monitor unit 102 collecting and processing/analyzing information from one or more remote monitor stations 107, and the network monitor center 118 communicating with one or more monitor units 102 and/or remote monitor stations 107 with further information processing and analysis of data and information gathered by IOT sensors distributed throughout the monitor system 100.

Example objects or subject 101 being monitored may include, without limitation, a person, group of people, physical object or objects, or an area for surveillance. For example, a person being monitored may be an infant, invalid, medical patient or special needs person, senior citizen, child, prisoner, store customer, criminal, intruder, police officer, pedestrian, gathering or crowd, or other person or persons requiring monitoring or surveillance. Example objects being monitored may include, without limitation, manufacturing equipment, transportation equipment, robotic or other material or workpiece processing equipment, BOTs, products, product inventory, terrestrial or air borne vehicles, terrestrial vehicle traffic, pipe lines, utility generation and/or delivery equipment and systems, valuable assets, and computer and/or data processing equipment. Example telecommunication equipment may include, without limitations, transmission, switching, routing, data storage, and telecommunication system and data processing and control equipment and systems. Example 101 object-subject sensors 114 may include, without limitation, audio sensors, video sensors, movement sensors, environmental sensors, medical sensors, traffic sensors, pedestrian sensors, BOT sensors, robot sensors, mote sensors, process sensors, location sensors, security sensors or other sensors used to monitor objects or subjects for activities or events of interest. IOT network security concerns include network cyber-attacks and malicious hacking of network connected devices and sensors, telecommunication facilities, data processing and storage facilities, and information collected, stored, transmitted and processed in the IOT network. The ubiquitous deployment of billions of network sensors and IOT connection of such sensors in a world-wide web presents new threat and vulnerability realities and concerns. Security violations may effect local and wider network operations requiring evaluation and response beyond isolated limited concerns at a particular attack location. Cyberattacks may occur at IOT network application layers, information transmission layers, and data processing layers including internet IOT cloud processing and data storage facilities.

The remote sensor station 107 receives, analyzes, and processes data and information from and communicates with the object/subject 101 sensors 114. In addition, without limitation, the remote sensor station 107 may include additional sensors 113. Example sensors 113 may include, without limitation, audio sensors such as microphone array 109, image sensors 110, process sensors and/or environmental sensors. Sensors 113 may be used for further monitoring of the object or subject 101, or areas or activities around that object or subject. The remote sensor station 107 analyzes object or subject 101 sensor 114 inputs and the sensor 113 inputs for detection of various situations that may present danger or operational issues to the object or subject 101. Audio signals from the object or situation being monitored may be broadcast from remote sensor station 107 speaker 111.

In some embodiments, the sensors may be configured as a mote or small electronic assembly or a robot capable of performing processing, gathering sensory information and communicating with other connected nodes in the network. The network monitor unit 102 receives sensor signals from the remote sensor station 107 monitoring the object or subject 101 and surrounding areas activities.

In some embodiments the remote sensor station may implemented in a robot, a BOT or a mote. In some embodiments the remote sensors may be implemented in a robot, a BOT or a mote.

The object or subject remote sensor station 107 may include a microphone array 109 comprising one or more microphones used to listen to sounds from the object or subject 101 and the surroundings. In some embodiments the microphone array 109 may be replaced by a single omnidirectional or directional microphone for listing to the sounds. Advantageously, in some embodiments, microphone array 109 permits the use of microphone beamforming for enhancing sounds emanating from the subject 101 while reducing sounds received from directions other than those produced by the object or subject. As explained more completely below, microphone beamforming makes use of beamforming software to create acoustical beams with a main lobe directed at the object or subject that is most sensitive to sounds originating from the object or subject while attenuating or perhaps essentially eliminating sounds arriving at the microphone array from different directions. For example, depending on the configuration, the beamforming microphone array 109 may be designed to be less sensitive to the broadcast audible signals from speaker 111 and more sensitive to sounds emanating from the subject 101. In some embodiments of this invention, it may be desirable to include operator controls that may permit the user of the subject remote sensor station 107 to enable or disable microphone array beamforming depending on user preference. For example, some users may want to hear more clearly all sounds generated by the object or subject 101 or from other sources in the object or subject's surroundings at selected times or under selected circumstances.

The object or subject remote sensor station 107 also may include video and/or infrared (IR) cameras and an IR illuminator 110 as shown in FIG. 1. In addition, the remote sensor station 107 may include still image cameras not shown. The remote sensor station 107 may also include image analysis software for analyzing images from the cameras 110 to determine particular activities of the object or subject 101 and/or activities in the areas being monitored. Such images may reveal activity of the object or subject 101 such as particular movements even though the object or subject 101 may not be making audible sounds. In addition, dangerous situations absent audible sounds from the object or subject 101 may be detected with the cameras or other image collection devices 110 including, for example, situations that may indicate a risk to the object or subject 101 being injured by dangerous activities.

While standard video or still camera technology may be useful in monitoring object or subject 101 activities in well lighted environments, such monitoring with subdued lighting or even in the dark may not be possible with standard cameras. The use of an infrared IR camera and infrared IR illuminator as depicted in FIG. 1 permits visual monitoring even in such difficult lighting situations. The IR illuminator may bathe the area with infrared radiation or structured IR illumination may be used to simplify image analysis for determination of activities of the object or subject 101. Such structured lighting may include patterns comprising multiple dots of light in various arrangements, circular patterns of infrared lighting, straight lines of infrared lighting or other patterns most suitable for the chosen environment and purpose. IR detectors 110 may also be used as motion detectors including such use in security systems.

The remote monitor station 107 may also include additional controls useful for selecting operational modes of the remote sensor station 107. In some embodiments, sensors 114 and/or 113 may be used for sensing of other conditions such as unacceptable temperature ranges, air pollutants, dangerous gases, fires or smoke. The additional controls may be used to turn the remote sensor station 107 on or off, adjust the volume from speaker 111, select or deselect microphone array 109 beamforming, and select appropriate video, still image, or infrared visual monitoring of the object or subject 101 and the surrounding area.

In some embodiments the remote sensor station 107 may also include a display not shown for displaying captured video, still or infrared images from the cameras 110. In some embodiments the display may also be used for touchscreen control of the subject remote sensor station 107 as described further below.

The remote sensor station 107 may include a radio transceiver such as a Bluetooth, Wi-Fi or cellular telephone transceiver or other RF telecommunication capability known to those of skill in the art for communicating with other elements of the network monitor system 100 as depicted in FIG. 1. The antenna 108 may be used for such RF communication of audible, visual and/or control and status information.

The network monitoring system 100 of FIG. 1 may also include monitor unit 102 for remotely monitoring activities of the subject 101. The monitoring unit 102 includes an antenna 106 for receiving RF signals from the remote sensor station 107. The network monitor unit 102 also includes an RF transceiver compatible with the transceiver of the remote sensor station for receiving RF signals from that unit. For example, the RF transceiver for the monitor unit 102 may include Bluetooth, Wi-Fi, cellular telephone transceiver or other RF, fiber optic or wired connections for communicating with other elements of the monitor system 100 as depicted in FIG. 1.

The remote monitor unit 102 may further include a display 105 for displaying video images received from the remote sensor station 107 of FIG. 1. The display 105 may also be a touchscreen display for display of control icons to simplify overall operation as described further below.

Remote network monitor unit 102 may also include speaker 103 used to broadcast audio signals received from the remote sensor station 107 and used for listening to audible sounds from the object or subject 101 and the surrounding area. As explained further below, the remote network monitor unit 102 may also include video and/or audio processing software to further enhance received signals to improve observations of object or subject 101 activities.

The remote monitor unit 102 may also include controls 104 for controlling monitoring of object or subject activities. Such controls may turn the network monitor unit 102 on and off, adjust speaker 103 volumes, adjust display 105 parameters, and/or select operational modes including further control for reduction of background noise in the received audio signal.

As depicted in FIG. 1, some embodiments may include RF connections via antenna 106 or landline connections via wire, cable or fiber optic links to network monitor center 118. The network monitor center 118 may receive periodic status update reports from the network monitor unit 102 and/or the object or remote sensor station 107 for recording, analysis, reporting and/or preparation of history files for access by users. The monitor center 118 may also receive emergency alert signals from the monitor unit 102 and/or the remote sensor station 107 indicating emergency situations requiring immediate attention. In response to such emergency alert signals, the subject monitor center 118 may dispatch emergency personnel, contact responsible personnel, sound alarms or otherwise provide or initiate appropriate emergency assistance. The monitor center 118 may contain communications and computer equipment for use by specialized personnel trained to respond appropriately to reported emergency situations. Communications may be by wireline, cable, fiber-optics and/or via radio signals with antenna 119.

As also indicated in FIG. 1, the monitoring system 100 may communicate with the cellular telephone 115 for the purpose of providing information concerning the status of object or subject 101 and alarm signals indicating dangerous situations. In addition, any and all audio/video signals transmitted using cellular telephone frequencies, Wi-Fi, and/or Bluetooth or other telecommunication signals to or from the monitor unit 102, the remote sensor station 107 or the monitor station 118 of FIG. 1 or transmitted to the cellular telephone 115. The cellular telephone 115 also includes one or more antennae 117 for such communications. The cellular telephone 115 also includes touchscreen display 116 and other controls as may be implemented depending upon the cellular telephone design. It is to be understood that the cellular telephone 115 may also be a tablet computer or laptop computer or other similar portable telecommunication devices. In some embodiments the remote sensor station 107 may in fact be implemented using cellular telephone or portable computer or tablet devices.

In addition, any of the monitor unit 102, remote sensor station 107 or monitor center 118 may transmit email or text messages to designated user World Wide Web addresses such as personal computers or other designated recipients of information concerning the object or subject 101 being monitored. Such communications may make use of SMS (short message service) or other messaging telecommunications with unsolicited messages concerning the object or subject 101 being "pushed" to the address destination without first being requested from that destination. Such messages enable rapid alerting of designated destinations concerning the status of the object or subject 101. Other social media communication systems such as Twitter and Facebook may also be used to communicate status information concerning the subject 101 on a real-time or near real-time basis.

In some embodiments, the monitor system 100 may also communicate with cloud computing 120 as shown in FIG. 1. Cloud computing 120 may comprise computing, data processing and data storage equipment useful to supplement the computing, data processing, and data storage equipment of the monitor system 100 of FIG. 1. Cloud computing 120 may comprise extensive data base information descriptive of local, wide area, or even global IOT network performance parameters useful in evaluating situations impacting the object or subject 101.

FIG. 2A illustrates an exemplary sensor monitor network 200 of the type used in some embodiments of the present invention. The sensor monitor network 200 may comprise exemplary star subnetworks 201 and 205 and/or exemplary mesh subnetworks 206 interconnected with each other and with the monitor center 207. The monitor center 207 of FIG. 2A corresponds to the monitor center 118 FIG. 1. The remote sensor stations 203 of FIG. 2A correspond to the remote sensor stations 107 of FIG. 1. The monitor unit 202 of FIG. 2A corresponds to the monitor unit 102 of FIG. 1. As shown in FIG. 2A, multiple remote sensor stations 203 may be connected to a monitor unit 202 in star subnetworks such as 201 and 205 or exemplary mesh subnetworks such as 206. Communication links 204 interconnect remote sensor stations 203 to the respective monitor units 202. Communication links 204 may be wireline, fiber optic or RF radio links as appropriate for a given implementation. Communication links 208 in-turn interconnect the monitor units 202 with the monitor center 207. The individual subnetworks 202, 205 and 206 communicate with the monitor center 207 and with each other through the monitor center 207 and/or via direct connections such as shown in link 209 or via cloud computing 212. The communication connections between the exemplary sensor network remote sensor stations, monitor units and the monitor center may also be established via drones such as drone 210 or other air-born vehicle not shown using radio-link RF communications.

Air-born drone 210 may be used to relay signals between remote sensor stations 203 and monitor units 202 of FIG. 2A. The drone 210 may also relay signals to and from the monitor center 207 and/or the monitor center 118 of FIG. 1. In addition, the drone 210 may itself contain sensors such as cameras, temperature, wind, rain, snow, humidity or other sensors suitable for drone implementation. Drone 210 may also contain signal analysis software for proper operation with RF link protocols, noise reduction and/or data compression as appropriate for particular applications. In some embodiments, drones such as drone 210 may have the functionality of a remote monitor station such as remote monitor station 203.

Terrestrial vehicle 211 may also communicate with the remote sensor station 203 via radio links as indicated in FIG. 2A. Vehicle 211 may also communicate directly with the monitor unit 202 or network monitor center 207. In some embodiments vehicle 211 may be a driverless vehicle. Driverless vehicles communicate with other vehicles in their immediate vicinity to avoid collisions or other issues resulting from traffic congestion. As indicated in FIG. 2A, a driverless vehicle 211 may be alerted as to the presence of pedestrian 213 in FIG. 2A for the purpose of avoiding hitting that person with vehicle 211. Detection of the presence of pedestrian 213 may be via radar, sonar, lidar, or via a radio link. The pedestrian may include location determination capability such as GPS to determine physical location information. That information may be transmitted in a format that permits vehicles such as vehicle 211 to determine if a collision with the pedestrian may occur permitting collision avoidance maneuvers or actions to be taken. Warning signals may also be transmitted from vehicle 211 to pedestrian 213. In some embodiments such warning signals may be transmitted to the pedestrian 213 bringing potentially dangerous situations to the pedestrian's 213 attention. In some embodiments, the vehicle 212 may transmit information on its location, speed and direction of travel. Upon receiving that information, the pedestrian 213 may be alerted of potential collision danger via a wireless warning device carried by that pedestrian. In some embodiments, all of the above described pedestrian communication, location determination, processing, signal generation and warning may be implemented in a pedestrian carried cellular telephone or other portable wireless electronic device carried by the pedestrian.

FIG. 2B depicts the exemplary sensor network of FIG. 2A together with the exemplary performance or sensor detected issues with different elements of that network. Exemplary network elements failure or sensor detected issues are illustrated inside dotted circles shown in FIG. 2B.

For example, issue 214 concerns one of the remote sensor stations 203 of FIG. 2B. The issue 214 may concern complete or partial failure of a remote sensor station 203. The issue 214 may also reflect the outputs of sensor units being monitored by the remote sensor station 203. For example, such sensor outputs may be indicative of alarm signals received from audio or video sensors. Other possibilities include alarm signals received from medical sensors, environmental sensors or other sensors used to report the status of objects or situations being monitored by the remote sensor station 203.

In a similar manner, issue 215 may concern complete or partial failure of the monitor unit 202. Issue 215 may also reflect a reported failure or concerns detected by the multiple remote sensor stations 203 connected to monitor unit 202.

Issue 216 concerns the failure or other issues encountered on a telecommunication link 208 connecting remote sensor stations 203 to the monitor center 207. Such issues may include transmission link equipment problems, excessive error rates of the transmission link, link data congestion concerns caused by overloading of the link 208 or propagation issues such as multipath or RF interference.

Issue 217 may concern complete or partial failure of monitor center 207. Issue 217 may indicate concerns about the capacity of monitor center 207 to provide required processing and network control. Issue 217 may also concern wider network failures or issues detected by the network monitor center 207.

Issue 218 concerns the failure or other issues encountered on telecommunication links interconnecting monitor units in separate subnetworks as illustrated in FIG. 2B. Here again, such issues may include transmission link equipment problems, excessive error rates of the transmission link, link data congestion concern caused by overloading of the link or propagation issues such as multipath or RF interference.

Issue 219 reflects concerns about an entire subnetwork such as the exemplary subnetwork 206. The Issue 219 concerns may range from total loss of that portion of the sensor network to less drastic issues involving performance of the subnetwork. An example may be the loss of several but not necessarily all elements of mesh subnetwork 206. Another example may be reported sensor issues indicating subnetwork wide problems.

Issue 220 relates to reported operational concerns for the vehicle 211. Such issues may include, for example, driver issues, equipment issues, roadway issues, traffic issues, emergency accident or police issues, etc. In some embodiments, a complete remote monitor station may be implemented in vehicle 211. Issue 222 relates to reported operational issues for the communication link 222 between the vehicle 220 and a pedestrian 213.

Issue 221 concerns operational status of a drone. Such concerns may reflect loss of or intermittent connections with ground-based equipment, overload, low power concerns, equipment malfunctions, etc. As noted above, in some embodiments, a complete remote monitor station may be implemented in drone.

This invention presents overall integrated artificial (AI) intelligence systems and methods to analyze, prioritize and respond to all of the above network type concerns with comprehensive network wide solutions based on relative issue criticality with AI decision making. Monitored sensor signals may include audio, image, medical, process, material, manufacturing equipment, environmental, transportation, location, pipeline, power system, radiation, vehicle, computer, processor, data storage, cloud processing, cloud data storage, drone, threat, mote, BOT, robot, telecommunication network or other followed sensor station monitoring signals.

FIG. 3 provides a more detailed exemplary configuration diagram for the remote sensor station 107 of FIG. 1—labeled remote sensor station 300 in FIG. 3. The remote sensor station 300 is controlled by processor 301 which may be a microprocessor, computer or digital controller of the type well known to those of skill in the art. The processor 301 is connected to memory 317 for storage of programs and data for the remote sensor station 300. The processor 301 may include, without limitation, conventional processor or digital controller capabilities as well as more specialized processing capabilities implemented for example with digital signal processing (DSP). The memory 317 may comprise, without limitation, solid-state random-access memory (RAM), solid-state read only memory (ROM), and/or optical memory or mechanical, optical or solid-state disk drive memory. The processor 301 also includes a power supply 321 which may comprise, without limitation, batteries, AC/DC power converters, solar cells, or other green energy power sources. The processor 301 may also include input/output devices 320 comprising without limitation USB ports, Common Flash memory Interface (CFI) approved by JEDEC and other standard memory unit interfaces. The processor 301 also includes connection to a speaker 315 for broadcasting audio signals from the remote sensor station unit 300.

Database access capability 318 of FIG. 3 may be implemented separately or as part of the system software operating on processor 301 for use in accessing system parameters, control information, status information, history, audio recordings, video recordings, image recordings, operational information, contact information, internet addresses, telephone numbers, received messages, alarm signals and/or other information used in the operation of the remote sensor station 300.

As further shown in FIG. 3, the processor 301 may include controls 316 integrated with processor 301 for on/off control, controlling microphone sensitivity, speaker volumes, camera operations and/or other operational features of the sensor station 300.

As also shown in FIG. 3, the remote sensor station 300 may also include a directional microphone array 302 used to provide audio inputs from a subject being monitored as well as other audio signals from the area surrounding the subject. The directional microphone array 302 may be designed to operate as a beamforming array with directional sound pickup forming a main lobe in the direction of the subject. The main lobe is most sensitive to sounds emanating in the reduced area covered by that lobe and is less sensitive to sounds emanating from other directions. In this way the directional microphone array 302 provides a noise or interference reduction capability wherein the primary audio signals picked up by the microphone array 302 are from the direction of the subject being monitored. The directional microphone array 302 may operate with beamforming software executing on processor 301 as discussed more completely below. In addition to the directional microphone array 302, but not illustrated in FIG. 3, single microphones may also be used in the present invention. Single microphones with pressure-gradient, directional acoustic sensitivity and/or omnidirectional microphones may be used as part of the remote sensor station 300. Microphones based on variable capacitor technologies, electromagnetic induction technologies, fiber-optic technologies, variable resistance technologies, piezoelectric technologies and including MEMS (Micro-Electrical-Mechanical System) technologies may be used in the present invention.

The acoustical beamforming software may further comprise acoustical beam former circuitry for receiving audio signals from each of multiple microphones comprising the directional microphone array, analog to digital conversion circuitry for converting the received audio signals from each of the multiple microphones to digital signals, individual transversal filters for filtering each individual digital microphone signal, with the individual transversal filters further comprising adaptive filter weights for each of the transversal filter tapped delay line signals, and with individual transversal filters further comprising additional circuitry for summing the outputs of the adaptively weighted tapped line signals producing an audio output signal most sensitive in the direction of the main lobe of the sensitivity pattern of acoustical beamforming circuitry. In this way, the acoustical beam-former signal sensitivity pattern may be adaptively varied with respect to direction of the main beam pattern lobe and null locations within that pattern and/or sidelobe structure.

As further shown in FIG. 3, the remote sensor monitoring unit 300 may also include, without limitation, a background acoustic signal generator 303. For example, a white noise generator may be used to generate white noise to be broadcast via speaker 315 depending on the subject requirements.

The white noise generator is only meant to be representative of acoustic signal sources that may be used for this purpose. Other possibilities include pink noise, announcements, audio messages, soothing music generators or the like. In some embodiments it may be desirable to avoid transmission of such background acoustic signals picked up by microphones 302 to monitor unit 102 of FIG. 1. At the same time, it may be desirable to ensure that the communication link such as link 204 of FIG. 2A is operational. As further explained below, this can be achieved by including known keep-alive signals in the transmission to monitor unit 102 and suppressing the unwanted acoustic signal for transmission purposes to monitor unit 102 as described below.

As also shown in FIG. 3, the remote sensor monitoring unit 300 may include an optical camera 304 which may be a video camera and/or a camera for capturing still images under control of the processor 301. The optical camera 304 may be used to monitor activities of the subject as directed by processor 301 under program control.

In addition to the optical camera 304, the remote sensor monitoring unit 300 may also include an infrared (IR) illuminator 305 operating under control of the processor 301. The IR illuminator 305 may be used to bathe the subject and surrounding area with infrared illumination including the possible use of structured infrared light. Such structured light may include, for example, multiple individual dots of infrared light, vertical and/or horizontal raster scan infrared light or circulars scans of infrared light. Infrared light is not visible to the human eye and has the advantage that it may be used in light or dark environments to create images or determine motions, movements or activities of the subject being monitored.

In addition to the IR illuminator 305, the remote sensor monitoring unit 300 may include an infrared IR camera 306 to detect reflected IR illumination from the subject and other objects in the illuminated field. The IR camera 306 may be used to generate image information for analysis by the artificial intelligence image analysis capability 314 discussed below. The goal of such image analysis may include the detection of the dangerous situations or circumstances encountered by the object or subject being monitored.

As also depicted in FIG. 3, the remote sensor monitoring unit 300 may include environmental sensors 307 to further monitor and detect dangerous situations that may present themselves in the area of the object or subject being monitored. Such sensors may be used to detect, for example, unacceptable temperature ranges, humidity, air pollutants, dangerous gases, fires or smoke.

The various sensors including but not limited to microphones, optical cameras, infrared cameras, infrared sensors and environmental sensors of FIG. 3 may all produce signals for transmission to the remote sensor station 107 and/or the monitor unit 102 of FIG. 1. Various embodiments of the remote sensor station 300 may implement radio RF transceivers for such communications using without limitation one or more of the transceiver implementations illustrated in FIG. 3. Possible such transceivers include, without limitation, one or more RF antennas and transceivers 312 designed for video, audio and/or data transmission and/or reception. Transceiver 312 may use, for example, VHF, UHF, Cellular Telephone, Bluetooth or Wi-Fi or other signal transmission spectrums. Modulation formats may include amplitude modulation (AM), single sideband (SSB) modulation, frequency modulation (FM), phase modulation (PM) or other modulation schemes known to those of skill in the art. Radio transceivers with appropriate antennas may also include a Bluetooth transceiver 310, a Wi-Fi transceiver 311 and/or the cellular telephone transceiver 309.

The remote sensor monitoring unit 300 Bluetooth, Wi-Fi, cellular or other RF transceivers of FIG. 3 may be used to send and/or receive signals to/from the sensors 114 of the object or subject 101 as illustrated in FIG. 1. Such remote sensors may include audio, image, environmental, medical, process, equipment or other sensors to further determine and capture information concerning the object or subject 101 of FIG. 1. The medical sensors 308 FIG. 3 may be implemented as part of the sensors 114 of FIG. 1 with RF or physical wire, cable or fiber optic connections between the sensors 114 and the remote sensor station 107 FIG. 1.

Medical sensors 308 implemented as part of the subject 101 sensors 114 may include sensors for subject temperature, blood pressure, pulse rate or other sensors designed to monitor critical medical parameters for the subject 101 of FIG. 1.

The remote sensor monitoring unit 300 of FIG. 3 may also include, without limitation, a GPS (Global Positioning System) 313 for an accurate determination of the object or subject monitoring position. Other positioning technology not shown may include determining positions based on cellular telephone tower triangulation, Wi-Fi signal location technology or other location determination capabilities known to those of skill in the art. The precise location of the remote sensor station 300 may be important, for example, when reporting alarm conditions to the monitor unit 102 or monitor center 115 of FIG. 1. Including such location determination capability permits the remote sensor station 300 to be moved from location to location or taken on trips and used for example at homes, hotels, warehouses, factories, businesses or in other such locations or accommodations.

The remote sensor monitoring unit 300 of FIG. 3 may also include a time/clock unit 319 for providing accurate time information. The time/clock unit 319 may operate off the power supply unit 321 or the use separate batteries or a power supply to ensure accurate time information. Accurate time information may be used for example to control operations of the object or subject sensor station microphones, acoustic signal generators, cameras, environmental sensors, and radio transceivers discussed above. For example, it may be desirable to initiate or terminate operation of the acoustic signal generators, cameras and/or other sensors under program control at specific times as determined by control parameter settings. It may also be important to transmit accurate time and/or date information with alarm signals transmitted to the monitor unit 102 and/or monitor center 115 of FIG. 1.

Timing signals broadcast using AM, FM, shortwave radio, Internet Network Time Protocol servers as well as atomic clocks in satellite navigation systems may be used in the present invention. For example, WWV is the call sign of the United States National Institute of Standards and Technology's (NIST) HF ("shortwave") radio station in Fort Collins, Colorado. WWV continuously transmits official U.S. Government frequency and time signals on 2.5, 5, 10, 15 and 20 MHz. These carrier frequencies and time signals are controlled by local atomic clocks traceable to NIST's primary standard in Boulder, Colorado. These and other available time transfer methods may be used in the subject monitoring system and method of this invention.

Also depicted in FIG. 3 is artificial intelligence capability 314 incorporating advanced signal processing for analysis of the various sensors signals, evaluation of varying conditions and situations concerning the observed subject with integration of the results of such observation, analysis and evaluation into comprehensible usable outputs for system control and/or alerting users of the monitoring system of this invention. Such artificial intelligence capability 314 may include, without limitation, image analysis, noise reduction, speech recognition, text-to-speech and speech-to-text conversion, natural language processing, expert system analysis, fuzzy logic analysis and/or neural network analysis as discussed in more detail below.

For example, as discussed further below, image analysis may be used to detect changes in the object field being viewed, recognition of particular objects, facial recognition, recognition of movements or changes in configuration the object or subject being viewed and the like. Noise reduction may include time and/or frequency domain analysis of received video and/or acoustic signals to remove or reduce the effects of background signal interference and noise to improve signal analysis results. Speech recognition may be used to recognize particular spoken words, commands or phrases. Text-to-speech and/or speech-to-text conversion may be used to convert between textual and spoken or auditory messages including commands, alerts and/or informative communications concerning objects being monitored by the sensor monitoring network of this invention. Natural language processing may be used for automatic contextual understanding of input signals or messages to facilitate automatic response to those signals or messages.

FIG. 4 provides a more detailed exemplary configuration diagram for the sensor network monitor unit 102 of FIG. 1—labeled sensor network monitor unit 400 in FIG. 4. The sensor network monitor unit 400 is controlled by processor 401 which may be a computer, processor, microprocessor or digital controller of the types well known to those of skill in the art. The processor 401 is connected to memory 412 for storage of programs and data for the remote subject monitoring station 400. The processor 401 may include without limitation conventional processor capabilities as well as more specialized processing capabilities implemented for example with digital signal processing (DSP) or other well-known computer technology. The memory 412 may comprise without limitation solid-state random-access memory (RAM), solid-state read only memory (ROM), and/or optical memory or mechanical, optical or solid-state disk drive memory. The processor 401 also includes a power supply 416 which may comprise without limitation batteries, AC/DC power converters, solar cells, or other green energy power sources. The processor 401 may also include input/output device capabilities 415 comprising without limitation USB ports, Common Flash memory Interface (CFI) approved by JEDEC and other standard unit interfaces. The processor 401 also includes connection to a speaker 411 for broadcasting audio signals from the sensor network monitor unit 400 or other sources as needed.

Also, like the remote sensor station 300 of FIG. 3, sensor network monitor unit 400 of FIG. 4 may also comprise artificial intelligence capability 409. Artificial intelligence 409 may include for example and without limitation, image analysis, noise reduction, speech recognition, natural language processing, expert system analysis, fuzzy logic and/or neural networks. Including this capability in the remote subject sensor station 300 of FIG. 3 may compliment that capability also contained in the subject monitoring unit 400 of FIG. 4. In some embodiments of this invention such artificial intelligence capability may be implemented in only one or both of the remote sensor station 300 and/or the sensor network monitor unit 400.

In some embodiments, as described above for FIG. 3 remote sensor station 300, artificial intelligence 409 of the monitor unit 400 of FIG. 4 may comprise image analysis used to detect changes in the object field being viewed, recognition of particular objects, facial recognition, recognition of movements or changes in configuration the object or subject being viewed and the like.

Artificial intelligence 409 of the monitor unit 400 of FIG. 4 may further comprise noise reduction capability. In some embodiments, adaptive filtering may be implemented in the time or frequency domain. Such filtering is capable of isolating audible human speech signals from background white noise, pink noise or music signals and periodic signals such as the above described control tone frequencies. For example, an adaptive filter with frequency domain signal analysis may comprise Fast Fourier Transform (FFT) analysis to separate the received signal into frequency subbands or bins, capability for analyzing said frequency subbands or bins to isolate received noise signals from audio voice signals in the frequency domain and eliminating noise signal levels in the respective frequency subbands or bins. The adaptive filter may then further combine the subbands or bins with reduced noise signal levels and use Inverse Fast Fourier Transform (IFFT) analysis to generate time domain signals representing the desired audio voice signals for broadcasting via said remote subject monitoring station speaker. These and other techniques known to those skilled in the art may be used to separate the desired subject audio signals from the background noise, interference or music picked up by the microphones 109 and broadcast to the monitor unit 102 of FIG. 1.

Artificial intelligence 409 of the monitor unit 400 of FIG. 4 may further comprise expert system analysis for derivation of control signals based on evaluation of received sensor signals with comparison to expert control or output rules. Such expert system analysis is a form of artificial intelligence implemented to emulate the results of human reasoning based on observed conditions. In some embodiments, fuzzy logic, an extension of expert system analysis, may be used wherein allowance is made for uncertainty in variable values with ranges of values defined to accommodate such uncertainties. Ranges for particular variables may in fact overlap depending on expert defined fuzzy logic rules or particular implementations. Expert systems output control or message information is derived to further emulate human reasoning based on concerns, issues or uncertainties in observed conditions. In some embodiments, depending on the number of variables and expert system rules defining variable relationships, the total number of such relationships may grow exponentially and complicate expert system analysis as explained further below. In some embodiments, hierarchical expert systems control may be used to offset such exponential growth in control and complexity as explained further below.

Artificial intelligence 409 of FIG. 4 may also comprise neural networks. Neural networks are yet another artificial intelligence tool for rapid evaluation of various combinations of inputs and derivation of outputs. Neural networks are based on networks of interconnected nodes emulating the structure and interconnection of neurons in the human brain. Such neural networks are trained to respond in particular ways to particular combinations of inputs.

Database access capability 413 of FIG. 4 may be implemented separately or as part of the system software operating on processor 401 for use in accessing system parameters, control information, status information, history, audio recordings, video recordings, image recordings, operational information, contact information, internet addresses, telephone numbers, received messages, alarm signals and/or other information used in the operation of the sensor network monitor unit 400.

As also shown in FIG. 4 the processor 401 may operate with display 402 for displaying images, control information or messages received by the sensor network monitor unit 400. Controls 403 are also integrated with processor 401 for on/off control, speaker volumes, transceiver operations and/or other operational features of the sensor network monitor unit 400.

In addition, as also shown in FIG. 4, sensor network monitor unit 400 may include RF antenna and receiver 404 compatible with the RF antenna and transceivers 309/312 of the remote sensor station 300 depicted in FIG. 3 and/or the monitor center 115 of FIG. 1. Similarly, sensor network monitor unit 400 may include, without limitation, a Bluetooth transceiver 405, Wi-Fi transceiver 406 and/or cell phone transceiver 407 for communication with subject monitoring unit 300 of FIG. 3 and/or subject monitor center 115 of FIG. 1.

Also shown in FIG. 4 is noise and/or interference signal reduction capability 408. As explained in more detail below, the present invention includes the capability to reduce or eliminate background interference and/or noise from signals received from the remote sensor station 300 of FIG. 3. The remote sensor station 300 transmits audible sounds made by the object or subject being monitored. In addition, as explained above, the remote sensor station 300 may also broadcast audible sounds such as white noise, pink noise or music into the environment of the object or subject. As also explained above, the remote sensor station 300 may include directional microphones or directional microphone arrays designed to primarily respond to audible sounds in the direction of the subject. Nonetheless, additional background signals such as noise, music, etc. from the broadcast audible sounds may be picked up to some degree by the remote sensor station 300 microphones 302. Other noise or interference signals generated in the area occupied by the object or subject may also be present in the signal transmitted to the sensor network monitor unit 400. Receiving these additional noise and/or interference sources may be confusing, annoying and/or distracting to users of the remote sensor station 400. It is the purpose of the keep-alive signal processing 408 of FIG. 4 to substantially reduce or eliminate such extraneous noise from the broadcast by the speaker 411 of FIG. 4 while at the same time not reducing or eliminating desired audible sounds generated by the subject or otherwise originating from the surroundings of the subject.

In one embodiment a frequency tone or digital control signal or the like, referred to herein as "keep alive" signals, may be added to the noise signal that is transmitted from the remote sensor station 107 of FIG. 1. Such "keep alive" signals are added during periods of time when no other audio signals other than the added background signals are detected from the subject or subject surroundings being monitored. The "keep alive" signal is not broadcast by the remote sensor station 107 into the area occupied by the subject. Rather it is added as a control signal to the signal transmitted from the remote sensor station 107 to the monitor unit 102. Users of the monitor unit 102 may elect to: (1) always hear all signals transmitted from the remote sensor station 107 to the monitor unit 102 including the added background noise or music signals, any transmitted control tone, and, of course, any audible signals from the object or subject being monitored; (2) to not hear the added background signals but to always hear the transmitted keep-alive control tone or signals, and again, of course, any audible signals from the subject or subject's surroundings being monitored; (3) only hear audible signals from the subject being monitored.

Users may choose option (1) above when it is desired to hear all sounds from the area occupied by the object or subject. Users may choose option (2) or (3) above when it is desired to not hear the background noise signals which can be very distracting or annoying, but at the same time to receive a periodic keep-alive control tone for reassurance that the subject monitoring system is actually operating correctly. When choosing option (1) or (2), controls may adjust the time period between the "keep alive" signals to a time period acceptable to the user. Such time period or interval adjustments may be made at the monitor unit 102 and/or the remote sensor station 107. The volume of "keep alive" control tones transmitted via speaker 103 of FIG. 1 may also be adjusted.

Like the remote sensor station 300 of FIG. 3, the sensor network monitor unit 400 of FIG. 4 may also include a GPS receiver unit 410 for an accurate determination of the monitoring unit position. Other positioning technology not shown may include determining positions based on cellular telephone tower triangulation, Wi-Fi signal location technology or other location determination capabilities known to those of skill in the art. The precise location of the sensor network monitor unit 400 may be important, for example, when reporting alarm conditions to the monitor center 115 of FIG. 1. Including such location determination capability permits the sensor network monitor unit 400 to be moved from location to location or taken on trips and used for example at hotels or in other accommodations.

In addition, like the remote sensor station 300 of FIG. 3, the sensor network monitor unit 400 of FIG. 4 may also include a time/clock unit 414 for providing accurate time information as described above for the remote sensor station 300 of FIG. 3. The time/clock unit 414 may operate off the power supply unit 416 or separate batteries or power supply to ensure accurate time information. Accurate time information may be used for example to control operations of the sensor network monitor unit 400 as discussed above. For example, it may be desirable to initiate or terminate operation of the keep-alive signal under program control at specific times as determined by control parameter settings. It may also be important to transmit accurate time and/or date information with alarm signals and/or status signals transmitted to the network monitor center 118 of FIG. 1.

In addition, like the remote sensor station 300 of FIG. 3, the sensor network monitor unit 400 of FIG. 4 includes input/output ports 415 for access to the sensor network monitor unit 400. As is the case for FIG. 3, these ports may include capabilities comprising, without limitation, USB ports, Common Flash memory Interface (CFI) approved by JEDEC and other standard unit interfaces.

FIG. 5 illustrates exemplary audio signals 500 of a type used in some embodiments in the subject monitoring system and method of this invention. Noise or other background signals 501 may be generated by the monitor unit 102 or the remote sensor station 107 of FIG. 1 and broadcast by speaker 111 to be heard by subject 101. White noise is a random signal with the uniform frequency spectrum over a wide range of frequencies. It is an electronically produced sound that may be somewhat similar to the sound of steady rain. In some embodiments pink noise 502 may be used in place of the white noise 501. Pink noise is a random signal within the audible frequency range whose amplitude decreases as frequency increases. In other embodiments different audible signals may be used, for example, to calm the subject including different types of noise signals, music, a familiar person's voice or other audible signals pleasing to the subject 101.

Audio signal 503 is generated by subject 101 and may be speech signals, shouting or other audible signals. As can be seen from FIG. 5, the frequency domain representation of audio signal 503 is quite different from the background signals 501 or 502. Such differences in the time and frequency domains permit noise reduction software to separate and/or reduce or eliminate audio noise signals 501 or 502 from the audio speech signal 503.

It is to be understood that the microphone array 109 or other microphone implementations of the remote sensor station 107 of FIG. 1 may detect sounds in the area being monitored including sounds from signals such as white noise 501, pink noise 502, other noise sources such as music or a soothing voice, and other audio signals 503 from the subject 101.

In some embodiments, and as explained further below, the monitor unit 102 may broadcast via speaker 103 the total received signal from the remote sensor station 107. In other cases, the user may elect to have the remote sensor station suppress the noise or background component 501 or 502 or the like in the received signal using noise or interference reduction software as explained further below. However, the user may still want to receive a "keep alive" or other control signal such as the periodic sinusoidal signal 504 or the like for providing reassurance to the user that the remote sensor station 107 is functioning properly. In this sense, the periodic sinusoidal or control signal may be considered a "keep alive" signal used to inform the user that the monitoring system of the present invention is indeed operational even though no background noise or audible signals from the subject 101 are being heard. Suppressing the noise component of the received signal before broadcasting over the speaker 103 of the monitor unit 102 will result in a less confusing or annoying signal to be received by the user of the subject monitoring system and method of this invention. Also, the control capabilities 112 of the remote sensor station 107 will permit adjustment of the time between the audible sinusoid or other received "keep alive" signals. Such timing control signals may also be transmitted from the monitor unit 102 to the remote sensor station 107 to select the time interval between "keep" alive signals.

The exemplary sinusoidal waveform 504 is depicted as comprising a sine wave signal of different or varying frequencies. In some embodiments, a single sinusoidal or other predictable signal waveform may be used instead of the multiple frequency sinusoidal waveform 504. In other embodiments, a digital control signal may be used in place of the sinusoidal signal 504 of FIG. 5. The periodic sinusoidal or other control signal inserted into the transmitted signal from the remote sensor station 107 to the monitor unit 102 may be used in various ways. In addition to the keep alive signal, other control or message information may be encoded into these signals.

FIG. 6 illustrates, without limitation, exemplary composite signals 600 of the type described above. The exemplary composite signal 601 comprises, for example, the white noise signal such as white noise signal 501 of FIG. 5 with periodic insertion of the multi-frequency sinusoidal signal 504 of FIG. 5. FIG. 6 also depicts at 602 combining the pink noise signal 502 of FIG. 5 with a single frequency sinusoidal signal as shown. As discussed above, when such signals are transmitted from the remote sensor station 107 to the monitor unit 102 of FIG. 1, the user may elect at the monitor unit 102 using controls 104 to suppress the noise signals in 601, 602 or similarly constituted signals, while only hearing the sinusoidal or other "keep alive" signals. In addition, as discussed above, the periodicity of the audible sinusoidal signals may be adjusted using the controls 112 of the remote sensor station 107. In this way the user can eliminate the annoying audible noise signals while at the same time receiving periodic tones for reassurance that the subject monitor system and method are working properly. In yet another possible configuration, the user may elect to listen to all signals including the noise signals and the periodic sinusoidal signals and subject audible signals and all other audible signals that may be detected by the microphones 109 of the remote sensor station 107 of FIG. 1. In yet another configuration the user may elect to only hear audible speech signals such as signals 503 of FIG. 5. It is clear from the above that the system and methods of the present invention provide maximum flexibility to the user in choosing which audible signals to hear while monitoring the subject 101.

FIG. 7 illustrates in more detail operations 700 involving the microphone array 109 of the remote sensor station 107 shown in FIG. 1. The microphone array 109 is indicated as microphone array 703 in FIG. 7. The microphone array 703 is used in the implementation of the beamforming and noise cancellation capability 700 of FIG. 7. The microphone array operates with beamforming software and/or hardware 704 to form a directional acoustical beam 705 primarily sensitive to audible signals emanating in the area covered by such a directional beam 705. For example, configuring the beamforming capability to be directed toward the subject 701 will result in primarily picking up audible signals in the direction of subject 701, while being less sensitive to other audible signals such as noise 702 illustrated in FIG. 7. In this way audible signals that may mask desired audible sounds from the subject 701 or otherwise confuse the user of the subject monitor system 100 of FIG. 1 can be at least partially excluded from the detected audio signal. In some embodiments, the beamforming noise cancellation system may be capable of automatically directing the beam to the audible sounds from the subject 701. In other embodiments, the beam may be manually adjusted or be directed by physical placement of the remote sensor station 107 and the subject 701.

As further illustrated in FIG. 7, the beamforming noise cancellation capability 700 may also include additional signal processing capability 706. This signal processing capability may include further noise reduction for extraneous or leakage noise sources outside the main beam lobe. In addition, this further signal processing may be used to add the sinusoidal or other control "keep alive" signals 504 of FIG. 5 to the noise signals to result in composite signals such as signals 601 and 602 of FIG. 6. As explained above, these additional sinusoidal or other control signals may be used to selectively eliminate background noise signals transmitted from a speaker 103 of the monitor unit 102 of FIG. 1 thereby reducing or eliminating background noise that the user may find annoying or confusing when monitoring the subject's activities.

As further illustrated in FIG. 7, the composite audio output signal may be passed to transmitter 707 and antenna 708 for transmission to the monitor unit 102 and/or the monitor center 115 of FIG. 1. As described above, this transmitter may be implemented, without limitation, with a Bluetooth, Wi-Fi, cellular telephone or other appropriate signal transceiver for communications.

Also illustrated in FIG. 7 are control signals including beamforming control 709, signal processing control 710 and transmitter control 711. These control signals may be used to select particular operations of the acoustic beamforming, signal processing and transceiver capabilities. It is to be understood that all of the beam forming, signal processing and control may be implemented separately or integrated with the processor control of FIGS. 3 and/or 4.

FIG. 8 illustrates, without limitation, exemplary controls 800 for the subject monitoring system and methods of the present invention. These controls may be implemented in a variety of ways familiar to those of skill in the art. For example, dials and/or switches may be employed to select specific control options. In some embodiments, control options may be shown on the display 105 of monitor unit 102 as illustrated in FIG. 1 and/or other displays not shown on the remote sensor station 107. It is to be understood that, in different embodiments of this invention, the exemplary control options of FIG. 8 may be implemented in both the monitor unit 102 and the remote sensor station 107 or be implemented in just one of the monitor unit 102 and the remote sensor station 107, or those control options may be distributed with some being implemented in the monitor unit 102 while others are implemented in the remote sensor station 107 of FIG. 1. That is to say, remote control capabilities may be distributed between the monitor unit 102 and the remote sensor station 107 using the communication capabilities of those units. In some embodiments, control options may also be executed by remote processors including cloud processor and storage configurations. In some embodiments control processing may be implemented on a distributed basis between monitor unit 102, the remote sensor station 107 and the cloud computing such as cloud computing 120 in FIG. 1. Distributed processing may also extend to the network monitor center 118 of FIG. 1. Results of such distributed processing may be displayed on display 801 and/or other displays associated with distributed processing configurations.

Exemplary display 801 is illustrated in FIG. 8 with indicated display icons 802. The display 801 may be controlled from external controls such as a keyboard or mouse pointer arrangement. In some embodiments, the display 801 may also be implemented, without limitation, as an interactive, touchscreen display with display options selected by the touch of a finger and/or an appropriate stylus depending on the implementation of the touchscreen display. Possible interactive display technologies include, without limitation, capacitive touchscreens, electromagnetic radiation sensitive touchscreens, optical sensitive touchscreens and pressure sensitive touchscreens. Touchscreens sensors may be implemented as an integral part of the display 801 with control electronics integrated into that display. Alternatively, sensors located around the periphery of the display 801 may be used to determine the XY coordinates or positions of a finger or stylus used to select particular icons.

FIG. 8 also provides, without limitation, exemplary control options for the monitoring system and methods of the present invention. Nine exemplary high-level controls are indicated which may be accessed, for example, through the nine indicated icons 802 of the display 801. In addition to control of the display 801, eight high-level icons permit user selection of the particular features to be controlled with exemplary features including, without limitation, audio signals, video signals, medical signals, process signals, followed IOT sensor signals, transceivers, telecommunication network alerts and artificial intelligence settings. Selecting any one of these control options may result in the dynamic changing of the interactive control screen 801 to display another level of control options. An example of such operation is illustrated in FIG. 8 wherein selection of the top-level icon 803 results in opening of three additional icons 804. Additional levels of control may also be implemented wherein selecting one of the icons 804 will result in opening yet another level of control icons or objects.

For example, selecting the high-level "display" icon may open additional icons for further control of the display including options, for example and without limitation, screen configuration, brightness and/or zoom control. Selecting the high-level "display" icon may also, for example, open additional icons for control of the display of video signals used to capture activities of the subject 101 and/or activities in the area surrounding the subject 101 of FIG. 1.

Selecting the high-level audio signal icon may open additional levels of control for selecting, for example, white noise or pink noise as illustrated in FIG. 8 or other audible signals not shown. Additional control options may include time periods during which the background white noise or pink noise or other suitable sounds are to be broadcast from the remote sensor station 107 to the area surrounding the subject 101. Other control options may include keep alive signal parameters, the volume of the background sounds and/or other sound control parameters.

As also illustrated in FIG. 8, selecting the high-level audio signals icon may give access to further lower level icons to control acoustical beamforming operating with a microphone array 109 of the remote sensor station 107 of FIG. 1. Beamforming options may include, without limitation, enabling acoustical beamforming, disabling acoustical beamforming, beam configuration, beam width, and/or selectively directing the main beam in selected directions depending upon the physical configuration of the subject environment and the object or subject 101 relative to the remote sensor station 107 of FIG. 1. While acoustic beamforming serves to reduce pickup of extraneous noise by the microphone array, depending on the situation, leakage noise from other sources not located in the main lobe of the acoustic beam may also be present. For this reason, it may be desirable to implement yet further noise reduction prior to transmission to the monitor unit 102 of FIG. 1. Control options for this purpose may include enabling or disabling such additional noise reduction and/or selecting particular parameters to be used in further noise reduction algorithms.

Selecting the high-level "audio signal" icon in FIG. 8 may also provide user control over the signal to be transmitted from the remote sensor station 107 to the monitor unit 102 of FIG. 1 of the present invention. Several options for such signals may exist including those listed in FIG. 8. In one exemplary option, the transmitted signal includes the background noise or other accompanying sounds plus any subject audio signals detected by the microphones 109 of FIG. 1. A second exemplary option transmits the same signals and also includes the periodic "keep alive" signal such as the "keep alive" sinusoidal signals depicted in FIGS. 5 and 6 and described above. As described above such "keep-alive" signals may be used by the remote sensor station 107 of FIG. 1 to control the broadcast of selected signals via speaker 111 of the remote sensor station 107. As also discussed above, this capability permits suppressing or eliminating confusing or unwanted background signals from those audible signals transmitted to the monitor unit 102 while still ensuring that the subject monitoring system is operating properly and while still permitting transmission of audible sounds from the object or subject 101. Yet a third signal selection option indicated in FIG. 8 permits transmission of only the keep alive sinusoidal signals of FIG. 6 together with any object or subject 101 audible sounds. This option suppresses the background noise signals from the signal actually transmitted from the remote sensor station 107 to the remote monitor unit 102 of FIG. 1. In a yet another option only detected audible sounds from the object or subject 101 may be broadcast by the remote sensor station 107 speaker.

Video signal controls indicated in FIG. 8 may include controls for selecting full-motion video, still images or the use of infrared imaging. Particular image analysis software may also be selected for the corresponding image capture.

As further indicated in FIG. 8, in some embodiments one of control icons the control display 801 may be dedicated to the analysis of medical sensors for persons being monitored. Such sensors may include, for example and without limitation, temperature sensors, blood pressure sensors, cardiac sensors and/or oxygen sensors. Medical sensors may, for example and without limitation, be worn by the persons being monitored, implemented in the person's clothing or implanted in the persons being monitored.

As also indicated in FIG. 8, in some embodiments a control icon for process monitoring may be implemented in the display 801. Such processes may include, for example and without limitation, manufacturing processes, material flow processes and logistic control processes involving movement materials or products or the transportation needs for such movement.

In some embodiments it may be desirable or even important to be made aware monitoring and control results for other remote sensor stations as indicated in the sensor monitoring network of FIG. 2A. In an aspect of this invention such monitoring of the remote sensor stations may be implemented by designating certain other remote sensor stations to be "followed" by an individual remote sensor station. As indicated in FIG. 8, such following may include audio/video/medical/process alerts from other remote sensor stations. Other shared alerts may include, without limitation, alerts for weather, traffic, crowds, pipeline status, utility power systems, emergency alerts and even terrorist alerts. In this way a given remote sensor station may be made aware of situations of concern at other remote sensor stations. These other remote sensor stations may be in close proximity to the following remote sensor station. In addition, such "following" may be used to track results from other remote sensor stations not necessarily in close proximity to the remote sensor station but still important in the evaluation of overall situations of concern.

Selecting the high-level signal transceiver icon of FIG. 8 provides user control of selected radio frequency or other transmission system capabilities for communications between the monitor unit 102, the remote sensor station 107 and/or the monitor center 118 as illustrated in FIG. 1. As indicated in FIG. 8, selection of the signal transceiver icon may cause opening of additional icons on the interactive displays allowing, without limitation, configuration of system communications for use of Bluetooth, Wi-Fi or cellular technology. For example, without limitation, such communications with the monitor center 118 may be connected through cellular telephone, microwave, fiber-optic link, cable communications, wired connections or other appropriate telecommunications media. Also, the monitor unit 102, may communicate through Wi-Fi or Bluetooth connections to a local router for connection to broader telecommunication networks. In some cases, it may be appropriate to also specify data rates, transmission times, transmission formats, or other telecommunication system parameters for operative connection to the chosen telecommunications media.

Selecting the high-level artificial intelligence (AI) icon permits managing the use of the various AI options including parameter selections, signal processing operations, and control and/or warning signal generation as discussed above and in greater detail below.

In the various embodiments discussed above, selecting a high-level icon in FIG. 8 enables user selection and enablement of particular alarm conditions for the generation of alarm signals. Selecting particular icons may open additional icon selections for configuration of particular alarm situations. As shown in FIG. 8, possibilities include, without limitation, audio alarms, video alarms, medical alarms, process alarms, followed IOT alarms, telecommunication network alarms. For example, alarm conditions for monitoring subject people may include movements, extended silence, medical conditions, presence of an intruder, undesired presence of pets or animals, and unacceptable environmental conditions such as out of range temperature or the presence of dangerous gases, smoke or fire. Medical alert conditions may include, without limitation, lack of response from the subject, subject temperature, blood pressure, oxygen levels or pulse rate. In some embodiments, the subject may wear a medical monitoring device not shown such as an arm or leg bracelet to monitor critical subject medical parameters.

As also discussed above, transmitted alarm signals may also include specific location information such as, without limitation, GPS location of the object or subject 101. Including this capability permits the monitor unit 102 and/or the remote sensor station 107 to be moved from place to place or even carried on a trip to a distant location while still being operative to transmit alarm signals to/from the monitor center 118 or other appropriate locations with those alarm signals including the current location of the object or subject situation needing attention. Knowing the location can be important in derivation of information or warning messages depending on the situations at particular locations.

As further described below, FIGS. 9, 10A and 10B illustrate, without limitation, an exemplary flowchart for operations for the exemplary networks of FIGS. 1, 2A and 2B as discussed above. In some embodiments the operations of FIGS. 9, 10A and 10B may be distributed between the remote sensor station 107, the monitor unit 102 the network monitor center 118 or other accessible distributed cloud or processing capabilities of FIG. 1. The operation may be automatically or manually initiated at the start block 901. The control setup and initiate block 902 analyzes and initializes the various control inputs from the users of the subject monitoring system of this invention. Such control inputs may include, without limitation, for example, those control operations described in FIG. 8 above.

Having initiated the subject monitor unit 102, control is passed to one or more of exemplary sensor input blocks audio sensor inputs 903, image sensor inputs 904, medical sensor inputs 905, process sensor inputs 906, followed remote sensor station inputs 907 and/or telecommunication network sensor inputs 908. It is to be understood that some embodiments may have a subset comprising one or more but not necessarily all of these sensor inputs 903, 904, 905, 906, 907 and 908. Sensor inputs of FIG. 9 may include detection of network cyberattacks and malicious hacking of network connected devices and sensors, telecommunication facilities, data processing and storage facilities, and information collected, stored, transmitted and processed in the IOT network. Also, other sensor inputs not specifically included in FIG. 9 may be used in some embodiments without departing from the teachings of this disclosure.

Exemplary more detailed identification of possible capabilities of each of the sensor inputs 903-908 are provided via flowchart connectors A-F identified as 909, 910, 911, 912, 913 and 914 respectfully in FIGS. 9, 10A and 10B. Based on analysis of the identified sensor inputs, as described in more detail below, exemplary expert systems warning indices are derived at 915 categorizing each as presenting very low, low, medium, high or very high danger or concern for each of the monitored subjects or objects as discussed above. Based on these categorizations, artificial intelligence expert systems or fuzzy logic analysis 916 provides comprehensive composite derivation of appropriate warning signals informing users of where the most urgent problems may exist and directing corrective actions according to the relative degrees of danger for each monitored subject or object as described above. Exemplary artificial intelligence analyses are described via connector G 917 of FIG. 9 at FIGS. 12-19 as indicated.

Based on the above artificial intelligence analysis, warning alarm decisions 918 are made. If no alarms are indicated, control is returned to control block 902 via path 920. If alarm signals indicate the need for corrective actions, those alarms are transmitted at 919 and control returned to control block 902 via path 920.

Analysis of exemplary audio sensor inputs 903, image sensor inputs 904 and medical sensor inputs 905 via connectors A 909, B 910 and C 911 of FIG. 9 are shown in more detail in analysis diagram 1000 of FIG. 10A. The connectors A 1001, B 1007 and C 1011 correspond to connectors A 909, B 910 and C 911 respectfully of FIG. 9. Similarly, analysis of exemplary process sensor inputs 906, followed IOT sensor inputs 907 and telecommunication network sensor inputs 908 via connectors D 912, E 913 and F 914 of FIG. 9 are shown in more detail in the continuation of analysis diagram 1000 of FIG. 10B. The connectors D 1016, E 1018 and F 1020 correspond to connectors D 912, E 913 and F 914 respectfully of FIG. 9. It is to be understood that the analysis capabilities depicted in FIGS. 10A and 10B are exemplary. Other embodiments may have a subset of the illustrated capabilities of FIGS. 10A and 10B or other capabilities not shown without departing from the teachings of this disclosure.

Referring now to Background Audio Processing 1002, as explained above and illustrated in FIGS. 5 and 6, the audio sensor signal analysis may include background audio processing with broadcast audible sounds such as white noise, pink noise, music or other selected sounds into the environment of the object or subject being monitored. These background sounds may be picked up by sensor microphones and transmitted back to the sensor stations. In some embodiments or operations, it may be desirable to suppress these known background sound signals prior to listening to or recording sounds from the monitored subject or object. The Background Audio Processing 1002 may provide such audio signal filtering to remove these retransmitted background signals. As also explained above and illustrated in FIGS. 5 and 6, when such known background signals are removed, it may be desirable to transmit periodic "keep alive" signals from the subject or object monitors to ensure that the units are operating correctly despite such selective background signal suppression. For example, this capability may be especially beneficial when monitoring infants or other persons in need of special care.

As explained above and illustrated in FIG. 7, Acoustic Beamforming 1003 may be implemented in some embodiments with a microphone array comprising one or more microphones used to listen to sounds from the object or subject being monitored. Arrays permit the use of microphone beamforming in the direction of sounds emanating from the subject while reducing sounds received from other directions. Microphone arrays use beamforming software to create acoustical beams with a main lobe directed at the object or subject for attenuating or perhaps essentially eliminating sounds arriving at the microphone from different directions. In some embodiments, acoustic beamforming 1003 makes use of analog-to-digital converters with transversal filters for filtering individual digital microphone signals with adaptive filter weights permitting adaptive variation of the acoustic beam pattern and side local structure.

As also explained above, in some embodiments acoustic noise reduction 1004 may comprise time and/or frequency domain noise reduction adaptive filtering. Including the use of Fourier transform analysis with the frequency domain divided into sub-bands for frequency selective signal evaluation.

As also explained above, in some embodiments speech recognition 1005 may be used to recognize particular spoken words, commands or phrases. Natural language processing 1006 may be used for automatic contextual understanding of input signals or messages to facilitate automatic response to those signals or messages.

As also explained above, image sensors 904 of FIG. 9 may comprise, for example, video, still image, or infrared visual monitoring of the object or subject 101 and/or the surrounding area. Exemplary image analysis capability is depicted in FIG. 10B via connector 910 of FIG. 9 and corresponding connector 1007 of FIG. 10A.

Analysis of image sensor signals may include image filtering/enhancement 1008 in the time and/or frequency domain depending on the application. Time domain filtering may be used to recognize time varying situations in the received image sensor signals such as movements of the object or subject being monitored or new image features. Frequency domain filtering including the use of Fourier transforms or Fast Fourier transforms (FFT) may be used to analyze and capture frequency domain characteristics of individual images including gradient changes in image intensity or contrast that may be compared from image to image to assist in ascertaining changes in the image content. Two-dimensional frequency domain filtering of portions or all of an image may be used. Time domain and/or frequency domain filtering may be used to improve image quality for further analysis.

Image pattern recognition and/or feature extraction 1009 may be used to discover particular patterns or features in the captured images. Such pattern recognition and/or frequency extraction may include capabilities such as facial recognition or recognition of particular patterns expected to be found in the image and alerts when such patterns are not found.

Image/Tile feature comparisons 1010 may be used for individual images, successive images or frames of video images to monitor for changes in the captured image which may indicate concerns about image content. In some embodiments images may be segmented into multiple tiles representing a subset of a total image with comparison of tile content from image to image to monitor for changes in tile image. Such changes may indicate potential problems or concerns about the subject or object being monitored.

As also explained above, medical sensors 905 of FIG. 9 may be analyzed via connector 911 represented as connector C 1011 in FIG. 10A. Such medical sensor analysis may comprise temperature sensor analysis 1012, blood pressure sensor analysis 1013, pulse sensor analysis 1014 or oxygen sensor analysis 1015 or other medical sensors used to monitor the medical condition of a subject. Other medical sensors may include sensors implanted in the body or tissues of a subject being used for tracking selective medical parameters or bodily functions of the subject.

Sensor signal analysis 1000 of FIG. 10A is continued in FIG. 10B. Analysis of process sensor inputs 906 of FIG. 9 are provided by connector D 912 at corresponding connector D 1016 of FIG. 10B listing exemplary process sensor analysis operations 1017. As indicated at 1017 process sensor analysis may include inputs from process equipment sensors. Such process equipment may include, without limitation, manufacturing equipment, robotic equipment, BOTS, production line monitoring equipment, transportation equipment including air, ground and rail transportation, chemical processing equipment, drones, computer processing equipment, data storage equipment, or any equipment used to facilitate process operations.

As also indicated in the process sensor analysis 1017, input sensor data indicating the status of process materials necessary for the execution of particular processes may be collected for analysis. Such data may reflect process material parameters such as material availability, quantity, quality, alternatives, location or other parameters descriptive the materials necessary to carry out a given process.

As also indicated in the process sensor analysis 1017, input sensor data indicating process maintenance requirements including maintenance schedules, required downtimes, maintenance results, and projected maintenance issues based on process equipment status monitoring. Such status monitoring may indicate, for example and without limitation, operational parameters indicative of future performance issues that may arise in the execution of the process.

As also indicated in the process sensor analysis 1017, input sensor data indicating process schedules including precedent requirements for execution of particular processes and materials required for that execution. Such scheduling may impact other operations throughout the Internet of Things being monitored. Informing monitoring units in controllers throughout the network may greatly facilitate efficient execution of distributed operations in that network.

As further indicated in FIG. 10B, followed IOT sensor monitor unit inputs 908 from FIG. 9 may be analyzed via connector E 914 of FIG. 9 represented by corresponding connector F 1018 of FIG. 10B. In some embodiments, it may be important for individual Remote Sensor Stations 107 and/or Monitor Units 102 of FIG. 1 to be made aware of the status of results from other Remote Sensor Stations or Monitor Units located throughout the network. In this case, individual Remote Sensor Stations or Monitor Units may elect to "follow" or be informed of the monitoring results of those other Remote Sensor Stations or Monitor Units. Factors that may enter into such decisions to "follow" other stations or units may include, without limitation, proximity to those other stations or units, criticality of operation of those other stations or units, concerns for dangerous conditions being detected at those other stations or units and/or dependence on the operation or status of other objects or sensors being monitored at those other units. In this way, the overall operations of the present IOT monitoring system may be extended to include distributed interdependent or critical operations being monitored and analyzed throughout the network.

As indicated at 1019, parameters and/or analysis results from other "followed" remote sensor stations or monitor units may include results from audio sensors, image sensors, medical sensors, process sensors and/or telecommunication network sensors as discussed above. Reporting from such "followed" stations and units may include an evaluation of the overall stations or unit monitoring signal status and indication of any dangerous or other concerns arising from such an evaluation.

As further indicated at 1019, multiple other potential situations including environmental concerns such as whether, critical traffic or crowd concerns, critical equipment failures such as failures involving pipelines or public utilities or police reported criminal activities including terrorist alerts may be widely reported throughout the network to all remote sensor stations and monitoring units that have chosen to follow such concerns. In some cases, such concerns may be widely reported to remote sensor stations or monitoring units without those stations or units registering to receive warnings for such concerns.

As further indicated in FIG. 10B, telecommunication network sensor inputs 908 from FIG. 9 may be passed to connector F 914 to corresponding connector F 1020 of FIG. 10B. Exemplary sensor networks communication elements including selected telecommunication elements and potential telecommunication network faults are depicted in FIGS. 2A and 2B as discussed above. As shown in FIG. 10 B 1021 telecommunication network sensors may include individual link sensors including transmitters, receivers, repeaters, antennas, signal amplifiers, link power sources, physical wireline or optical cables and other resources involved in implementing a particular telecommunications link. In addition, as indicated at 1021, telecommunication sensors may provide signal quality signals for individual links including measurements such as signal power, signal-to-noise ratio, multipath interference issues, adjacent channel interference, data error rates or other parameters indicative of the signal quality on respective telecommunication links.

As also indicated in FIG. 10B, individual link modems may be monitored with modem sensors providing information on operational parameters for the modems for various modulation formats including AM, FM, PM, signal multiplexing formats and multiple other parameters. Problems or issues involving the signal modulation can be detected and reported for further evaluation.

In addition, as indicated at 1021, signal link quality and/or modem sensor monitor parameters and switching node parameters may also be monitored using sensors to indicate the operational capability of such switching nodes including failures and traffic congestion.

Modern communication networks make use of data routers to route individual data packets to desired destinations. Such routers are used at both the network level and at the periphery the network including commonly used Wi-Fi routers and routers in cellular networks. Monitoring of such routers as also indicated that 1021 of FIG. 10B.

As also indicated at 1021 of FIG. 10B and illustrated at 219 in FIG. 2B, the monitoring systems of this network may include detection of failures of telecommunication subnetworks. Such a failure will clearly affect all sensor nodes in the failed subnetwork. In addition, failures of a particular subnetwork may impact IOT sensors and monitoring nodes not directly connected to that failed subnetwork. For example, a particular subnetwork may correspond to resources necessary to rectify problems in other areas of a total network. A global failure of that subnetwork could impact objects or situations located in other parts of the total network. In another example, failures in a subnetwork may correspond to power outages in particular areas. Such power outages may impact advisable activities in other areas of the total network. In yet another example, failures corresponding to release of dangerous gases, liquids or other materials in one subnetwork may impact other areas of the total network. Failure of the subnetwork communications may interrupt communications with other portions of total network to report the dangerous situation.

In some embodiments, the various sensor measurements discussed above may vary with time. Time series analysis may be used to maintain history files with analytic evaluation of those files to determine parameter ranges, changes in parameter values, statistical analysis of successive parameter values, regression analysis, predictions, or other analytic evaluation of the time varying sensor inputs. Without limitations, time varying sensor measurements may be collected in cloud storage facilities with history files and access to big data analytics provided for the analysis of such data files. Based on such analysis, machine learning based on statistical trends in parameter values may lead to improved performance.

It is to be further understood that while sensor signal analyses of FIGS. 10A and 10B are shown as serial operations, such signal analysis operations may be carried out selectively, in parallel, or on a distributed basis without departing from the teachings of this invention. It is also to be understood that other and/or additional sensor signal analysis operations not specifically set forth in FIGS. 9, 10A and 10B above may be employed without departing from the teachings of this invention.

FIG. 11 depicts, without limitation, an exemplary expert mapping 1100 of sensor signal analysis results to an exemplary expert sensor rating scale 1101. Example rankings 1102 include derived parameters for audio sensor signals, video sensor signals, medical sensor signals, process sensor signals, followed IOT remote sensor monitor unit sensor signals, and telecommunication network signals. It is to be understood that other sensor parameters may be used in addition to or in place of the exemplary parameters of FIG. 11 without departing from the teachings of this invention. Derived signal parameters are mapped, for example, onto a scale from 0 to 1. Mappings of 0 correspond to derived parameters that present absolutely no danger or concern to the object or situation being monitored. Mappings of 1 correspond to derived parameters that indicate the maximum danger or concern to the object or situation being monitored. Mappings may be defined by experts. As further explained below and illustrated on the exemplary sensor ranking scale 1101 of FIG. 11, the degrees of danger between 0 and 1 may be partitioned into defined ranges corresponding to very low danger, low danger, medium danger, high danger, or very high danger. Such partitioning may be useful in simplifying reporting results or in implementing artificial intelligence expert system analysis and/or fuzzy logic analysis and the derivation of overall danger warning and/or control signals.

Returning now to the exemplary listing of parameters at 1102 of FIG. 11, audio speech signals may be parsed for selected keywords being ranked on a scale from 0 to 1. Particular ranking may depend upon the subject being monitored. A crying screaming infant may be ranked higher on the scale than other audible signals from the infant such as harmless babbling. At the same time, and infant continually asking for "mommy" may be ranked higher than harmless babble but lower than crying and screaming. Spoken words from older persons may be ranked according to the urgency that such words they convey. Words or phrases such as robbery, gun, don't shoot, help, I have fallen, heart attack, danger or gun shots would receive a higher ranking than phrases or words expressing less urgency. In addition to speech recognition for keywords, natural language processing may be used to derive complete phrases or sentences from the detected audio signals. Modern natural language processing ascertains meaning of such complete phrases or sentences useful in understanding concerns or dangerous situations being described by a speaker. Here again, expert defined rankings from 0 to 1 on the scale 1101 may be made.

In a similar manner results from image, video or infrared signal processing 1007 may be ranked on a scale from 0 to 1 as shown in FIG. 11. Changes in the image fields may indicate a range of dangerous situations or situations of concern. Any movement in a field-of-view that is supposed to be stationary may be a concern. Image analysis may include definitions of smaller sections of image defined as tiles with comparison of tiles from one image to the next for changes. Motions in the image field being monitored outside the area were the subject is located may indicate dangerous situations. Detection of rapid changing movements of individuals in the field-of-view may indicate a conflict or even fighting. Facial recognition may also be used to generate appropriate warning signals on the defined scale of FIG. 11.

As further indicated in FIG. 11, medical sensor signal analysis 1011 may be used to monitor parameters such as the subject temperature, blood pressure, pulse, oxygen levels or other important medical parameters. Here again the individual parameters may be ranked on a scale from 0 to 1 depending on their deviation of expected normal readings. Medical sensors may be attached to the subject, implanted in a subject, integrated into the subject's clothing or otherwise worn or placed in defined proximity to the subject for monitoring purposes.

As further indicated in FIG. 11, process sensor signal analysis 1017 may be used to monitor the state of a defined process. An example would be monitoring of a manufacturing process with sensors used to monitor manufacturing equipment, materials used in the manufacturing process, situations requiring maintenance, automated robotic equipment and/or monitoring of the entire process with comparisons to required manufacturing schedules. Other processes that may be monitored include, for example, chemical processes, transportation processes, computer processes including data processing and storage systems and interrelated activities of personnel in the execution of particular processes.

In some embodiments, it may be desirable for a given remote sensor station 107 in FIG. 1 to communicate or follow results from other different remote sensor stations as indicated at 1019. The results from those other different remote sensor stations may indicate a dangerous situation or situations of concern for the given remote sensor station. For example, an emergency detected at a different remote sensor station in defined proximity to a first remote sensor station may serve as an alert calling for action at that first remote sensor station. Also, for example, any of the above audio, image, medical or process sensor parameters at the remote sensor station may give rise to such an alert. Other situations detected at other remote sensor stations that may be cause for concern include, but are not necessarily limited to, bad weather, traffic congestion, crowds, gas or water or petroleum or chemical pipeline failures, utility systems including electric utilities, police emergencies or terrorist alerts and the like. In some cases, these alerts from other remote sensor stations may be more critical when the remote sensor stations are the close proximity to one another.

As also indicated at 1102 of FIG. 11, telecommunication network sensor signal analysis may include multiple communication parameters as discussed above. FIG. 11 identifies, without limitation, multiple such parameters including communication links error rates, signal-to-noise ratios, traffic congestion delays, lack of telecommunication system response, reported link outages, reported processing node outages, reported storage outages and reported subnetwork failures as discussed above. Here again, expert input may be used to map such telecommunication issues onto the expert sensor ranking scale 1101.

FIG. 12A depicts in matrix form artificial intelligence expert system relationships 1200 between two selected parameters resulting from analysis of audio sensor inputs and video sensor inputs that may be used in some embodiments of the present invention. As indicated in FIG. 12A, the ranges for audio and video parameters are divided into exemplary subranges corresponding to very low, low, medium, high and very high as shown in FIG. 11. For each combination of such values for the two parameters being considered in FIG. 12A, an artificial intelligence expert decision rating is provided indicating degree of danger indices for each commination. These danger indicators are provided by audio and video parameter analysis experts and are part of an artificial intelligence expert system database. As indicated in FIG. 12A, the combined audio/video danger indicators may be defined by such experts as, for example, being very low, low, medium, high, and very high. In the exemplary embodiment depicted in FIG. 12A, twenty-five such expert system defined rules are shown.

The combined warning/control matrix 1200 of FIG. 12A forms the basis of an artificial intelligence intelligent system. For example, each of the results indicated in FIG. 12A may be expressed in propositional calculus logic form, for example, as follows:

1. If audio danger is low and the video danger is high, then the combined warning and control index is high.
2. If audio danger is very high and the video danger very low, then the combined warning index is very high.
3. If audio danger is very low and video danger is medium then the combined warning and control index entry is medium.

Clearly 25 such logical statements exist for the entries in FIG. 12A. For each such logical statement, a combined warning and control index for the given combination may be determined by the expert system of the present invention. The combined warning and control index may be displayed on the display 801 of FIG. 8 in various forms including text messages, flashing, with audible messages from the speakers of FIGS. 3 and/or 4 or with a combination of such visual or audible alerts.

The artificial intelligence expert system matrix of FIG. 12A is symmetric with respect to the two variables, audio and video. That is to say, every row of the matrix is identical to the corresponding column with the result that the matrix entries are symmetric about each of the two diagonals. The result is that equal weight is given to each of the two audio and video variables.

It is also to be understood that in some embodiments it may be desirable to establish priorities between sensor variables. For example, it may be important to prioritize certain medical sensor parameters over audio sensor and over sensor parameters. One way of favoring one variable over another is to add an expert defined value to the result obtained from the expert sensor ranking scale of FIG. 11. For example, if the calculations for ranking a variable resulted in a value of 0.3 in FIG. 11, adding 0.1 to that value would increase the danger warning for that particular variable from "low" to "medium." The subsequent expert system or fuzzy logic analysis would then favor the results derived from the modified sensor values sensors over the results from unmodified sensors.

In still other embodiments, where it is desirable to prioritize or give more weight to a selected parameter, an unbalanced expert defined matrix may be used. One such exemplary unbalanced matrix is shown in FIG. 12B. For example, in the case where the audio signal analysis indicates a very low danger and a video signal analysis indicates a high danger, then the combined warning and control index is set at medium as indicated in FIG. 12B. In this case, the very low audio warning and control index is given priority or increased weight. Even though the video warning and control index is high, the artificial intelligence expert system analysis results in lower danger warning and control index of medium. If both audio and image parameters are high, the combination is an output warning index of very high, indicating that the high combination of two inputs is interpreted as a very high warning condition. The matrix of 12B is defined by an expert and reflects the expert's opinion concerning importance of individual variables and combinations of those variables.

In other embodiments of the present invention, the above described decision-making process may be augmented with the use of fuzzy logic. It is clear from the above discussion that the audio and video parameter values will be variables with certain ranges of uncertainty. For example, in the analysis of FIG. 11, hard boundaries are set between the different ranges of very low, low, medium, high and very high. These hard boundaries do not actually exist in the real world. Human decision making is more nuanced and not subject to such binary decisions based on defined limits or boundaries. In some embodiments, analyses that provide for a more gradual transition between defined ranges are more appropriate. As described below, artificial intelligence expert systems using of fuzzy logic is particularly well-suited for deriving control rules for variables with such uncertainty. It is to be understood that artificial intelligence expert system derivations may be implemented without fuzzy logic as described above. The use of the above described expert defined propositional logic rules may be sufficient for some embodiments as described above. That said, fuzzy logic has found expanded uses in the development of sophisticated control systems. With this technology, complex requirements may be implemented in relatively simple, easily managed and inexpensive controllers. It is a simplified method of representing analog processes on a digital computer. It has been successfully applied in a myriad of applications such as flight control systems, camera systems, antilock brakes systems, washing machines, elevator controllers, hot-water heaters, decision analysis, and stock trading programs.

With fuzzy logic control, statements are written in the form of the propositional logic statements as illustrated above. These statements represent somewhat imprecise ideas reflecting the states of the variables. The variable ranges for audio and video parameters indicated may be "fuzzified" as fuzzy logic variables extending over the defined overlapping ranges as shown, for example, in FIG. 13 at 1300. Fuzzy logic systems make use of "fuzzifers" that convert input variables into their fuzzy representations. "Defuzzifiers" convert the output of the fuzzy logic process into "crisp" numerical values that may be used in system control. It is to be understood that while the exemplary fuzzy logic analysis of FIG. 13 is based on the illustrated triangular membership functions, other such overlapping membership functions may be used such as Gaussian, exponential or other functions selected for particular applications.

For example, the graph 1301 of FIG. 13 illustrates such a possible "fuzzification" for the audio warning and control index variable with overlapping ranges indicated in the figure. In this example, on a scale of 0 to 1.0, the normalized audio warning and control index from FIG. 11 is rated at 0.85. As illustrated in the FIG. 13, an audio warning and control index rating of 0.85 results in a degree of membership (DOM) of 0.70 in the membership class "high." In this particular example, the warning and control index rating of 0.85 does not result in membership in any other of the possible membership classes.

In a similar way, in the graph 1302 of FIG. 13 "fuzzification" of the video warning and control index variable is illustrated. On a scale of 0 to 1.0, a normalized video warning and control index value of 0.45 results in a DOM of 0.6 in the video "medium" membership class and 0.15 in the "low" membership class. These DOM values may in turn be used in the fuzzy logic implementation to derive a defined, "crisp" numerical value for a combined warning and control index.

In the above example of FIG. 13, the composite warning and control index depends on the degrees of membership of the audio signal analysis "or" the video signal analysis. The conjunctive relation "or" corresponds to the logical intersection of the two sets corresponding to the audio and video variables. In this case the appropriate DOM is the maximum DOM for each of the sets at the specified time. This is expressed algebraically as follows:

$$(A \cup B)(x) = \max(A(x), B(x)) \text{ for all } x \in X$$

Premises connected by an "AND" relationship are combined by taking the minimum DOM for the intersection values. This is expressed algebraically as follows:

$$(A \cap B)(x) = \min(A(x), B(x)) \text{ for all } x \in X$$

The conjunctive relation "or" requires the use of the maximum value of the respective DOM's. These values may be used to defuzzify the warning and control index degree of membership. As shown in 1303 of FIG. 13, fuzzy ranges for the warning and control index may be defined in a similar manner to the audio and video variables. A numerical "crisp" value for the warning and control index can now be derived using defuzzification procedures. As shown in FIG. 13, the DOM ranges for the warning and control index are capped at values corresponding to the above analysis for the DOMs of the audio and video variables. The final "crisp" numerical value of the warning and control index may, for example, be calculated based on the centroid of the geometric figure for the DOM ranges of the graph 1303 of FIG. 13. This calculation may be carried out by dividing the geometric figure of FIG. 13 into sub-areas $A_i$ with individual centroids $x_i$ from the following formula.

$$x_c = \left(\sum_{i=1}^{n} x_i A_i\right) / \left(\sum_{i=1}^{n} A_i\right)$$

The result of such a calculation is shown in FIG. 13 yielding a warning and control index numerical value of about 0.6. Note that this result is less than the warning and control index for audio signals alone and more than result for video signals alone. Fuzzy Logic produces a result in between these extremes, reflecting the fuzzy transitions from one designated range to another.

While, for simplicity, the above example dealt with only two variables, the audio signal analysis results and the video signal analysis results, the method described above may be expanded to more than two variables, including multi-dimensional expert system analysis and multi-dimensional fuzzy logic analysis. Multi-dimensional fuzzy logic may be applied to the example parameter combinations of FIGS. 14-17 discussed below.

For example, while the above example is limited to two variables, audio and video, clearly, for some embodiments, additional tables may be constructed to include other important variables in the decision process. Multidimensional tables may be constructed with more than two variables to reflect additional indices. Exemplary other parameters may include, the results of analysis for medical, process, followed IOT sensor monitor units and telecommunication network analysis as described above. For the case of two variables, audio and video with 5 defined subranges of variable values, 25 possible combinations exist. As the number of variables increases, the number of possible combinations increases exponentially. For example, with 6 such variables and 5 ranges of values for such variables, the number of possible combinations increases to $5^6 = 15,625$ possible outcomes. Modern processing and memory systems make artificial intelligence expert systems analysis of such a large volume of possibilities manageable. In one embodiment of this invention, this approach with, perhaps a reduced number of rules eliminated, a subset of all possible rules that may not apply to a given analysis is used.

However, clearly a simpler artificial intelligence expert system implementation is desirable. In another embodiment of this invention, a hierarchical artificial expert and/or fuzzy logic system is disclosed that reduces the increased size of the inference rule data base with addition of more variables from exponential growth to linear growth. Hierarchical fuzzy system designs are discussed, for example, in the G. Raju, L. Wang and D. Wang references cited above in the identification of prior art in this patent. In addition, the hierarchical systems and methods of this invention implement MIMO (Multiple input—Multiple Output) operations with intermediate evaluation of dangerous situations permitting response to such situations in addition to providing evaluation of the levels of concern or dangerous situations for the combination of considered variables. In some embodiments, adaptive feedback control is provided to further improve hierarchical system control and processing of input signals.

An exemplary hierarchical MIMO adaptive operation 1400 is illustrated in FIG. 14 for a system with 4 input variables 1401: X1, X2, X3 and X4. In this case, the maximum number of required AI expert system rules is reduced from $5^4 = 625$ to $3 \times 5^2 = 75$. More generally, for a hierarchical design with "n" input variables and "m" possible values per variable, required AI expert system rules will be $(n-1)m^2$. Thus, the number of required rules is a linear function of the number of variables as opposed to the exponential increase m" in the non-hierarchical case. As another example, for a system with 6 input variable and 5 subset ranges of values for each variable, the number of required AI expert system rules is reduced from $5^6 = 15,625$ to $5 \times 5^2 = 125$. The result is a significant decrease in design and implementation complexity of the system. The advantage of such a reduction in a system with a large number of variables and variable ranges is clear. In some embodiments of this invention with many network wide variables and variable ranges a substantial reduction in complexity can be achieved.

In FIG. 14, the inputs 1401 are processed at block 1402 using, for example, input signal processing 1403 and signal ranking methods of FIG. 11. Signal processing may include signal filtering, noise reduction, analog to digital conversion, audio signal processing, speech recognition, natural language processing, video signal processing, image analysis, signal time series analysis and statistical signal analysis as discussed above. Analysis of additional signals from other followed remote sensor station and/or monitor units and/or network monitor centers and network telecommunication failures as indicated in FIGS. 1 and 2 and discussed above may also be included in the signal evaluations of blocks 1402 and 1403 of FIG. 14. The individual processed inputs 1401 may be mapped onto a scale from 0 to 1.0 with zero being input signal indicative of no danger or concern for an individual parameter and 1.0 being indication of maximum danger or concern for that parameter. As indicated in FIG. 11 and at 1402 of FIG. 14 the individual input parameters X1, X2, X3 and X4 may also be mapped into the ranges very low (VL), low (L), medium (M), high (H), or very high (VH) according to their numerical rankings representing the degree of danger or concern presented by the parameter values. The resulting output processed signals 1404 from blocks 1402 and 1403 are designated X1, X2, X3 and X4 in FIG. 14.

As shown in the embodiment of FIG. 14, outputs X1, X2, X3 and X4 designated 1404 from the signal processing and adaptive ranking of blocks 1402 and 1403 are mapped to signals Y1, Y2, Y3 and Y4 for further processing by the hierarchical adaptive expert system controller. The outputs of the hierarchical controller may be considered an approximation to an output derived using a complete non-hierarchical expert system controller as described above. In some embodiments of this invention, the results obtained with the hierarchical controller may be improved with selective control of routing of input signal to hierarchical control levels. For example, the specific routing of the signals X1, X2, X3 and X4 to the signals Y1, Y2, Y3 and Y4 may be adaptively changed depending on signal input importance, output sensitivity to particular input signals or other parameter relationships. (See, for example, Di Wang, et. al., and F. Chung cited above.) In some embodiments, it may be desirable to adaptively apply inputs with more specific information first, and inputs with less specific information later in the hierarchical network of FIG. 14. For example, input signals with the largest values may be deemed more important than input variables with smaller values. In other embodiments, particular input parameters may be considered more important than other input variable. For example, in some embodiments, medical signals may be deemed more important than other signals. Also, the input signal of most importance may change with time. For example, time series analysis of particular signal inputs may indicate trends of concern for particular inputs. The output parameters Y1 and Y2 are passed to AI expert system analysis block 1406 for AI expert system analysis to determine the degree of danger or concern Z1 represented by the particular combination of Y1 and Y2.

With the hierarchical analysis of some embodiments of this invention, the output parameter Z1 is also passed to AI expert system analysis 1407 together with the output parameter Y3 for an analysis and determination of the degree or danger or concern Z2 represented by this combination. In this way, the output of AI expert system analysis 1406 is used as an input to AI expert system analysis 1407 in a hierarchical manner for successive computations.

In the same hierarchical manner, the output Z2 of AI expert system analysis 1407 is passed input to AI expert system analysis 1408 together with the output Y4 from the input processing and ranking block 1402 for determination of the degree of danger or concern Z3 represented by the combination of the variable Y4 and the output Z2.

The input variables X1, X2, X3 and X4 are represented collectively by 1401 in FIG. 14. The output variables Y1, Y2, Y3 and Y4 are represented collectively by 1405. The results Z1, Z2 and Z3 of the AI expert system analyses 1406, 1407, and 1408 are represented collectively by 1409 in FIG. 14. The combination of variables 1405 and 1409 are fed to block 1410 for further signal analysis and issuance of appropriate warning/control signals. In this way, the warning/control signals may be indicative of individual concerns or danger arising from the output variables 1404 as well as the results of the AI expert system analyses 1406, 1407 and 1408 as illustrated in FIG. 14. The output Z3 includes results based on all four input variables 1401. In addition, in some embodiments, further feed-back control signals 1411 may be used to provide further control of selection of signal ranking 1404 depending sensitivity or other measurements of output signals to selection or ordering of signals 1404 for analysis as indicated in FIG. 14. The hierarchical system and method of FIG. 14 is a MIMO (Multiple Input-Multiple Output) hierarchical AI Expert system with 4 inputs and 7 outputs.

Returning now to the two-input audio/video system of FIGS. 12A, 12B and 13, in another embodiment of this invention, a third variable may be added to the audio/video (AV) analysis using the above outlined hierarchical MIMO AI adaptive expert system analysis of FIG. 14. For example, FIG. 15 adds the medical variable resulting in an AVM analysis. In this example, a non-symmetric expert system matrix 1500 as discussed above is used. Depending on the expert input, other matrices may also may be more appropriate. As discussed above, non-symmetric matrices permit favoring certain variable or variable combinations over others. For example, in the matrix of FIG. 15, the medical parameter is given more weight than the audio or video parameters. The result of the expert system analysis of FIG. 15 is an AVM (audio/video/medical) combination warning and control index output. The variable relationships of FIG. 15 may also be processed using fuzzy logic as shown in FIG. 13.

In the same way, the derived process signal value may be added to the hierarchical adaptive expert system analysis as shown in the matrix 1600 of FIG. 16. The result of this analysis is a warning and/or control (AVMP) combination signal output warning and control index for audio/video/medical/process as indicated in FIG. 16. The same modifications for emphasizing certain variables over others and fuzzy logic formulations as described above can applied to the AVMP combination calculation. Here again, the variable relationships of FIG. 16 may also be processed using fuzzy logic as shown in FIG. 13.

In the same way, the derived "followed" remote sensor station signal value may be added to the hierarchical adaptive expert system analysis as shown in the matrix 1700 of FIG. 17. The result of this analysis is a warning and/or control (AVMPF) signal output for audio/video/medical/process/followed combination as indicated in FIG. 17. The same modifications for emphasizing certain variables over others and fuzzy logic formulations as described above can applied to the AVMPF calculation.

In the same way, derived "telecommunication network" remote sensor station signal values may be added to the hierarchical expert system analysis as shown in the matrix

1800 of FIG. 18. The result of this analysis is a warning and/or control (AVMPFT) signal output warning and control index for audio/video/medical/process/followed/telecommunication combination as indicated in FIG. 18. The same modifications for emphasizing certain variables over others and fuzzy logic formulations as described above can applied to the AVMPFT calculation.

The above described operations may involve the input of multiple exemplary parameters such as the audio, medical, process, followed remote sensor stations, and telecommunication sensor signals, and may in-turn result in the output of a single composite warning and control signal based on the combination the input sensor signals. Such systems are sometimes referred to as MISO systems with multiple inputs and a single output. Systems with multiple inputs and multiple outputs are sometimes referred to as MIMO systems. In some embodiments of the present invention, MIMO operation permits generation of multiple control outputs based on multiple sensor signals inputs as described above.

FIG. 19 depicts one such possible hierarchical MIMO embodiment 1900 of the present invention. In this embodiment, multiple outputs may be generated based on multiple calculated results indicating the requirements for urgent responses to multiple sensor signal inputs. The flowchart of FIG. 19 provides for multiple intermediate outputs depending on the results that may develop in the processing, analyzing and evaluating the input data.

Here again, the flowchart of FIG. 19 is a continuation of the flowchart of FIG. 9 via the connector 1921 G. At block 1901 audio/video (AV) sensor signals are input for evaluation. Block 1902 computes an AV warning and control index as outlined for example in FIGS. 12A, 12B and 13. Control is then passed to the urgent decision block 1903. At this point the decision is made as to whether the audio signals alone, video signals alone or the computed AV itself require an issue of a warning or system control signal. If a warning signal is to be issued at this point control is passed to the issue warning block 1904 for generation and dispatch of that signal. Once that warning is issued or in the event that no urgent warning signal is necessary, control is passed to the input medical sensor network data block 1905.

The received medical sensor data is in turn passed to block 1906 for computation of the audio/video/medical (AVM) warning and control index using, for example, the expert system matrix of FIG. 15 or fuzzy logic calculations as indicated in FIG. 9 at block 916. At this point the decision is made as to whether the medical signals alone or the computed AVM itself require an issue of a warning or system control signal. Having computed the AVM warning and control index at block 1906, control is passed to the urgent decision block 1907. If a warning or control signal is to be issued at this point control is passed to the issue warning block 1908 for generation and dispatch of that signal. Once that warning is issued or in the event that no urgent warning signal is necessary, control is passed to the input process sensor network data block 1909.

The received process sensor data is in turn passed to block 1910 for computation of the audio/video/medical/process (AVMP) warning and control index using, for example, the expert system matrix of FIG. 16 or fuzzy logic calculations as indicated in FIG. 9 at block 916. At this point the decision is made as to whether the process signals alone or the computed AVMP itself require an issue of a warning or system control signal. Having computed the AVMP warning and control at block 1910, control is passed to the urgent decision block 1911. If a warning signal is to be issued at this point, control is passed to the issue warning block 1912 for generation and dispatch of that signal. Once that warning is issued or in the event that no urgent warning signal is necessary, control is passed to the input followed sensor network block 1913 for data inputs from other remote sensor stations of interest as described above.

The received "followed" sensor data is in turn passed to block 1914 for computation of the audio/video/medical/process/followed (AVMPF) warning and control index using, for example, the expert system matrix of FIG. 17 or fuzzy logic calculations as indicated in FIG. 9 at block 916. At this point the decision is made as to whether the "followed" signals alone or the computed AVMPF itself require an issue of a warning or system control signal. Having computed the AVMPF warning and control index at block 1914, control is passed to the urgent decision block 1915. If a warning signal is to be issued at this point, control is passed to the issue warning block 1916 for generation and dispatch of that signal. Once that warning is issued or in the event that no urgent warning signal is necessary, control is passed to the input telecommunication sensor network data block 1917 for data inputs from telecommunication network components and/or telecommunication subnetworks as discussed above.

The received telecommunication network sensor data is in turn passed to block 1918 for computation of the audio/video/medical/process/followed/telecommunication (AVMPFT) warning and control index using, for example, the expert system matrix of FIG. 18 or fuzzy logic calculations as indicated in FIG. 9 at block 916. At this point the decision is made as to whether the telecommunication signals alone or the computed AVMPFT itself require an issue of a warning or system control signal. Having computed the AVMPFT warning and control index at block 1918, control is passed to the urgent decision block 1919. If a warning signal is to be issued at this point, control is passed to the issue warning block 1920 for generation and dispatch of that signal. Once that warning is issued or in the event that no urgent warning signal is necessary, control is passed back to block 916 OF FIG. 9.

It is clear from the above discussion of the flow chart of FIG. 19 that multiple warning signals may be issued based on the analysis outlined in the flowchart. With multiple input signals and multiple output signals the disclosed system operates as a hierarchical multi-variable MIMO sensor network warning and/or control system.

FIG. 20 is an exemplary artificial neural network of the type useful in some embodiments of this invention. Artificial neural networks are in part modeled after operations in the biological neural network of the human brain. It has been estimated that the biological neural network of the human brain contains roughly 100 billion neurons. Biological neural network neurons interact and communicate with one another via interconnecting axons and dendrites. Biological neurons respond to a weighted combination of input signals with comparison of the sum to activation thresholds. A single biological brain neuron may receive thousands of input signals at once that undergo the summation process to determine if the message gets passed along to other neurons in the biological network.

Artificial neural networks as shown in FIG. 20 are based on a simplistic model compared to the actual biological neural network of the brain. Nonetheless, artificial neural networks are proving useful, for example, in problems encountered in pattern recognition, facial recognition, prediction, process modeling and analysis, medical diagnostics and dynamic load scheduling. Referring to FIG. 20, the artificial neural network 2000 receives inputs 2006 from external sensors. The nodes 2004 of the artificial neural network 2000 correspond approximately to neurons in the human brain and are organized with an input layer 2001 and output layer 2003 interconnected by hidden layers 2002. The nodes are interconnected by neural network connections 2005. Weighted sums of input signals may be compared to threshold levels within the neural network nodes to produce output signals for transmission to subsequent nodes or outputs 2007. For example, in image recognition problems the inputs 2006 correspond to signals from image sensors. The output signals 2007 will indicate whether or not the image being observed corresponds to a desired image. The internal weights and summing operations are configured during a training process corresponding to the actual desired result. Multiple training methodologies have been proposed including the use of backward chaining feedback arrangements of the output signals to adjust the weights of the artificial neural network summing operations to achieve the proper result if the desired image is presented. Artificial neural networks may thus be characterized as containing adaptive weights along paths between neurons that can be tuned by a learning algorithm from observed data using optimization techniques in order to improve the model. (See, for example, https://www.innoarchitech.com/artificial-intelligence-deep-learning-neural-networks-explained/)

FIG. 21 depicts, without limitation, an exemplary sensor network neural network expert system analysis 2100 in accordance with the systems and methods of the present invention. Audio, image, medical, process, material, manufacturing equipment, environmental, transportation, location, pipeline, power system, radiation, vehicle, computer, processor, data storage, cloud processing, cloud data storage, drone, threat, mote, BOT, robot, telecommunication network or other followed remote sensor station monitoring signals comprise the sensor network inputs 2101. In some instances, the signal inputs are processed by artificial neural networks 2102 as illustrated in FIG. 21. The outputs from the neural networks along with the additional sensor signal inputs are processed by the sensor signal analysis/neural network analysis/ranking operations 2103. The processing 2103 accesses expert system rules 2104 for derivation system warning and control signals as discussed above. In some embodiments, fuzzy logic inference rules may also be accessed to provide fuzzy logic warning and control signals as discussed above. In some embodiments, hierarchical adaptive MIMO control may be implemented as described above.

FIG. 22 illustrates in more detail exemplary fuzzy logic system operation execution 2200 useful in the system and methods of this invention. As shown in FIG. 22, the operations of fuzzy logic inference engine 2201 include access to the artificial intelligence expert system knowledge base 2205 which may include the fuzzy logic rules discussed above. The fuzzy logic operations include the fuzzifier 2202 used to establish degree of memberships DOMs as discussed above. The outputs of fuzzifier 2202 are fed to the fuzzy logic processing element 2203. Defuzzifier 2204 provides crisp numerical outputs for the warning and control index 2206 as discussed above.

Systems and methods described above provide network wide IOT warning and control signals. MIMO embodiment operation including input analysis from sensors directly connected to a given remote sensor station as well as inputs from different remote sensor stations designated as being followed by a given sensor station are disclosed. Embodiments based on artificial intelligence expert systems analysis, fuzzy logic analysis and the use of neural networks are included in systems and methods set-forth in this invention. Expert system and fuzzy logic implementations with hierarchical control and/or adaptive feedback are disclosed.

It should be understood that the drawings and detailed descriptions are not intended to limit the invention to the particular form disclosed, but on the contrary, the intention is to cover all modifications, equivalents and alternatives falling within the spirit and scope of the present invention as defined by the appended claims.

The invention claimed is:

1. An artificial intelligence IOT (Internet of Things) Big Data information management and control system comprising:
   a terrestrial vehicle specifically programed artificial intelligence computer communication system for IOT network terrestrial vehicle driving condition analysis and expert system generation of danger warning and control signals further comprising;
   a memory for storing executable program code for said terrestrial vehicle specifically programed artificial intelligence computer communication system and further for storing IOT network terrestrial vehicle driving condition information;
   at least one processor for executing said terrestrial vehicle specifically programed artificial intelligence computer communication system executable program code;
   one or more transceivers for communicating via IOT communication links;
   said IOT communication links providing said terrestrial vehicle artificial intelligence computer communication system information indicative of said terrestrial vehicle driving condition information;
   expert system processing of said terrestrial vehicle driving condition information and derivation of terrestrial vehicle driving condition parameters based on monitoring of (1) said terrestrial vehicle operational status parameters and further based on IOT information exchanges with at least two of: (2) communication network connections with application servers, (3) communication network connections with other terrestrial vehicles, (4) communication network connections with pedestrians, and (5) communication network connections with roadside monitoring or control units; and further comprising human expert defined parameter ranges and range subsets for said terrestrial vehicle driving condition parameters, and human expert defined propositional logic rules based on values of said terrestrial vehicle driving condition parameters;
   said expert system processing of said terrestrial vehicle driving condition parameters further comprising adaptive ranking of importance of said parameters (1), (2), (3), (4) and (5) with parameter evaluation and assignment to expert defined ranges depending on level of concern indicated by said parameter evaluation for use in expert system analysis;
   said expert system processing further comprising multi-stage hierarchical expert system analysis by said terrestrial vehicle specifically programed artificial intelligence computer communication system of said individual processed and ranked said terrestrial vehicle driving condition parameters (1), (2), (3), (4) and (5) and generation of:
   successive individual output signals (6) from each stage of said multi-stage hierarchical expert system analysis including the final stage output;

warning and control signals based on each of individual processed and ranked parameters (1), (2), (3), (4) and (5) and further based on the output signals (6) of each stage of said multi-stage hierarchical expert system analysis including the final output stage;

routing said multi-stage hierarchical expert system analysis output signals (6), except the final stage output signal, to a subsequent stage of said multi-stage hierarchical expert system, and also hierarchical expert system routing of said individual processed and ranked said terrestrial vehicle driving condition parameters (1), (2), (3), (4) and (5) to both separate output signal processing and also to successive stages of said multi-stage hierarchical expert system, and routing the output signals (6) of each successive individual output from each stage of said hierarchical expert system analysis including the final stage output to the output signal processing;

generating individual warning and control signals based on said IOT network monitoring and also based on multi-stage hierarchical expert system analysis of said output signals (6) by said terrestrial vehicle specifically programed artificial intelligence computer communication system;

signal processing receiving each of separate individual processed and ranked said terrestrial vehicle driving condition parameters (1), (2), (3), (4) and (5) in addition to each successive individual output signal (6) from each stage of said hierarchical expert system analysis including the final output stage for use in derivation of adaptive feedback control by said terrestrial vehicle specifically programed artificial intelligence computer communication system for use in dynamic ranking of said terrestrial vehicle driving condition parameters presented to said expert system analysis;

whereby said combination of capabilities provides efficient artificial intelligence IOT Big Data information management and system control by minimizing Big Data access and processing operations achieved through said terrestrial vehicle specifically programed artificial intelligence computer communication system monitoring of said terrestrial vehicle driving condition parameters and further comprising artificial intelligence efficient multi-stage hierarchical expert system signal processing with fewer propositional logic statements than used in non-hierarchical expert system signal processing, and further comprising adaptive feedback control and warning and control signal generation and processing.

2. The artificial intelligence IOT Big Data information management and control system of claim 1 wherein said communication network connections comprise cellular telephone network connections.

3. The artificial intelligence IOT Big Data information management and control system of claim 1 wherein said communication network connections comprise Internet or IOT connections.

4. The artificial intelligence IOT (Internet of Things) Big Data information management and control system of claim 1 wherein said communication network connections comprise one or more of Internet, Wi-Fi, Bluetooth, satellite, fiber optic, airborne, drone or BOT communications.

5. The artificial intelligence IOT Big Data information management and control system of claim 1 wherein said communication network connections with application servers comprise a communication network connection with a remote monitoring station.

6. The artificial intelligence IOT Big Data information management and control system of claim 1 wherein said communication network connections with application servers comprise a communication network connection with a network monitoring center.

7. The artificial intelligence IOT Big Data information management and control system of claim 1 wherein said communication network connections with application servers comprise a communication network connection with cloud-based information storage or information processing.

8. The artificial intelligence IOT Big Data information management and control system of claim 1 wherein said communication network connections with other terrestrial vehicles comprises communication with other vehicles in the vicinity to of said terrestrial vehicle to avoid collisions, report driver issues, report said terrestrial vehicle equipment issues, report traffic issues, or other driving condition issues.

9. The artificial intelligence IOT Big Data information management and control system of claim 1 wherein said communication network connections with other terrestrial vehicles comprises communication with other terrestrial vehicles via one or more remote monitoring stations.

10. The artificial intelligence IOT Big Data information management and control system of claim 1 wherein said communication network connections with other terrestrial vehicles comprises driverless terrestrial vehicle communication with other terrestrial vehicles.

11. The artificial intelligence IOT Big Data information management and control system of claim 1 wherein said communication network connections with pedestrians provides detection of the presence or location of a pedestrian for the purpose of collision avoidance maneuvers or actions to be taken.

12. The system of claim 11 wherein said communication network connections with pedestrians comprises detection of the presence of a pedestrian via radar, sonar, lidar, or via a radio link.

13. The system of claim 12 wherein said communication network connections with pedestrians provides monitoring of an infant, invalid, medical patient or special needs person, senior citizen, child, prisoner, store customer, criminal, intruder, police officer, a person in a crowd, or other person or persons requiring monitoring or surveillance.

14. The system of claim 11 wherein said communication network connections with pedestrians provides pedestrian location determined using GPS location technology.

15. The artificial intelligence IOT Big Data information management and control system of claim 1 wherein said communication network connections with pedestrians comprise transmission of warning signals from said terrestrial vehicle to said pedestrian to bring potentially dangerous situations to the pedestrian's attention.

16. The system of claim 15 wherein said warning signals comprise one or more of terrestrial vehicle location, speed, or direction of travel location and further wherein said communication network connections with pedestrians alerts said pedestrians of potential collision danger via a wireless communication device carried by the pedestrian.

17. The system of claim 16 wherein said communication network connections with pedestrians comprises a wireless communication device carried by the pedestrian, said wireless device providing location determination, information processing, and warning signal generation.

18. The artificial intelligence IOT Big Data information management and control system of claim 1 wherein said one or more transceivers for communicating via IOT communication links comprises transceivers for determination of location of said terrestrial vehicle with GPS technology, cellular telephone tower triangulation technology, or Wi-Fi signal location technology.

19. The artificial intelligence IOT Big Data information management and control system of claim 1 wherein said IOT network terrestrial vehicle driving condition analysis of said terrestrial vehicle operational status parameters comprises expert system generation of vehicle driver issue or vehicle equipment issue warning or control signals.

20. The artificial intelligence IOT Big Data information management and control system of claim 1 wherein said communication network connections with roadside monitoring or control units comprises communication with one or more of RFID roadside monitoring and control units or roadside monitoring and control units reporting vehicle roadway issues, vehicle traffic issues, vehicle emergencies, accidents, or police issues.

* * * * *